(12) United States Patent
Kodama et al.

(10) Patent No.: US 9,528,892 B2
(45) Date of Patent: Dec. 27, 2016

(54) MEASURING DEVICE

(71) Applicant: PIONEER CORPORATION, Kawasaki-shi, Kanagawa (JP)

(72) Inventors: Yasuteru Kodama, Kawasaki (JP); Nobuo Mioka, Kawasaki (JP); Ryujiro Fujita, Kawasaki (JP); Takehiko Shioda, Kawasaki (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/760,232

(22) PCT Filed: Jan. 11, 2013

(86) PCT No.: PCT/JP2013/050451
§ 371 (c)(1),
(2) Date: Jul. 10, 2015

(87) PCT Pub. No.: WO2014/109055
PCT Pub. Date: Jul. 17, 2014

(65) Prior Publication Data
US 2015/0355042 A1 Dec. 10, 2015

(51) Int. Cl.
*G01L 1/22* (2006.01)
*G01L 5/16* (2006.01)
*B62J 99/00* (2009.01)

(52) U.S. Cl.
CPC ............... *G01L 5/161* (2013.01); *G01L 1/22* (2013.01); *B62J 2099/002* (2013.01); *B62J 2099/0013* (2013.01); *B62J 2099/0026* (2013.01)

(58) Field of Classification Search
CPC ..... G01L 5/161; G01L 1/22; B62J 2099/0013; B62J 2099/002; B62J 2099/0026
(Continued)

(56) References Cited

U.S. PATENT DOCUMENTS 4,463,433 A * 7/1984 Hull ................. A61B 5/221
702/41
4,493,220 A * 1/1985 Carignan ............ A61B 5/1036
73/862.628
(Continued)

FOREIGN PATENT DOCUMENTS

JP 10-35567 A 2/1998
JP 2009-6991 A 1/2009

OTHER PUBLICATIONS

International Search Report for PCT/JP2013/050451 dated Mar. 12, 2013.
Written Opinion for PCT/JP2013/050451 dated Mar. 12, 2013.

*Primary Examiner* — Max Noori
(74) *Attorney, Agent, or Firm* — Sughrue Mion, PLLC

(57) ABSTRACT

There is provided a measuring device capable of measuring a propulsion force and a loss force by using a simple method. A first detection circuit that is a bridge circuit, to which a first strain gauge and a second strain gauge disposed such that detection directions are parallel to a longitudinal direction of a crank are connected, detecting bending deformation x occurring in the crank, and a second detection circuit that is a bridge circuit, to which a third strain gauge disposed such that a detection direction is parallel to the longitudinal direction of the crank and a fourth strain gauge disposed such that a detection direction is perpendicular to the longitudinal direction of the crank are connected, detecting bending deformation y and tensile deformation z occurring in the crank are included.

14 Claims, 25 Drawing Sheets

(58) Field of Classification Search
USPC .................................... 73/862.041–862.046
See application file for complete search history.

(56) References Cited

U.S. PATENT DOCUMENTS

| | | | | |
|---|---|---|---|---|
| 5,035,148 | A * | 7/1991 | Okada | G01L 5/162 |
| | | | | 338/5 |
| 5,835,977 | A * | 11/1998 | Kamentser | G01L 5/223 |
| | | | | 73/862.044 |
| 5,872,319 | A * | 2/1999 | Bruns | G01L 1/042 |
| | | | | 73/862.641 |
| 5,872,320 | A * | 2/1999 | Kamentser | G01L 5/223 |
| | | | | 73/862.044 |
| 2012/0214646 | A1* | 8/2012 | Lull | G01L 3/242 |
| | | | | 482/5 |
| 2012/0285264 | A1* | 11/2012 | Sasaki | B62M 9/131 |
| | | | | 73/862.045 |
| 2012/0285265 | A1* | 11/2012 | Sasaki | B62M 3/003 |
| | | | | 73/862.045 |
| 2014/0060212 | A1* | 3/2014 | Tetsuka | G01L 3/247 |
| | | | | 73/862.627 |

\* cited by examiner

FIG. 15
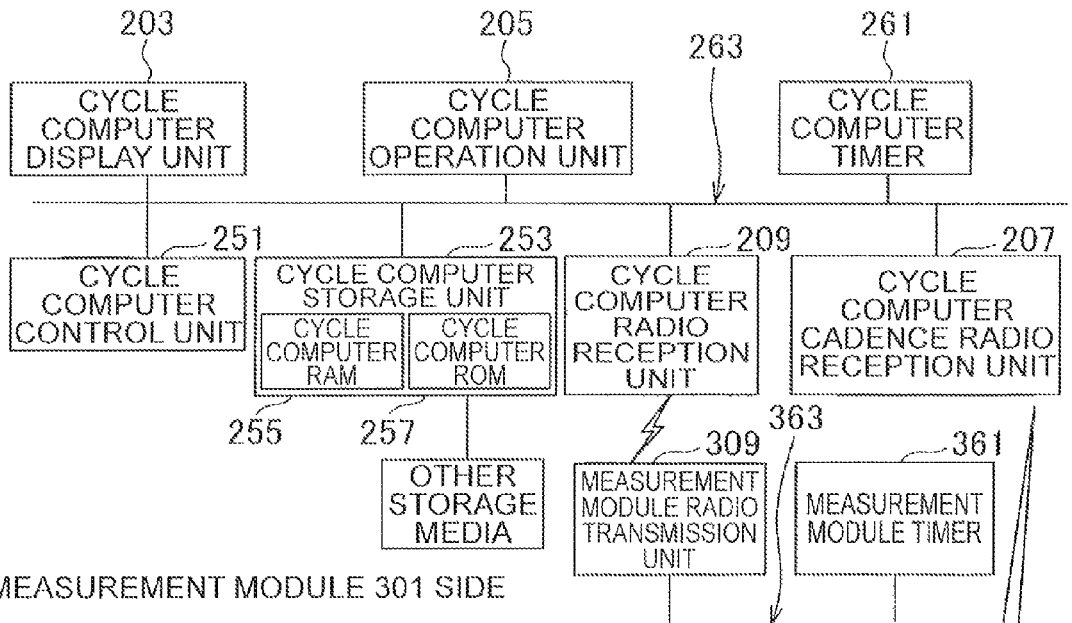
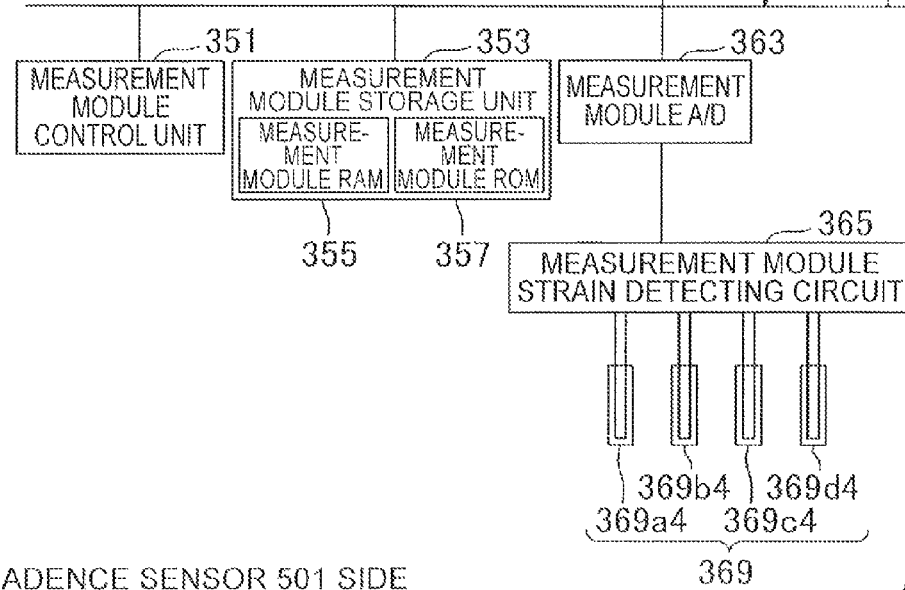
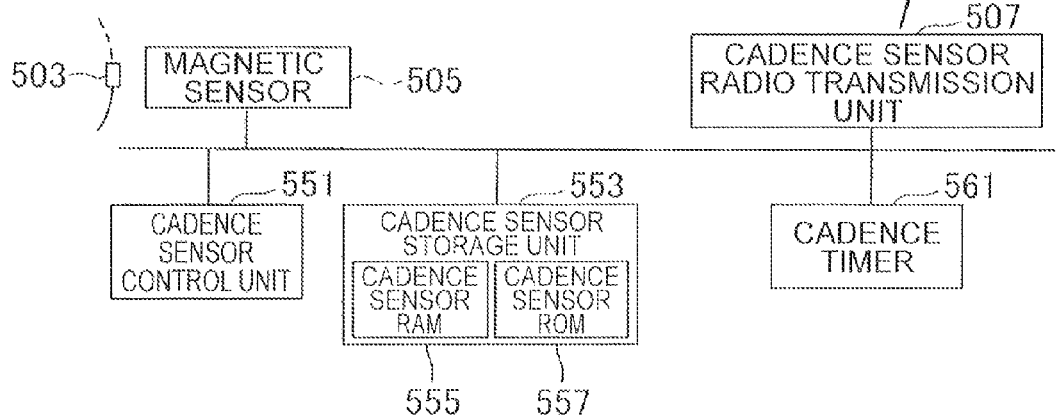

FIG. 29
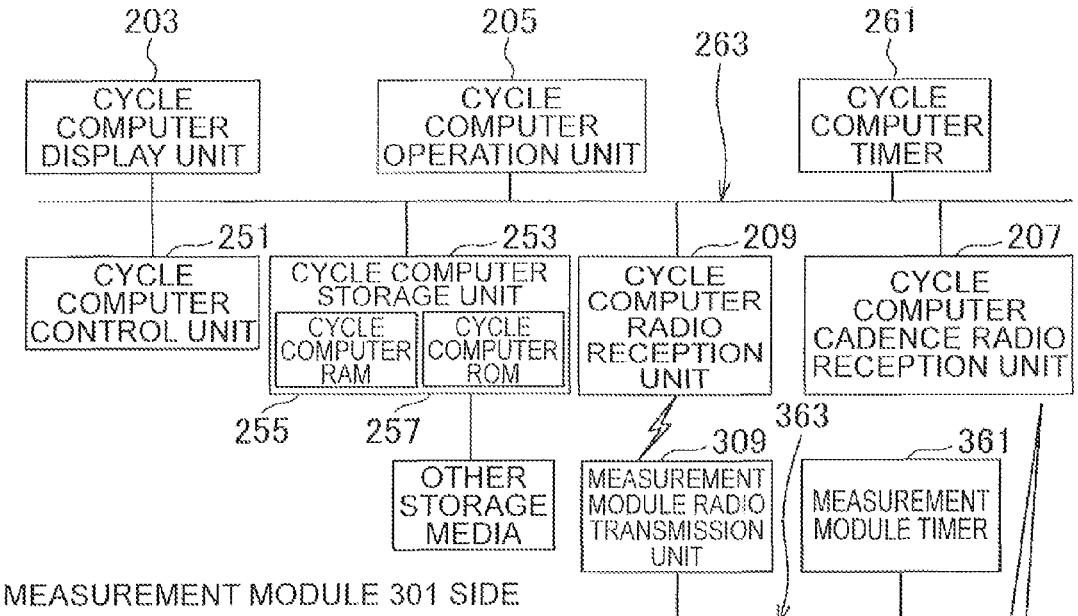
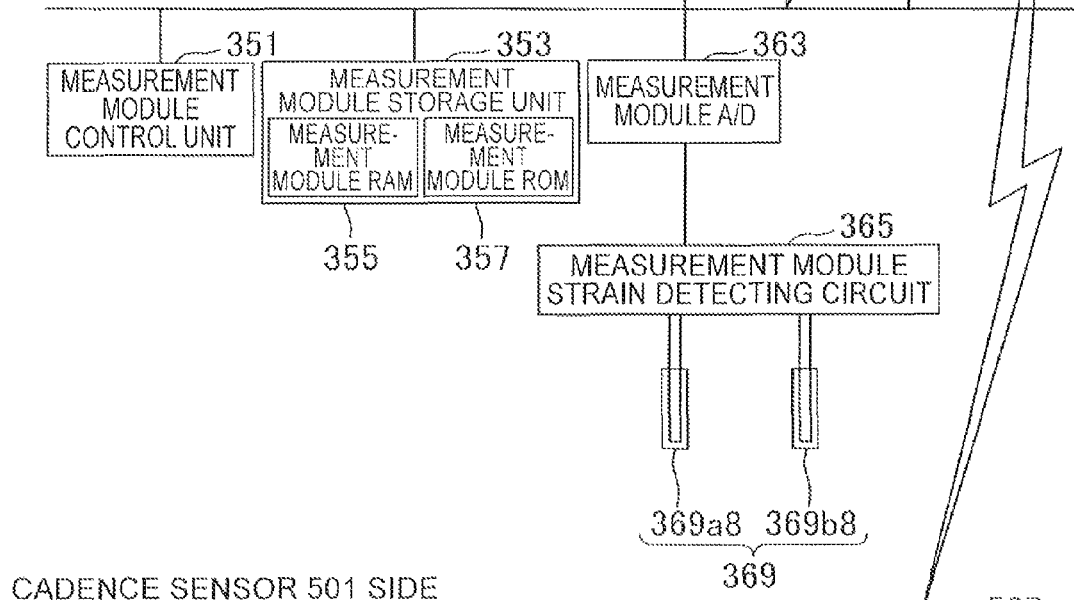
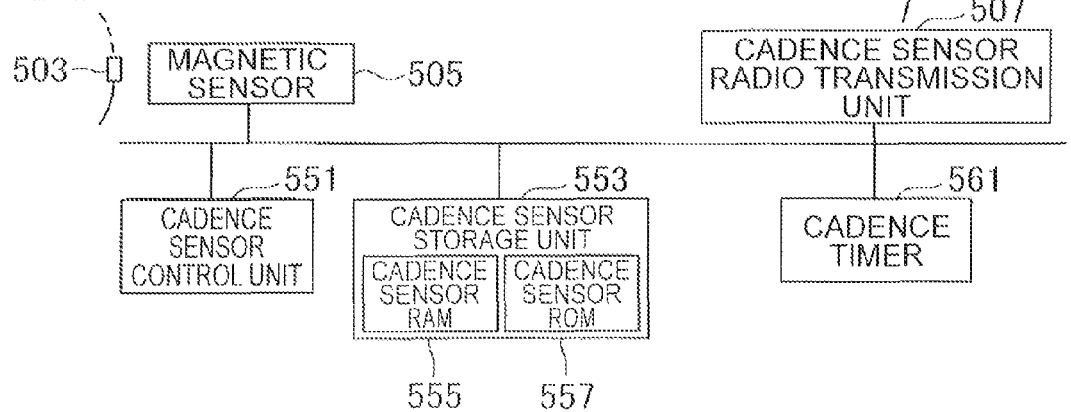

MEASURING DEVICE

CROSS REFERENCE TO RELATED APPLICATIONS

This application is a National Stage of International Application No. PCT/JP2013/050451 filed Jan. 11, 2013, the contents of all of which are incorporated herein by reference in their entirety.

TECHNICAL FIELD

The present invention relates to a measuring device that measures a force being applied to a manpower machine including a crank.

BACKGROUND ART

Conventionally, there are devices each being installed to a bicycle and calculating and displaying information relating to the traveling of the bicycle, information relating to the exercise of a driver, and the like. A device of such a type receives data from a sensor installed to the bicycle and calculates and displays predetermined information. As examples of the information that is displayed, there are a force (torque or the like) that is applied by the driver to a pedal and the like. As a method of measuring a force of such a type, for example, in Patent Literature 1, a technology for detecting torque applied to a crank by measuring a strain of a crankshaft has been disclosed.

In addition, in Patent Literature 2, a technology for embedding a piezoelectric sensor inside a crank and measuring torque based on a voltage generated according to a strain of the crank has been disclosed.

Furthermore, Patent Literature 1 describes that the technology is also applicable to a stationary bicycle-type health machine (also referred to as a bicycle ergometer or an exercise bike).

As above, in a manpower machine including a crank, it is known to calculate momentum and the like by measuring torque by detecting a strain applied to the crank.

CITATION LIST

Patent Literature

Patent Literature 1: JP 10-35567 A
Patent Literature 2: JP 2009-6991 A

SUMMARY OF INVENTION

Technical Problem

In the bicycle meter disclosed in Patent Literature 1, since it is necessary to install a sensor to a bottom bracket part, there are problems in that frame processing is necessary for the bottom bracket, and knurling processing is necessary for the crankshaft.

In addition, in a bicycle component including a gauge disclosed in Patent Literature 2, not only torque according to a force applied in the rotation direction but also a loss force is detected, and there is a problem in that the degree of a force applied as a rotating force, in other words, a propulsion force cannot be precisely known.

Thus, in view of the problems described above, an object of the present invention is to provide a measuring device capable of measuring a propulsion force and a loss force, for example, by using a simple method.

Solution to Problem

In order to solve the problems described above, according to an invention of a first aspect, there is provided a measuring device including: a first strain gauge, a second strain gauge, a third strain gauge, and a fourth strain gauge that are disposed on a side face that is a face of a crank parallel to a plane including a circle defined by rotational movement of the crank of a manpower machine; a first detection circuit, to which the first strain gauge and the second strain gauge are connected, detecting a rotating-direction strain generated in a rotating direction of the crank; and a second detection circuit, to which the third strain gauge and the fourth strain gauge are connected, detecting at least one of an inward/outward strain generated in a direction perpendicular to the plane of the crank and a pulling-direction strain generated in a direction parallel to a longitudinal direction of the crank, the first strain gauge to the third strain gauge being arranged such that detection directions are parallel to the longitudinal direction of the crank, the fourth strain gauge being arranged such that a detection direction is perpendicular to the longitudinal direction of the crank.

According to an invention of a second aspect, there is provided a measuring device including: a first strain gauge, a second strain gauge, a third strain gauge, a fourth strain gauge, a fifth strain gauge, a sixth strain gauge, a seventh strain gauge, and an eighth strain gauge that are disposed on a side face that is a face of a crank parallel to a plane including a circle defined by rotational movement of the crank of a manpower machine; a first detection circuit, to which the first strain gauge, the second strain gauge, the fifth strain gauge, and the sixth strain gauge are connected, detecting a rotating-direction strain generated in a rotating direction of the crank; and a second detection circuit, to which the third strain gauge, the fourth strain gauge, the seventh strain gauge, and the eighth strain gauge are connected, detecting at least one of an inward/outward strain generated in a direction perpendicular to the plane of the crank and a pulling-direction strain generated in a direction parallel to a longitudinal direction of the crank, the first strain gauge, the second strain gauge, the third strain gauge, and the eighth strain gauge being arranged such that detection directions are parallel to the longitudinal direction of the crank, the fourth strain gauge, the fifth strain gauge, the sixth strain gauge, and the seventh strain gauge being arranged such that detection directions are perpendicular to the longitudinal direction of the crank.

According to an invention of a third aspect, there is provided a measuring method measuring a propulsion force and a loss force of a manpower machine by using a measuring device that includes: a first strain gauge, a second strain gauge, and a third strain gauge that are disposed on a side face that is a face of a crank parallel to a plane including a circle defined by rotational movement of the crank of a manpower machine such that detection directions are disposed to be parallel to a longitudinal direction of the crank; a fourth strain gauge disposed such that a detection direction is perpendicular to the longitudinal direction of the crank; a first detection circuit, to which the first strain gauge and the second strain gauge are connected, detecting a rotating-direction strain generated in a rotating direction of the crank; and a second detection circuit, to which the third strain gauge and the fourth strain gauge are connected, detecting at least one of an inward/outward strain generated in a direction perpendicular to the plane of the crank and a pulling-direction strain generated in a direction parallel to a longitudinal direction of the crank, the measuring method including: detecting the rotating-direction strain by using the first detection circuit; measuring the propulsion force based on the rotating-direction strain detected in the detecting of the rotating-direction strain; detecting at least one of the inward/outward strain and the pulling-direction strain by using the second detection circuit; and measuring the loss force based on at least one of the inward/outward strain and the pulling-direction strain detected in the detecting of at least one of the inward/outward strain and the pulling-direction strain.

According to an invention of a forth aspect, there is provided a measuring method measuring a propulsion force and a loss force of a manpower machine by using a measuring device that includes: a first strain gauge, a second strain gauge, a third strain gauge, and an eighth strain gauge that are disposed on a side face that is a face of a crank parallel to a plane including a circle defined by rotational movement of the crank of the manpower machine such that detection directions are parallel to a longitudinal direction of the crank; a fourth strain gauge, a fifth strain gauge, a sixth strain gauge, and a seventh strain gauge disposed such that detection directions are perpendicular to the longitudinal direction of the crank; a first detection circuit, to which the first strain gauge, the second strain gauge, the fifth strain gauge, and the sixth strain gauge are connected, detecting a rotating-direction strain generated in a rotating direction of the crank; and a second detection circuit, to which the third strain gauge, the fourth strain gauge, the seventh strain gauge, and the eighth strain gauge are connected, detecting at least one of an inward/outward strain generated in a direction perpendicular to the plane of the crank and a pulling-direction strain generated in a direction parallel to a longitudinal direction of the crank, the measuring method including: detecting the rotating-direction strain by using the first detection circuit; measuring the propulsion force based on the rotating-direction strain detected in the detecting of the rotating-direction strain; detecting at least one of the inward/outward strain and the pulling-direction strain by using the second detection circuit; and measuring the loss force based on at least one of the inward/outward strain and the pulling-direction strain detected in the detecting of the inward/outward strain and the pulling-direction strain.

BRIEF DESCRIPTION OF DRAWINGS

FIG. 15 is a block configuration diagram of a cycle computer, a measurement module, and a cadence sensor according to a fourth embodiment of the present invention.

FIG. 29 is a block configuration diagram of a cycle computer, a measurement module, and a cadence sensor according to an eighth embodiment of the present invention.

DESCRIPTION OF EMBODIMENTS

Figure 1:
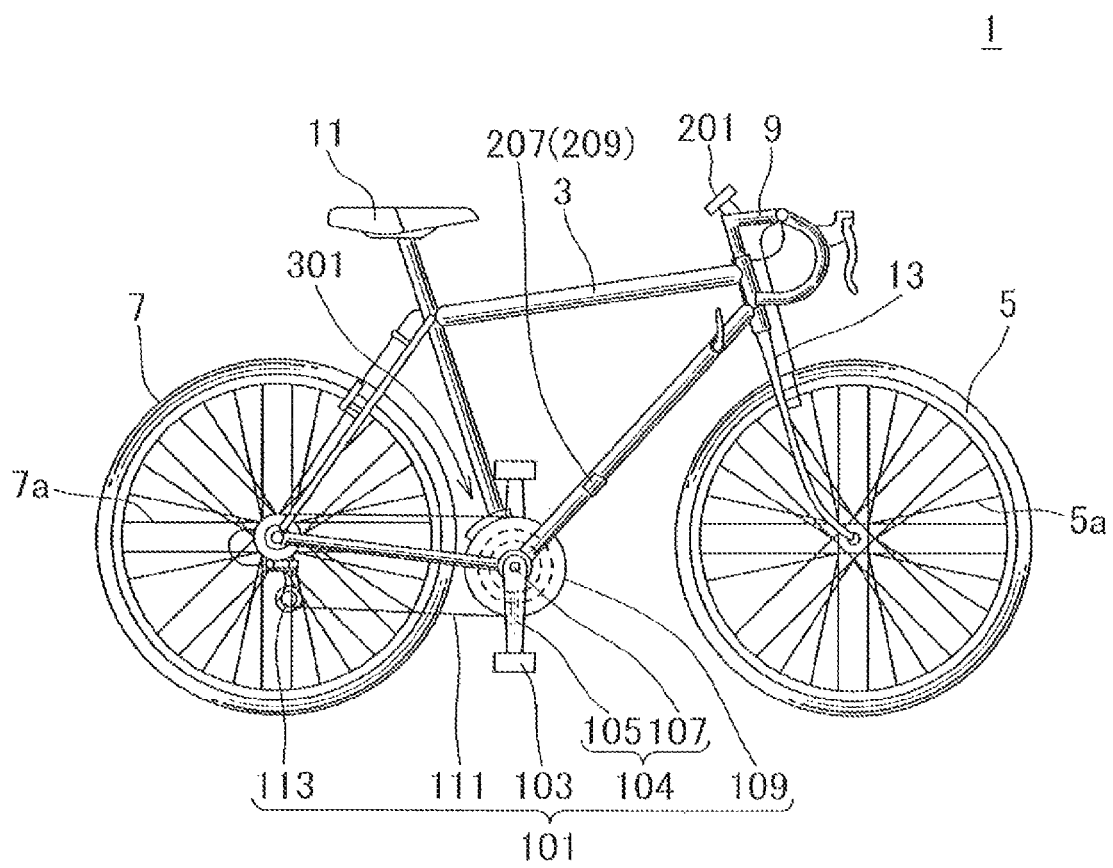
FIG. 1 is an explanatory diagram that illustrates the whole configuration of a bicycle according to a first embodiment of the present invention.

Hereinafter, a measuring device according to an embodiment of the present invention will be described. According to an embodiment of the present invention, there is provided a measuring device including: a first strain gauge, a second strain gauge, a third strain gauge, and a fourth strain gauge that are disposed on a side face that is a face of a crank parallel to a plane including a circle defined by rotational movement of the crank of a manpower machine; a first detection circuit, to which the first strain gauge and the second strain gauge are connected, detecting a rotating-direction strain generated in a rotating direction of the crank; and a second detection circuit, to which the third strain gauge and the fourth strain gauge are connected, detecting at least one of an inward/outward strain generated in a direction perpendicular to the plane of the crank and a pulling-direction strain generated in a direction parallel to a longitudinal direction of the crank. The first strain gauge to the third strain gauge are arranged such that detection directions are parallel to the longitudinal direction of the crank, and the fourth strain gauge is arranged such that a detection direction is perpendicular to the longitudinal direction of the crank. By configuring as such, a propulsion force and a loss force participating to the crank can be measured based on the rotating-direction strain detected by the first detection circuit and the inward/outward strain or the pulling-direction strain detected by the second detection circuit. Thus, the propulsion force and the loss force can be measured by using a simple method. In addition, since the first strain gauge to the fourth strain gauge are disposed only on the side face of the crank, the propulsion force and the loss force can be measured only on one face, and, by arranging the strain gauges on the inner face of side faces, there is no intervention with the user's foot.

In addition, a correction means that corrects a mixed-in strain component other than the strains detected by each of the detection circuits based on an output of the first detection circuit and an output of the second detection circuit may be included. By configuring as such, the influence of the strain other than a detection target included in the output of the first detection circuit or the second detection circuit can be excluded.

In addition, the first strain gauge and the second strain gauge may be disposed to be symmetrical with respect to a center axis in the longitudinal direction of the side face of the crank. By configuring as such, the rotating-direction strain can be detected with high accuracy.

In addition, the third strain gauge and the fourth strain gauge may be configured to overlap each other. By configuring as such, the size of the strain gauge arranged in the crank can be reduced.

In addition, it may be configured such that the first detection circuit and the second detection circuit are configured as bridge circuits, the first strain gauge and the second strain gauge are connected in series with a power supply in the bridge circuit configuring the first detection circuit, the third strain gauge and the fourth strain gauge are connected in series with a power supply in the bridge circuit configuring the second detection circuit, and resistors other than the first to fourth strain gauges of the bridge circuit configuring the first detection circuit and the bridge circuit configuring the second detection circuit are configured to have fixed resistance. By configuring as such, the rotating-direction strain and the inward/outward strain or the pulling-direction strain can be detected by using the bridge circuits, and accordingly, the propulsion force and the loss force can be measured by employing a simple circuit configuration.

In addition, the fixed resistance may be shared by the first detection circuit and the second detection circuit. By configuring as such, the first detection circuit and the second detection circuit can be configured substantially as one circuit, and accordingly, the circuit can be further simplified.

In addition, according to another embodiment, there is provided a measuring device including: a first strain gauge, a second strain gauge, a third strain gauge, a fourth strain gauge, a fifth strain gauge, a sixth strain gauge, a seventh strain gauge, and an eighth strain gauge that are disposed on a side face that is a face of a crank parallel to a plane including a circle defined by rotational movement of the crank of a manpower machine; a first detection circuit, to which the first strain gauge, the second strain gauge, the fifth strain gauge, and the sixth strain gauge are connected, detecting a rotating-direction strain generated in a rotating direction of the crank; and a second detection circuit, to which the third strain gauge, the fourth strain gauge, the seventh strain gauge, and the eighth strain gauge are connected, detecting at least one of an inward/outward strain generated in a direction perpendicular to the plane of the crank and a pulling-direction strain generated in a direction parallel to a longitudinal direction of the crank. The first strain gauge, the second strain gauge, the third strain gauge, and the eighth strain gauge are arranged such that detection directions are parallel to the longitudinal direction of the crank, and the fourth strain gauge, the fifth strain gauge, the sixth strain gauge, and the seventh strain gauge are arranged such that detection directions are perpendicular to the longitudinal direction of the crank. By configuring as such, a propulsion force and a loss force participating to the crank can be measured based on the rotating-direction strain detected by the first detection circuit and the inward/outward strain or the pulling-direction strain detected by the second detection circuit. Thus, the propulsion force and the loss force can be measured by using a simple method. In addition, since the first to eighth strain gauges are disposed only on the side face of the crank, the propulsion force and the loss force can be measured only on one face, and, by arranging the strain gauges on the inner face of side faces, there is no intervention with the user's foot. The first strain gauge to the fourth strain gauge are connected to the first detection circuit, and the first detection circuit detects the rotating-direction strain, and accordingly, a voltage value of the detected rotating-direction strain increases, whereby the influence of noises can be reduced.

In addition, it may be configured such that the first strain gauge and the sixth strain gauge, and the second strain gauge and the fifth strain gauge are connected to positions of opposite angles in a bridge circuit configuring the first detection circuit, and the third strain gauge and the eighth strain gauge, and the fourth strain gauge and the seventh strain gauge are connected to positions of opposite angles in a bridge circuit configuring the second detection circuit. By configuring as such, the rotating-direction strain and the inward/outward strain or the pulling-direction strain can be detected by using the bridge circuits, whereby the propulsion force and the loss force can be measured by employing a simple circuit configuration.

In addition, according to an embodiment of the present invention, there is provided a measuring method including, as processes executed by a measuring device that includes: a first strain gauge, a second strain gauge, and a third strain gauge that are disposed on a side face that is a face of a crank parallel to a plane including a circle defined by rotational movement of the crank of a manpower machine such that detection directions are disposed to be parallel to a longitudinal direction of the crank; a fourth strain gauge disposed such that a detection direction is perpendicular to the longitudinal direction of the crank; a first detection circuit, to which the first strain gauge and the second strain gauge are connected, detecting a rotating-direction strain generated in a rotating direction of the crank; and a second detection circuit, to which the third strain gauge and the fourth strain gauge are connected, detecting at least one of an inward/outward strain generated in a direction perpendicular to the plane of the crank and a pulling-direction strain generated in a direction parallel to a longitudinal direction of the crank, detecting the rotating-direction strain by using the first detection circuit, measuring the propulsion force based on the rotating-direction strain detected in the detecting of the rotating-direction strain, detecting at least one of the inward/outward strain and the pulling-direction strain by using the second detection circuit, and measuring the loss force based on at least one of the inward/outward strain and the pulling-direction strain detected in the detecting of at least one of the inward/outward strain and the pulling-direction strain. By configuring as such, a propulsion force and a loss force participating to the crank can be measured based on the rotating-direction strain detected by the first detection circuit and the inward/outward strain or the pulling-direction strain detected by the second detection circuit. Thus, the propulsion force and the loss force can be measured by using a simple method. In addition, since the first strain gauge to the fourth strain gauge are disposed only on the side face of the crank, the propulsion force and the loss force can be measured only on one face, and, by arranging the strain gauges on the inner face of side faces, there is no intervention with the user's foot.

In addition, according to another embodiment of the present invention, there is provided a measuring method including, as processes executed by a measuring device that includes: a first strain gauge, a second strain gauge, a third strain gauge, and an eighth strain gauge that are disposed on a side face that is a face of a crank parallel to a plane including a circle defined by rotational movement of the crank of the manpower machine such that detection directions are parallel to a longitudinal direction of the crank; a fourth strain gauge, a fifth strain gauge, a sixth strain gauge, and a seventh strain gauge disposed such that detection directions are perpendicular to the longitudinal direction of the crank; a first detection circuit, to which the first strain gauge, the second strain gauge, the fifth strain gauge, and the sixth strain gauge are connected, detecting a rotating-direction strain generated in a rotating direction of the crank; and a second detection circuit, to which the third strain gauge, the fourth strain gauge, the seventh strain gauge, and the eighth strain gauge are connected, detecting at least one of an inward/outward strain generated in a direction perpendicular to the plane of the crank and a pulling-direction strain generated in a direction parallel to a longitudinal direction of the crank, detecting the rotating-direction strain by using the first detection circuit, measuring the propulsion force based on the rotating-direction strain detected in the detecting of the rotating-direction strain, detecting at least one of the inward/outward strain and the pulling-direction strain by using the second detection circuit, and measuring the loss force based on at least one of the inward/outward strain and the pulling-direction strain detected in the detecting of at least one of the inward/outward strain and the pulling-direction strain. By configuring as such, a propulsion force and a loss force participating to the crank can be measured based on the rotating-direction strain detected by the first detection circuit and the inward/outward strain or the pulling-direction strain detected by the second detection circuit. Thus, the propulsion force and the loss force can be measured by using a simple method. In addition, since the first to eighth strain gauges are disposed only on the side face of the crank, the propulsion force and the loss force can be measured only on one face, and, by arranging the strain gauges on the inner face of side faces, there is no intervention with the user's foot. The first strain gauge to the fourth strain gauge are connected to the first detection circuit, and the first detection circuit detects the rotating-direction strain, and accordingly, a voltage value of the detected rotating-direction strain increases, whereby the influence of noises can be reduced.

First Embodiment

A bicycle 1 that includes a measurement module 301 as a measuring device according to a first embodiment of the present invention will be described with reference to FIGS. 1 to 8. The bicycle 1, as illustrated in FIG. 1, includes: a frame 3; a front wheel 5; a rear wheel 7; a handle 9; a saddle 11; a front fork 13; and a drive mechanism 101.

The frame 3 is configured using two truss structures. The frame 3 is rotatably connected to the rear wheel 7 in a tip end portion of the rear side. In addition, to the front side of the frame 3, the front fork 13 is rotatably connected.

The front fork 13 is connected to the handle 9. At a downward tip end position of the front fork 13, the front fork 13 and the front wheel 5 are connected to be rotatable.

The front wheel 5 includes a hub portion, a spoke portion, and a tire portion. The hub portion is connected to the front fork 13 to be rotatable. In addition, this hub portion and the tire portion are connected together by the spoke portion.

The rear wheel 7 includes: a hub portion; a spoke portion; and a tire portion. The hub portion is connected to the frame 3 to be rotatable. In addition, this hub portion and the tire portion are connected together by the spoke portion. The hub portion of the rear wheel 7 is connected to a sprocket 113 to be described later.

The bicycle 1 includes the drive mechanism 101 that converts a stepping force according to a user's (driver's) foot into a drive force of the bicycle 1. The drive mechanism 101 includes: a pedal 103; a crank mechanism 104; a chain ring 109; a chain 111; and a sprocket 113.

The pedal 103 is a part that is in contact with the user's foot for stepping. The pedal 103 is supported to be rotatable by a pedal crankshaft 115 of the crank mechanism 104.

Figure 2:
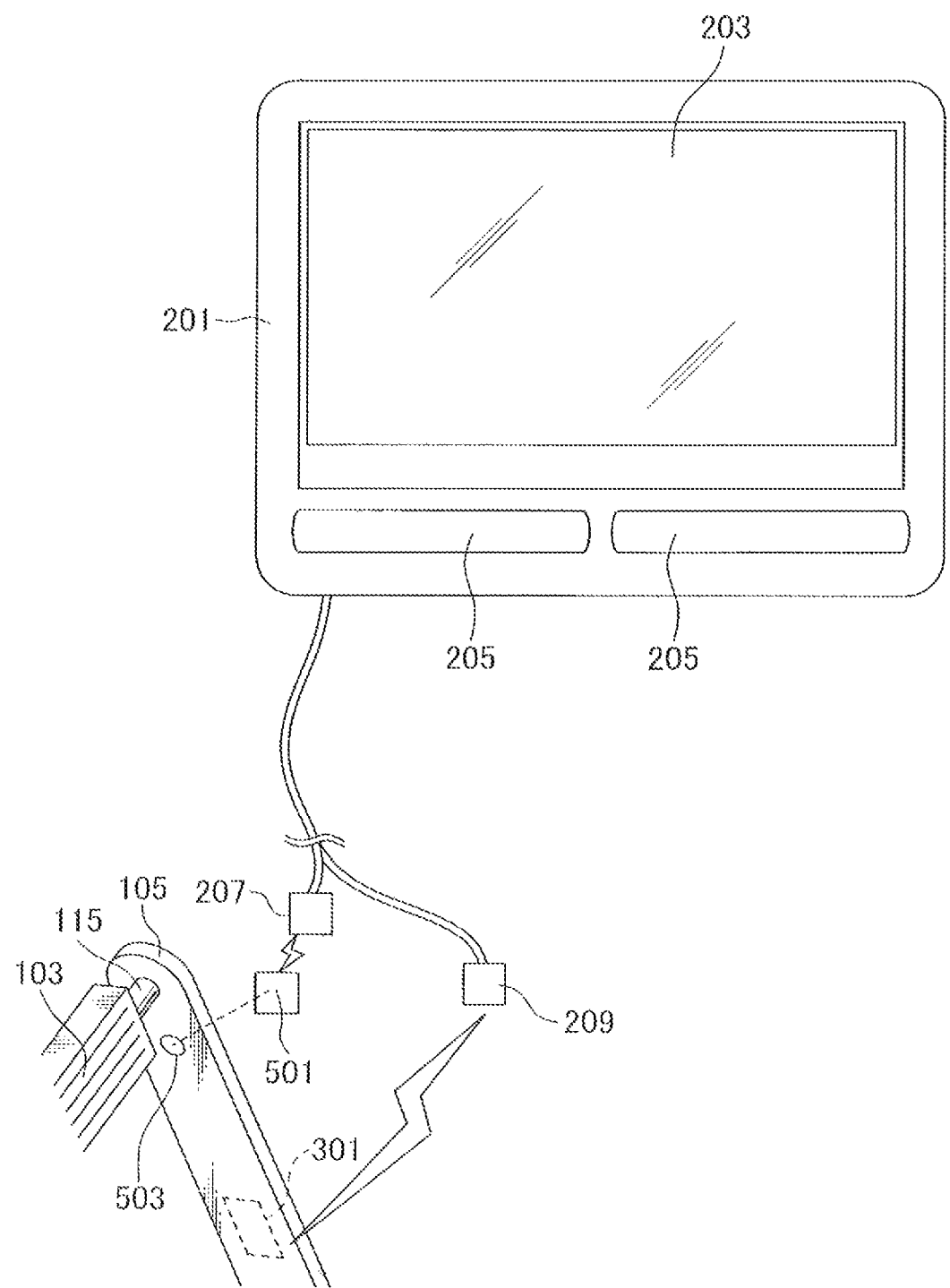
FIG. 2 is an explanatory diagram that illustrates positional relation among a cycle computer, a measurement module, and a cadence sensor illustrated in FIG. 1.
Figure 6A:
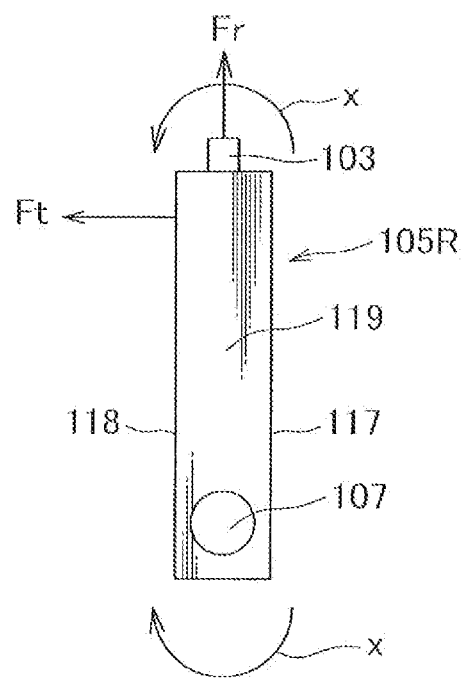
FIGS. 6A to 6C are explanatory diagrams of forces applied to a right-side crank and deformation.
Figure 6B:
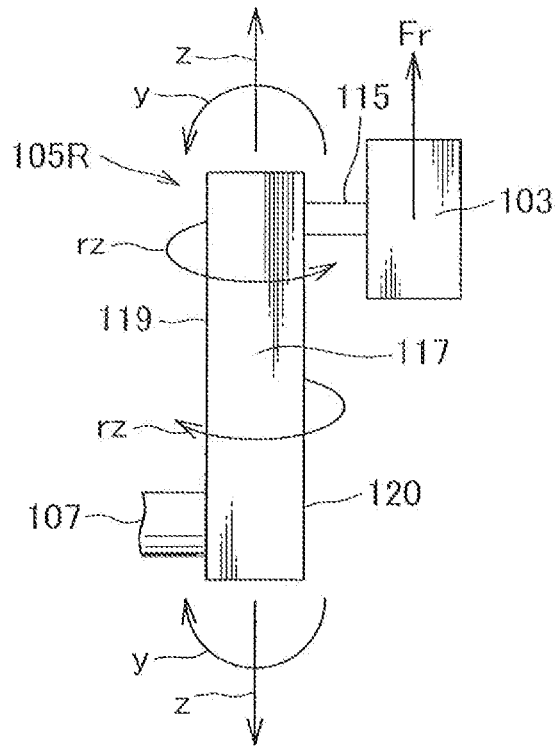
Figure 6C:
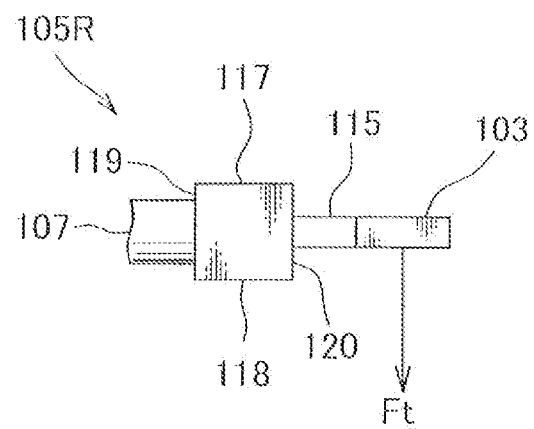
Figure 7A:
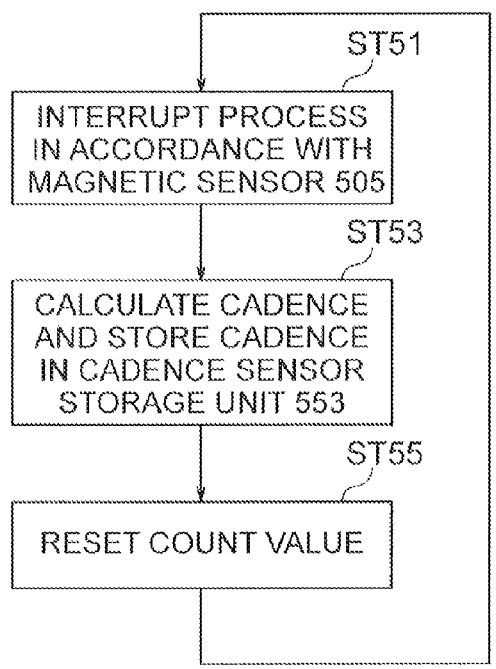
FIGS. 7A and 7B are flowcharts of processes executed by the cadence sensor illustrated in FIG. 3.
Figure 7B:
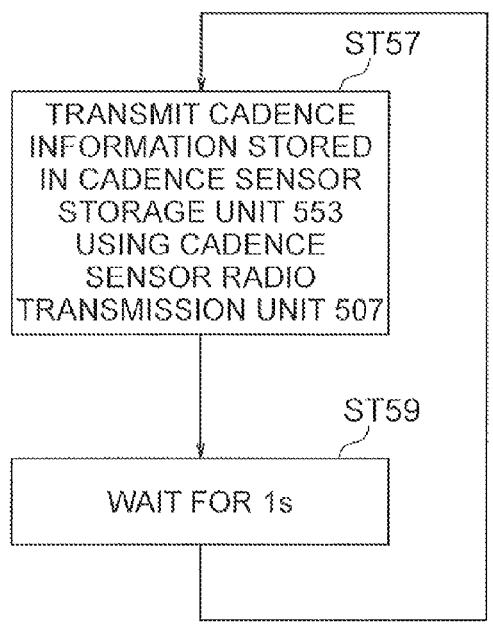

The crank mechanism 104 is configured by: a crank 105; a crankshaft 107; and the pedal crankshaft 115 (see FIGS. 2 and 6C).

The crankshaft 107 passes through the frame 3 in the horizontal direction (one of side faces of the bicycle to the other). The crankshaft 107 is supported to be rotatable by the frame 3.

The crank 105 is disposed to be perpendicular to the crankshaft 107. One end portion of the crank 105 is connected to the crankshaft 107.

The pedal crankshaft 115 is disposed to be perpendicular to the crank 105. The axial direction of the pedal crankshaft 115 is the same as that of the crankshaft 107. The pedal crankshaft 115 is connected to the other end portion of the crank 105.

The crank mechanism 104 also includes such a structure on a side opposite to the side face of the bicycle 1. In other words, the crank mechanism 104 includes two cranks 105 and two pedal crankshafts 115. Accordingly, the pedals 103 are arranged on both side faces of the bicycle 1.

In a case where such parts need to be identified whether it is present on the right side or the left side of the bicycle 1, the parts will be described as a right-side crank 105R, a left-side crank 105L, a right-side pedal crankshaft 115R, a left-side pedal crankshaft 115L, a right-side pedal 103R, and a left-side pedal 103L.

In addition, the right-side crank 105R and the left-side crank 105L are connected to extend in opposite directions with the crankshaft 107 being as the center. The right-side pedal crankshaft 115R, the crankshaft 107, and the left-side pedal crankshaft 115L are formed to be parallel to each other on the same plane. The right-side crank 105R and the left-side crank 105L are formed to be parallel to each other on the same plane.

The chain ring 109 is connected to the crankshaft 107. The chain ring 109 is preferably configured by a variable gear that can change the gear ratio. In addition, a chain 111 is engaged with the chain ring 109.

The chain 111 is engaged with the chain ring 109 and the sprocket 113. The sprocket 113 is connected to the rear wheel 7. The sprocket 113 is preferably configured by a variable gear.

The bicycle 1 converts the user's stepping force into the rotating force of the rear wheel by using such a drive mechanism 101.

The bicycle 1 includes: the cycle computer 201; the measurement module 301; and a cadence sensor 501.

The cycle computer 201 is arranged in the handle 9. The cycle computer 201, as illustrated in FIG. 2, includes a cycle computer display unit 203 that displays various kinds of information and a cycle computer operation unit 205 that receives a user's operation.

The various kinds of information displayed on the cycle computer display unit 203 includes the speed of the bicycle 1, positional information, a distance up to the destination, a predicted arrival time for the destination, a traveling distance after departure, an elapse time after departure, a propulsion force, a loss force, and the like.

Here, the propulsion power is the magnitude of a force participating in the rotating direction of the crank 105. In addition, the loss force is the magnitude of a force participating in a direction difference from the rotating direction of the crank 105. The force participating in the direction different from the rotating direction is a useless force not participating to the driving of the bicycle 1 at all. Thus, by increasing the propulsion force as much as possible and decreasing the loss force as much as possible, the user can drive the bicycle 1 more efficiently.

While the cycle computer operation unit 205 is illustrated as a button in FIG. 2, the cycle computer operation unit 205 is not limited thereto but may be any one of various input means such as a touch panel and the like, or a plurality of inputting means may be used together.

In addition, the cycle computer 201 includes: a cycle computer cadence radio reception unit 207 and a cycle computer radio reception unit 209. The cycle computer cadence radio reception unit 207 and the cycle computer radio reception unit 209 are connected to a main body portion of the cycle computer 201 through wirings. Here, the cycle computer cadence radio reception unit 207 and the cycle computer radio reception unit 209 do not need to have only a reception function. For example, a function as a transmission unit may be included therein. Hereinafter, a device described as a transmission unit or a reception unit may have both the reception function and the transmission function.

Figure 3:
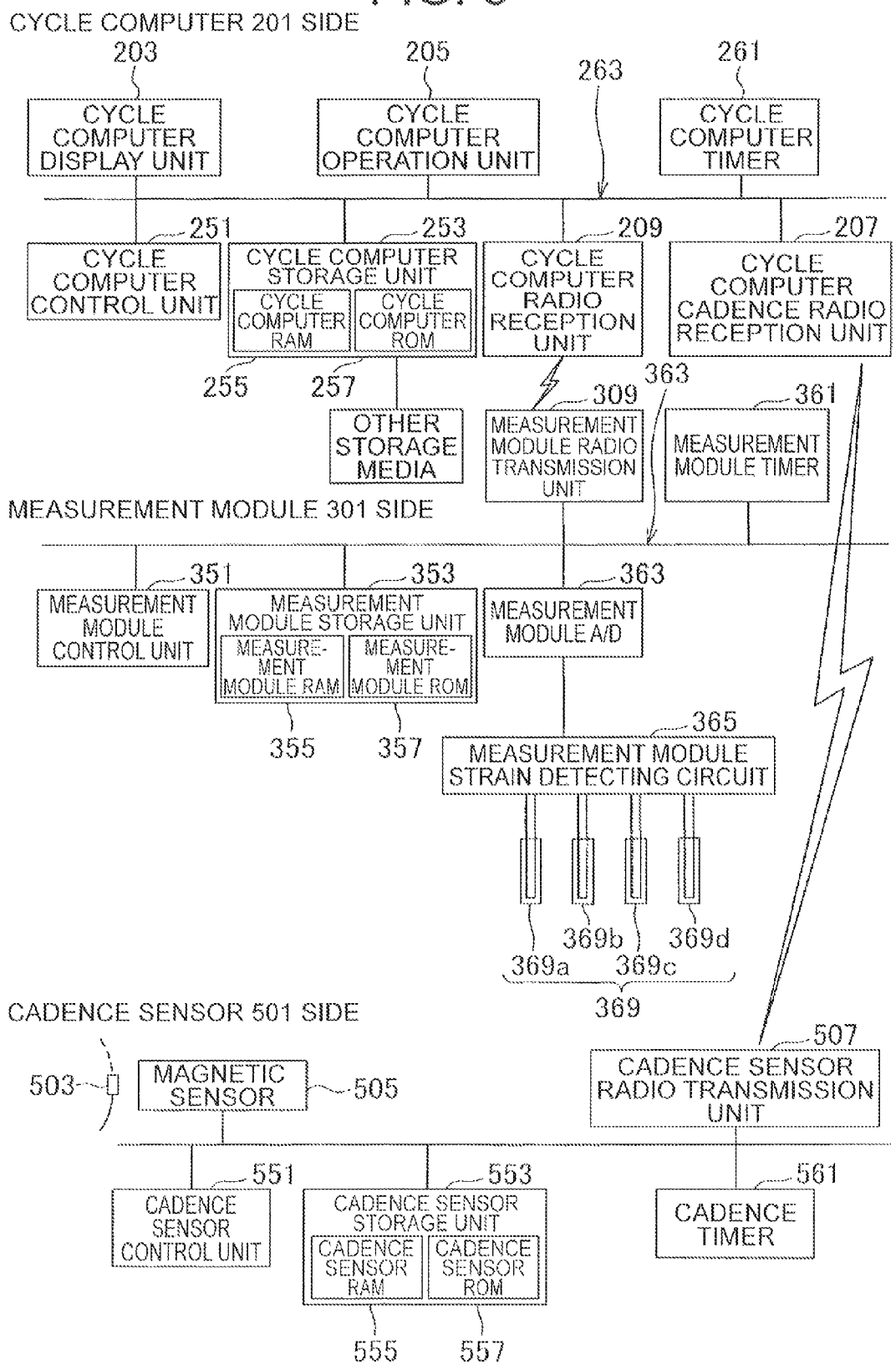
FIG. 3 is a block configuration diagram of the cycle computer, the measurement module, and the cadence sensor illustrated in FIG. 1.

The cadence sensor 501 includes a magnetic sensor 505 that detects an approach of a magnet 503 disposed in the crank 105 (see FIG. 3). The magnetic sensor 505 is in the ON state according to the approaching magnet 503, thereby detecting the position of the magnet 503. In other words, when the magnetic sensor 505 is in the ON state, the crank 105 is also present at a position at which the magnetic sensor 505 is present. The cycle computer 201 can acquire cadence [rpm] from this cadence sensor 501.

The measurement module 301 is disposed on the inner face of the crank 105 and detects manpower applied to the pedal 103 by the user by using a strain gauge 369 (see FIGS. 3 and 4) that is configured by a plurality of strain gauges. More specifically, a propulsion force serving as a drive force of the bicycle 1 that is the rotational force of the crank 105 and a loss force that is a force applied in a direction different from the rotating direction are calculated.

FIG. 3 is a block diagram of the cycle computer 201, the measurement module 301, and the cadence sensor 501.

First, the block configuration of the cadence sensor 501 will be described. The cadence sensor 501 includes: a magnetic sensor 505; a cadence sensor radio transmission unit 507; a cadence sensor control unit 551; a cadence sensor storage unit 553; and a cadence sensor timer 561.

The magnetic sensor 505 is switched to be ON/OFF as the magnet 503 approaches. Then, when the magnetic sensor 505 becomes the ON state, the magnetic sensor 505 outputs an information signal representing an indication thereof to the cadence sensor control unit 551.

The cadence sensor radio transmission unit 507 transmits cadence information stored in the cadence sensor storage unit 553 to the cycle computer cadence radio reception unit 207. The transmission executed by the cadence sensor radio transmission unit 507 is executed, for example, once every second according to an instruction made by the cadence sensor timer 561. Alternatively, it may be configured such that a determination that is based on a value of the cadence sensor timer 561 is made by the cadence sensor control unit 551, and transmission executed by the cadence sensor radio transmission unit 507 is executed according to an instruction made by the cadence sensor control unit 551 based on the determination.

The cadence sensor control unit 551 controls the cadence sensor 501 comprehensively. When an output of an information signal indicating that the magnetic sensor 505 becomes ON is received, the cadence sensor control unit 551 executes the following operation. The cadence sensor control unit 551 instructs the cadence sensor timer 561 to output timer value information. Then, when the timer value information is received from the cadence sensor timer 561, the cadence sensor control unit 551 calculates a cadence based on the timer value information. More specifically, by multiplying a count value C of the timer value information by one count interval T, a time (period) [seconds] at which the magnetic sensor 505 is in the ON state is calculated. Then, by dividing 60 by this period, a cadence [rpm] is calculated.

In addition, the cadence sensor control unit 551 stores the cadence information in a cadence sensor RAM 555 (to be described later) of the cadence sensor storage unit 553. Furthermore, the cadence sensor control unit 551 outputs a reset instruction of the counter value to the cadence sensor timer 561. The cadence sensor control unit 551, for example, at the interval of one second, may be configured to transmit the cadence information stored in the cadence sensor storage unit 553 to the cadence sensor radio transmission unit 507.

In the cadence sensor storage unit 553, various kinds of information is stored. Here, the various kinds of information, for example, is a control program of the cadence sensor control unit 551 and temporary information that is necessary for the control processes executed by the cadence sensor control unit 551. Particularly, in this embodiment, the timer value of the cadence sensor timer 561 that is an interval at which the magnetic sensor 505 becomes ON is stored. The cadence sensor storage unit 553 is configured by a cadence sensor RAM 555 and a cadence sensor ROM 557. The timer value and the like are stored in the cadence sensor RAM 555, and the control program and the like are stored in the cadence sensor ROM 557.

The cadence sensor timer 561 is a timer counter and constantly counts a clock having a predetermined period. When a value output instruction is received from the cadence sensor control unit 551, the cadence sensor timer 561 outputs the timer value information to the cadence sensor control unit 551. In addition, when a reset instruction is received from the cadence sensor control unit 551, the cadence sensor timer 561 resets the value of the timer counter to an initial value. Furthermore, the cadence sensor timer 561 also has a role for giving an instruction of transmission timing to the cadence sensor radio transmission unit 507. More specifically, for example, once every second, the cadence sensor timer 561 gives an instruction of transmission timing to the cadence sensor radio transmission unit 507.

Next, the block configuration of the measurement module 301 will be described. The measurement module 301, as illustrated in FIG. 3, includes: a measurement module radio transmission unit 309; a measurement module timer 361; a measurement module control unit 351; a measurement module storage unit 353; a measurement module A/D 363; a measurement module strain detecting circuit 365; and a strain gauge 369.

The measurement module radio transmission unit 309 transmits information of the propulsion force and the loss force calculated by the measurement module control unit 351 based on the strain information to the cycle computer radio reception unit 209. The transmission executed by this measurement module radio transmission unit 309 is executed, for example, once every second in accordance with an instruction from the measurement module timer 361. Alternatively, the transmission may be executed in accordance with an output of an instruction from the measurement module control unit 351 that is based on the value of the measurement module timer 361.

The measurement module timer 361 is a timer counter and counts a clock having a predetermined period. In addition, the measurement module timer 361 also as a role for giving an instruction of transmission timing to the measurement module radio transmission unit 309. More specifically, for example, once every second, the measurement module timer 361 gives an instruction of transmission timing to the measurement module radio transmission unit 309.

The measurement module control unit 351 comprehensively controls the measurement module 301. The measurement module control unit 351 calculates a propulsion force and a loss force based on the strain information. The calculation method thereof will be described later.

In the measurement module storage unit 353, various kinds of information is stored. Here, the various kinds of information, for example, is a control program of the measurement module control unit 351 and temporary information that is necessary for the control process executed by the measurement module control unit 351. Particularly, in this embodiment, the strain information is stored. The measurement module storage unit 353 is configured by a measurement module RAM 355 and a measurement module ROM 357. The strain information and the like are stored in the measurement module RAM 355. In the measurement module ROM 357, the control program, various parameters and constants used for calculating the propulsion force and the loss force based on the strain information, and the like are stored.

The strain gauge 369 is bonded to the crank 105 so as to be integrated together. The strain gauge 369 is configured by a first strain gauge 369a, a second strain gauge 369b, a third strain gauge 369c, and a fourth strain gauge 369d. The terminals of the strain gauges 369 are connected to the measurement module strain detecting circuit 365.

Figure 4:
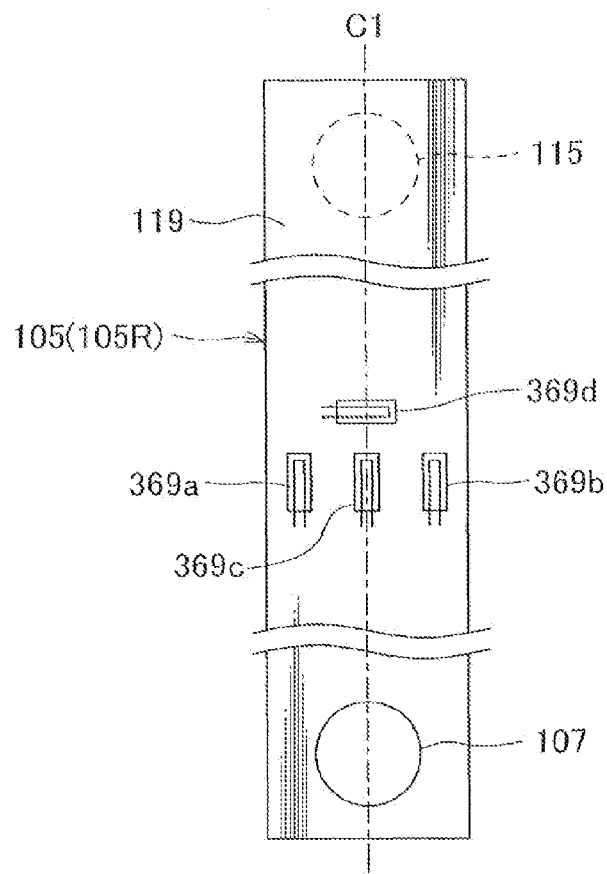
FIG. 4 is an explanatory diagram of the arrangement of a strain gauge illustrated in FIG. 3 in a crank.

FIG. 4 illustrates the arrangement of the strain gauge 369 in the crank 105 in this embodiment. The strain gauge 369 is bonded to the inner face 119 of the crank 105. Here, the inner face of the crank 105 is a face on which the crankshaft 107 is disposed to project (connected) and is a face (side face) parallel to a plane including a circle that is defined by the rotational movement of the crank 105. In addition, while not illustrated in FIG. 4, the outer face 120 of the crank 105 is a face, on which the pedal crankshaft 115 is disposed to project (connected), facing the inner face 119. In other words, the outer face is a face on which the pedal 103 is disposed to be freely rotatable. An upper face 117 of the crank 105 has the longitudinal direction extending in the same direction as those of the inner face 119 and the outer face 120 and is one of faces orthogonal to the inner face 119 and the outer face 120. A lower face 118 of the crank 105 is a face that faces the upper face 117.

The first strain gauge 369a and the second strain gauge 369b are disposed such that the detection direction is parallel to the longitudinal direction of the crank 105, in other words, parallel to a center axis C1 of the inner face 119 and is symmetrical with respect to the center axis C1 of the inner face 119. The third strain gauge 369c is disposed on the center axis C1 and is disposed such that the detection direction is parallel to the center axis C1 and is interposed between the first strain gauge 369a and the second strain gauge 369b. The fourth strain gauge 369d is disposed such that the detection direction is perpendicular to the longitudinal direction of the crank 105, in other words, perpendicular to the center axis C1 of the inner face 119 and is disposed on the center axis C1.

In other words, a direction (the vertical direction in FIG. 4) parallel to the center axis C1 that is an axis extending in the longitudinal direction of the crank 105, in other words, a direction parallel to the longitudinal direction of the crank 105 is the detection direction of each of the first strain gauge 369a, the second strain gauge 369b, and the third strain gauge 369c, and a direction (the horizontal direction in FIG. 4) perpendicular to the center axis C1, in other words, a direction perpendicular to the longitudinal direction of the crank 105 is the detection direction of the fourth strain gauge 369d. Accordingly, the detection directions of the first strain gauge 369a to the third strain gauge 369c and the detection direction of the fourth strain gauge 369d are orthogonal to each other.

The arrangement of the first strain gauge 369a to the fourth strain gauge 369d is not limited to that illustrated in FIG. 4. In other words, any other arrangement may be employed as long as the parallel or perpendicular relation with the center axis C1 is maintained. However, it is preferable to arrange the first strain gauge 369a and the second strain gauge 369b to be symmetrical to each other with the center axis C1 being interposed therebetween and arrange the third strain gauge 369c and the fourth strain gauge 369d on the center axis C1 for detecting each deformation to be described later with high accuracy.

In the case illustrated in FIG. 4, while the crank 105 is described as a simple rectangular parallelepiped, according to a design or the like, the corner may be rounded, and some faces thereof may be configured as curved faces. Even in such a case, by arranging the strain gauge 369 such that the arrangement described above is maintained as much as possible, each deformation to be described later can be detected. However, as the relation (parallel or perpendicular) with the center axis C1 described above is out of alignment, the detection accuracy decreases.

The first strain gauge 369a, the second strain gauge 369b, the third strain gauge 369c, and the fourth strain gauge 369d are connected to the measurement module strain detecting circuit 365, and the strain amount of the strain gauge 369 is output as a voltage. The output of the measurement module strain detecting circuit 365 is converted from analog information into strain information that is digital information by a measurement module A/D 363. Then, a strain information signal is output to the measurement module storage unit 353. The strain information signal input to the measurement module storage unit 353 is stored in the measurement module RAM 355 as the strain information.

Figure 5:
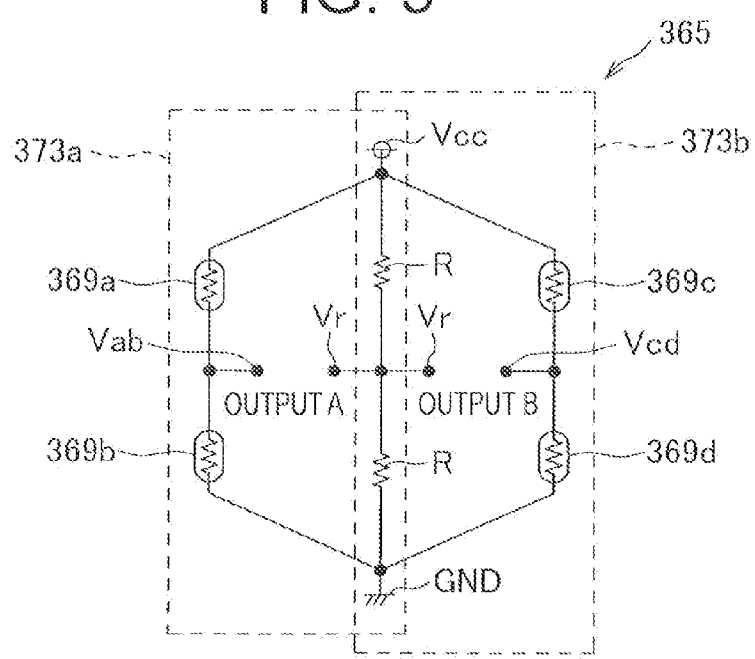
FIG. 5 is a circuit diagram of a measurement module strain detecting circuit illustrated in FIG. 3.

The measurement module strain detecting circuit 365 is illustrated in FIG. 5. The measurement module strain detecting circuit 365 is configured by a first detection circuit 373a and a second detection circuit 373b that are two bridge circuits. On a first system side of the first detection circuit 373a, the first strain gauge 369a and the second strain gauge 369b are sequentially connected in order from a power supply Vcc. In other words, the first strain gauge 369a and the second strain gauge 369b are connected in series with the power supply Vcc. On a second system side, a fixed resistance R and a fixed resistance R are sequentially connected in order from the power supply Vcc. On a first system side of the second detection circuit 373b, the third strain gauge 369c and the fourth strain gauge 369d are sequentially connected in order from the power supply Vcc. In other words, the third strain gauge 369c and the fourth strain gauge 369d are connected in series with the power supply Vcc. On a second system side, a fixed resistance R and a fixed resistance R are sequentially connected in order from the power supply Vcc.

In other words, the two fixed resistances R are shared by the first detection circuit 373a and the second detection circuit 373b. Here, the two fixed resistance R has a same resistance value. In addition, the two fixed resistances R have the same resistance value as that of the strain gauge 369 before the occurrence of compression or expansion. Furthermore, the first strain gauge 369a to the fourth strain gauge 369d have the same resistance value.

As is known, the resistance value of the strain gauge 369 has a decreased resistance value in the case of compression and has an increased resistance value in the case of expansion. Such a change in the resistance value has a proportional relation in a case where the amount of the change is small. In addition, the detection direction of the strain gauge 369 is a direction in which the wiring grows, and, as described above, the detection direction of the first strain gauge 369a, the second strain gauge 369b, and the third strain gauge 369c is the direction parallel to the center axis C1, and the detection direction of the fourth strain gauge 369d is the direction perpendicular to the center axis C1. In a case where compression or expansion occurs in a direction other than the detection directions, a change in the resistance value of the strain gauge 369 does not occur.

In the first detection circuit 373a using the strain gauge 369 having such characteristics, in a case where the first strain gauge 369a and the second strain gauge 369b are not compressed or expanded in the detection direction, an electric potential difference between electric potential Vab between the first strain gauge 369a and the second strain gauge 369b and electric potential Vr between the two fixed resistances R is almost zero.

In a case where the first strain gauge 369a is compressed, and the second strain gauge 369b is expanded, since the resistance value of the first strain gauge 369a is decreased, and the resistance value of the second strain gauge 369b is increased, the electric potential Vab increases, but the electric potential Vr does not change. In other words, an electric potential difference between the electric potential Vab and the electric potential Vr occurs. In a case where the first strain gauge 369a is expanded, and the second strain gauge 369b is compressed, since the resistance value of the first strain gauge 369a is increased, and the resistance value of the second strain gauge 369b is decreased, the electric potential Vab decreases, but the electric potential Vr does not change. In other words, an electric potential difference between the electric potential Vab and the electric potential Vr occurs.

In a case where both the first strain gauge 369a and the second strain gauge 369b are compressed, since the resistance values of both the first strain gauge 369a and the second strain gauge 369b are decreased, the electric potential difference between the electric potential Vab and the electric potential Vr is almost zero. In a case where both the first strain gauge 369a and the second strain gauge 369b are expanded, since the resistance values of both the first strain gauge 369a and the second strain gauge 369b are increased, the electric potential difference between the electric potential Vab and the electric potential Vr is almost zero.

The operation of the second detection circuit 373b is similar to that of the first detection circuit 373a. In other words, in a case where the third strain gauge 369c is compressed, and the fourth strain gauge 369d is expanded, the electric potential Vcd increases, but the electric potential Vr decreases, whereby an electric potential difference between the electric potential Vcd and the electric potential Vr occurs. In a case where the third strain gauge 369c is expanded, and the fourth strain gauge 369d is compressed, the electric potential Vcd decreases, but the electric potential Vr increases, whereby an electric potential difference between the electric potential Vcd and the electric potential Vr occurs. In a case where both the third strain gauge 369c and the fourth strain gauge 369d are compressed and in a case where both the third strain gauge 369c and the fourth strain gauge 369d are expanded, the electric potential difference between the electric potential Vcd and the electric potential Vr is almost zero.

Thus, a connection point between the first strain gauge 369a and the second strain gauge 369b at which the electric potential Vab of the first detection circuit 373a can be measured and a connection point between the two fixed resistances R at which the electric potential Vr can be measured are configured as an output (hereinafter referred to as an output A) of the first detection circuit 373a. In addition, a connection point between the third strain gauge 369c and the fourth strain gauge 369d at which the electric potential Vcd of the second detection circuit 373b can be measured and the connection point between the two fixed resistances R at which the electric potential Vr can be measured are configured as an output (hereinafter referred to as an output B) of the second detection circuit 373b. The outputs A and B configure the strain information.

FIGS. 6A to 6C illustrate a deformed state of the right-side crank 105R when a force (stepping force) is added by a user. FIG. 6A is a plan view seen from the upper face 117 of the right crank 105R, FIG. 6B is a plan view seen from the inner face 119 of the right-side crank 105R, and FIG. 6C is a plan view seen from the end portion of the crankshaft 107 side of the right-side crank 105R. In description presented hereinafter, while the right-side crank 105R will be described, the left-side crank 105L is similarly operated.

When the stepping force is added from the user's foot through the pedal 103, the stepping force is divided into a propulsion force Ft that is a tangential-direction force of the rotation of the crank 105 that becomes a rotating force of the crank 105 and a loss force Fr that is a normal-line direction force of the rotation of the crank 105. At this time, in the right-side crank 105R, deformed states of a bending deformation x, a bending deformation y, a tensile deformation z, and a torsional deformation rz are formed.

The bending deformation x, as illustrated in FIG. 6A, is a deformation of the right-side crank 105R bending from the upper face 117 toward the lower face 118 or from the lower face 118 toward the upper face 117 and is a deformation that occurs according to the propulsion force Ft. In other words, a strain (a strain generating in the rotating direction of the crank 105) according to the deformation occurring in the rotating direction of the crank 105 is detected, and, by detecting the bending deformation x, a rotating-direction strain generated in the crank 105 can be detected according to the detection of the bending deformation. The bending deformation y, as illustrated in FIG. 6B, is a deformation of the right-side crank 105R bending from the outer face 120 toward the inner face 119 or from the inner face 119 toward the outer face 120 and is a deformation that occurs according to the loss force Fr. In other words, a strain (a strain generating in a direction perpendicular to a plane including a circle defined by the rotational movement of the right-side crank 105R) according to the deformation occurring from the outer face 120 of the crank 105 toward the inner face 119 or from the inner face 119 toward the outer face 120 is detected, and, by detecting the bending deformation y, an inward/outward strain generated in the crank 105 can be detected.

The tensile deformation z deforms the right-side crank 105R to be expanded or compressed in the longitudinal direction and is a deformation occurring according to the loss force Fr. In other words, a strain (a strain generated in a direction parallel to the longitudinal direction) according to a deformation occurring in a direction in which the crank 105 is expanded or compressed in the longitudinal direction is detected, and, by detecting the tensile deformation z, a tensile-direction strain generated in the crank 105 can be detected. The torsional deformation rz deforms the right-side crank 105R to be twisted and is a deformation occurring according to the propulsion force Ft. In other words, a strain according to the deformation occurring in a direction twisting the crank 105 is detected, and a twisting-direction strain generated in the crank 105 can be detected by detecting the torsional deformation rz. In FIGS. 6A to 6C, while the directions of the bending deformation x, the bending deformation y, the tensile deformation z, the torsional deformation rz are denoted by arrows, as described above, there are cases where each deformation occurs in a direction opposite to that denoted by each arrow.

Thus, in order to measure the propulsion force Ft, one of the bending deformation x and the torsional deformation rz may be quantitatively detected, and, in order the measure the loss force Fr, one of the bending deformation y and the tensile deformation z may be quantitatively detected.

Here, in the case of the arrangement as illustrated in FIG. 4, a method for detecting (measuring) the bending deformation x, the bending deformation y, the tensile deformation z, and the torsional deformation rz by using the measurement module strain detecting circuit 365 to which the first strain gauge 369a, the second strain gauge 369b, the third strain gauge 369c, and the fourth strain gauge 369d are connected as illustrated in FIG. 5 will be described.

First, how each deformation is detected (measured) in the output A of the first detection circuit 373a will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369a is compressed and thus has a decreased resistance value, and the second strain gauge 369b is expanded and thus has an increased resistance value. For this reason, the output A of the first detection circuit 373a is a positive output (the electric potential Vab is high, and the electric potential Vr is low). In addition, in a case where the right-side crank 105R is deformed from the lower face 118 toward the upper face 117, the first strain gauge 369a is expanded and has an increased resistance value, and the second strain gauge 369b is compressed and has a decreased resistance value. Accordingly, the output A of the first detection circuit 373a is a negative output (the electric potential Vab is low, and the electric potential Vr is high).

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369a and the second strain gauge 369b are compressed, and thus any one thereof has a decreased resistance value. For this reason, the output A of the first detection circuit 373a is zero (there is no electric potential difference between the electric potential Vab and the electric potential Vr). On the other hand, in a case where the right-side crank 105R is deformed from the inner face 119 toward the outer face 120, both the first strain gauge 369a and the second strain gauge 369b are expanded, and thus any one thereof has an increased resistance value. Accordingly, the output A of the first detection circuit 373a is zero.

In the tensile deformation z, the right-side crank 105R is deformed to be expanded or compressed in the longitudinal direction. In a case where the right-side crank 105R is expanded, both the first strain gauge 369a and the second strain gauge 369b are expanded, and thus, any one thereof has an increased resistance value. For this reason, the output A of the first detection circuit 373a is zero. On the other hand, in a case where the right-side crank 105R is compressed, both the first strain gauge 369a and the second strain gauge 369b are compressed, and thus, any one thereof has a decreased resistance value. For this reason, the output A of the first detection circuit 373a is zero.

In the torsional deformation rz, the right-side crank 105R is deformed to be twisted. In a case where the right-side crank 105R is twisted in a direction denoted by an arrow illustrated in FIG. 6B, both the first strain gauge 369a and the second strain gauge 369b are expanded, and thus any one thereof has an increased resistance value. For this reason, the output A of the first detection circuit 373a is zero. On the other hand, in a case where the right-side crank 105R is twisted in a direction opposite to that of the arrow illustrated in FIG. 6B, both the first strain gauge 369a and the second strain gauge 369b are expanded, and thus any one thereof has an increased resistance value. For this reason, the output A of the first detection circuit 373a is zero.

As above, only the bending deformation x is detected from the output A. In other words, the first strain gauge 369a and the second strain gauge 369b are connected to the first detection circuit 373a, and the first detection circuit 373a detects a rotating-direction strain generated in the crank 105.

Next, how each deformation is detected (measured) in the output B of the second detection circuit 373b will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the third strain gauge 369c and the fourth strain gauge 369d are only bent, and there is neither compression nor expansion in the detection direction, and accordingly, the resistance value does not change. For this reason, the output B of the second detection circuit 373b is zero. On the other hand, in a case where the right-side crank 105R is deformed from the lower face 118 toward the upper face 117, the third strain gauge 369c and the fourth strain gauge 369d are only bent, and there is neither compression nor expansion in the detection direction, and accordingly, the resistance value does not change. For this reason, the output B of the second detection circuit 373b is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, the third strain gauge 369c is compressed and thus has a decreased resistance value, and the fourth strain gauge 369d is expanded and thus has an increased resistance value. For this reason, the output B of the second detection circuit 373b is a positive output (the electric potential Vcd is high, and the electric potential Vr is low). On the other hand, in a case where the right-side crank 105R is deformed from the inner face 119 toward the outer face 120, the third strain gauge 369c is expanded and thus has an increased resistance value, and the fourth strain gauge 369d is compressed and thus has a decreased resistance value. For this reason, the output B of the second detection circuit 373b is a negative output (the electric potential Vcd is low, and the electric potential Vr is high).

In the tensile deformation z, the right-side crank 105R is deformed to be expanded or compressed in the longitudinal direction. In a case where the right-side crank 105R is expanded, the third strain gauge 369c is expanded and thus has an increased resistance value, and the fourth strain gauge 369d is compressed and thus has a decreased resistance value. For this reason, the output B of the second detection circuit 373b is a negative output. On the other hand, in case where the right-side crank 105R is compressed, the third strain gauge 369c is compressed and thus has a decreased resistance value, and the fourth strain gauge 369d is expanded and thus has an increased resistance value. For this reason, the output B of the second detection circuit 373b is a positive output.

In the torsional deformation rz, the right-side crank 105R is deformed to be twisted. In a case where the right-side crank 105R is twisted in the direction denoted by the arrow illustrated in FIG. 6B, the third strain gauge 369c is expanded and thus has an increased resistance value, and the fourth strain gauge 369d is not deformed in the detection direction and thus there is no change in the resistance value. For this reason, the output B of the second detection circuit 373b is a negative output. On the other hand, in a case where the right-side crank 105R is twisted in a direction opposite to the direction denoted by the arrow illustrated in FIG. 6B, the third strain gauge 369c is expanded and thus has an increased resistance value, and the fourth strain gauge 369d is not deformed in the detection direction and thus there is no change in the resistance value. For this reason, the output B of the second detection circuit 373b is a negative output.

As above, the bending deformation y, the tensile deformation z, and the torsional deformation rz are detected from the output B. In other words, the third strain gauge 369c and the fourth strain gauge 369d are connected to the second detection circuit 373b, and the second detection circuit 373b detects an inward/outward strain or a pulling-direction strain generated in the crank 105.

Then, based on the output A of the first detection circuit 373a and the output B of the second detection circuit 373b, the propulsion force Ft is calculated using the following Equation (1), and the loss force Fr is calculated by using the following Equation (2). Here, compared to the bending deformation y, the tensile deformation z is relatively small and is negligible.

$$Ft = p(A-A0) + q(B-B0) \, [kgf] \quad (1)$$

$$Fr = s|A-A0| + u(B-B0) \, [kgf] \quad (2)$$

Here, A denotes an output A value at a time point when the propulsion force Ft (or the loss force Fr) is calculated, A0 denotes an output A value at the time of no load, B denotes an output B value at the time point when the propulsion force Ft (or the loss force Fr) is calculated, B0 is an output B value at the time of no load, and p, q, s, u are coefficients and are values calculated by simultaneous equations of the following Equations (3) to (6).

$$m = p(Am-A0) + q(Be-B0) \quad (3)$$

$$0 = s(Am-A0) + u(Be-B0) \quad (4)$$

$$0 = p(Ae-A0) + q(Bm-B0) \quad (5)$$

$$m = s(Ae-A0) + u(Bm-B0) \quad (6)$$

Here, Am is an output A value when the pedal 103 is loaded with m [kg] in a state in which the angle of the crank 105 represents a horizontal forward direction (a state being horizontal to the crank 105 and extending in the front wheel 5 direction). Be is an output B value when the pedal 103 is loaded with m [kg] in a state in which the angle of the crank 105 represents a horizontal forward direction. Ae is an output A value when the pedal 103 is loaded with m [kg] in a state in which the angle of the crank 105 represents a vertical downward direction (a state being vertical to the crank 105 and extending in the ground direction). Bm is an output B value when the pedal 103 is loaded with m [kg] in a state in which the angle of the crank 105 represents the vertical downward direction.

Since the coefficients p, q, s, and u and A0 and B0 are values that can be calculated in advance or can be measured, by substituting A and B in Equation (1), the propulsion force Ft can be calculated.

In addition, in Equation (1), the output A is corrected by using the output B. In Equation (2), the output B is corrected by using the output A. In other words, the measurement module control unit 351 executing calculation of each equation to be described later serves as a correction means. Accordingly, the influence of the strain other than the detection target included in the first detection circuit 373a or the second detection circuit 373b can be excluded. In addition, in a case where there is no deviation of the first strain gauge 369a and the second strain gauge 369b from the crank direction (a direction parallel to the center axis C1), Ae=A0, and the correction according to the output B is not necessary.

Next, the block configuration of the cycle computer 201 will be described. The cycle computer 201, as illustrated in FIG. 3, includes: a cycle computer display unit 203; a cycle computer operation unit 205; a cycle computer cadence radio reception unit 207; a cycle computer radio reception unit 209; a cycle computer timer 261; a cycle computer storage unit 253; and a cycle computer control unit 251.

The cycle computer display unit 203 displays various kinds of information based on a user's instruction or the like. In this embodiment, the cycle computer display unit 203 visualizes the propulsion force and the loss force to be displayed. Here, a method of the visualization may be any arbitrary method. The visualization method used in the cycle computer display unit 203, for example, may be any one of a vector display, a graph display, a classified display, a symbol display, and a three-dimensional display. In addition, the display method may be a combination thereof or the like.

The cycle computer operation unit 205 receives a user's instruction (input). For example, the cycle computer operation unit 205 receives an instruction of a display content to be displayed on the cycle computer display unit 203 from the user.

The cycle computer cadence radio reception unit 207 receives cadence information transmitted from the cadence sensor 501.

The cycle computer radio reception unit 209 receives the information of the propulsion force and the loss force that is transmitted from the measurement module 301.

The cycle computer timer 261 is a timer counter and counts timer. This timer value information generated by the cycle computer timer 261 is used in various manners by the cycle computer control unit 251 and the like.

In the cycle computer storage unit 253, various kinds of information is stored. Here, the various information, for example, is a control program of the cycle computer control unit 251 and temporary information that is necessary when a control process is executed by the cycle computer control unit 251. The cycle computer storage unit 253 is configured by a cycle computer RAM 255 and a cycle computer ROM 257. In the cycle computer ROM 257, the control program and various parameters used for converting the propulsion force and the loss force into data for visual display on the cycle computer display unit 203, constants, and the like are stored.

The cycle computer control unit 251 comprehensively controls the cycle computer 201. In addition, the cycle computer control unit 251 may be configured to control the cadence sensor 501 and the measurement module 301 comprehensively. The cycle computer control unit 251 converts the propulsion force and the loss force into data for visual display on the cycle computer display unit 203.

Next, the process executed by the cadence sensor 501 and the process executed by the measurement module 301 and the cycle computer 201 will be described with reference to FIGS. 7A to 8C.

First, the process executed by the cadence sensor 501 will be described. In Step ST51, the cadence sensor control unit 551 of the cadence sensor 501 detects a change of the magnetic sensor 505 to ON. Then, when the change of the magnetic sensor 505 is detected, the cadence sensor control unit 551 interrupts the process and start the process of Step ST53 and subsequent steps. Here, the interrupt represents stopping the process until now and executing a designated process.

Next, in Step ST53, the cadence sensor control unit 551 calculates a cadence value. The cadence sensor control unit 551 adds a counter value C of the timer value information and one count interval T together, thereby calculating a time (period) [seconds] at which the magnetic sensor 505 becomes ON. Then, the cadence sensor control unit 551 divides 60 by this time (period), thereby calculating a cadence [rpm]. In addition, the cadence sensor control unit 551 stores the cadence information in the cadence sensor RAM 555 of the cadence sensor storage unit 553.

Next, in Step ST55, the cadence sensor control unit 551 outputs a counter value resetting instruction to the cadence sensor timer 561. In this way, the main flow of the control process executed by the cadence sensor control unit 551 ends. Then, when the magnetic sensor 505 becomes ON for the next time, an interrupt is executed again, and the process is restarted from Step ST51.

Meanwhile, in Step ST57, the cadence sensor control unit 551 transmits the cadence information stored in the cadence sensor storage unit 553 to the cycle computer 201 by using the cadence sensor radio transmission unit 507. In addition, the transmission may be executed by only the cadence sensor radio transmission unit 507 not through the cadence sensor control unit 551.

Next, in Step ST59, the cadence sensor control unit 551 waits for one second. Here, the waiting time is changeable.

Next, the processes executed by the measurement module 301 and the like will be described. In Step ST11, the measurement module A/D 363 executes AD conversion of outputs (outputs A and B) that are output from the measurement module strain detecting circuit 365 from analog values to digital values. In other words, this step serves as a rotating-direction strain detecting process causing the first detection circuit 373a to detect a rotating-direction strain and an inward/outward strain or pulling-direction strain detecting process causing the second detection circuit 373b to detect at least one of the inward/outward strain and the pulling-direction strain.

Next, in Step ST13, the strain information detected (converted) by the measurement module A/D 363 is stored in the measurement module RAM 355 of the measurement module storage unit 353.

Next, in Step ST15, the process waits for 1/N seconds. Here, the value of N is the number of data points measured within one second. In other words, as the value of N increases, the number of the values of the strain information increases, and it represents higher resolution in units of seconds. While a higher value of N is preferable, however, in a case where the value of N is too high, the capacity of the measurement module RAM 355 needs to be high, whereby the cost increases. Thus, the value of N is determined based on the cost, a required time, the resolution, a time required for the A/D conversion executed by the measurement module A/D 363, and the like. When the process of Step ST15 ends, the process is returned to the process of Step ST11 again. In other words, the process of Step ST11 to Step ST15 is repeatedly executed N times within one second.

Figure 8A:
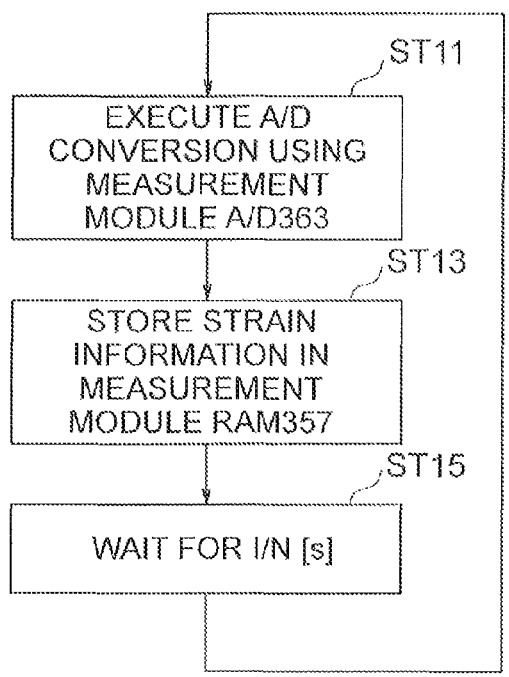
FIGS. 8A to 8C are flowcharts of processes executed by the measurement module and the cycle computer illustrated in FIG. 3.
Figure 8B:
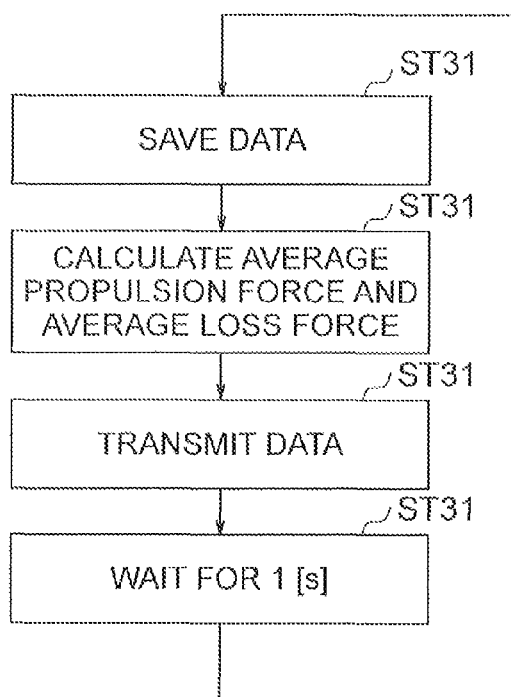

In addition, the measurement module control unit 351 executes a process illustrated in FIG. 8B. In Step ST31, the measurement module control unit 351 executes data saving of the strain information. The reason will now be described. First, there is a limit of the capacity of the measurement module RAM 355 of the measurement module storage unit 353. Here, in a case where the capacity of the measurement module RAM 355 is configured to be large, the data saving of the strain information is not necessary. However, in a case where there is too much room in the design, it causes an increase in the cost, which is not appropriate. In addition, since the strain information is continuously written in a sequential manner, in a case where data saving is not executed, there is concern that new information is overwritten before the calculation of the propulsion force Ft and the loss force Fr by a process of Step ST33 to be described later.

Next, in Step ST33, the measurement module control unit 351 calculates the propulsion force Ft and the loss force Fr. More specifically, the measurement module control unit 351 calculates the propulsion force Ft and the loss force Fr by respectively using Equations (1) and (2) described above. In addition, the measurement module control unit 351 calculates N propulsion forces Ft and N loss forces Fr and calculates averages thereof. In other words, the measurement module control unit 351 calculates averages (an average propulsion force and an average loss force) of the propulsion forces Ft and the loss forces Fr within one second. In other words, this step serves as a propulsion force measuring process measuring the propulsion force based on the rotating-direction strain detected in the rotating-direction strain detecting process and a loss force measuring process measuring the loss force based on at least one of the inward/outward strain and the pulling-direction strain detected in the inward/outward strain and pulling-direction strain detecting process.

Next, in Step ST35, the measurement module control unit 351 transmits the average propulsion force and the average loss force that have been calculated through the measurement module radio transmission unit 309. The average propulsion force and the average loss force that have been transmitted are received by the cycle computer radio reception unit 209 of the cycle computer 201.

Next, in Step ST37, the process waits for one second. Here, one second is an example and is changeable as is necessary. When the process of Step ST37 ends, the process is returned to the process of Step ST31 again. In other words, the process of Steps ST31 to ST35 is repeatedly executed once every second.

Figure 8C:
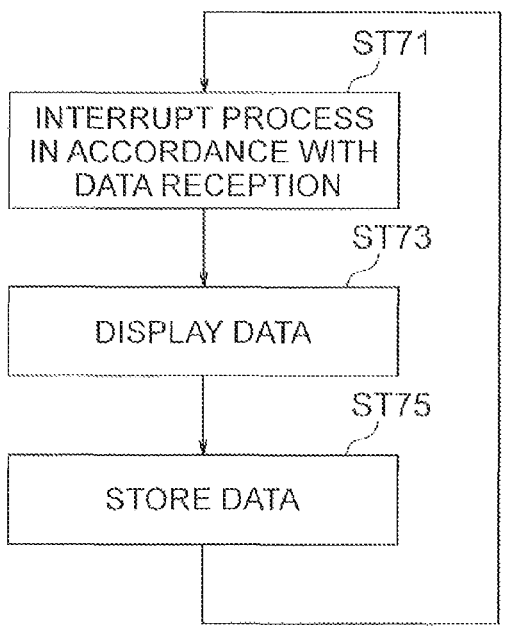

In addition, the cycle computer control unit 251 of the cycle computer 201 executes the process of FIG. 8C. In Step ST71, when the average propulsion force, the average loss force, and the cadence information are received, the cycle computer control unit 251 executes an interrupt process. In other words, when the cycle computer control unit 251 detects that the average propulsion force, the average loss force, and the cadence information have been received by the cycle computer radio reception unit 209, the cycle computer control unit 251 stops (interrupts) the process until now and starts the process of Step ST73 and subsequent steps.

Next, in Step ST73, the cycle computer control unit 251 causes the cycle computer display unit 203 to display the average propulsion force, the average loss force, and the cadence. The cycle computer display unit 203 display the average propulsion force, the average loss force, and the cadence information as numerical values or delivers those to the user using any other method for configuring the average propulsion force, the average loss force, and the cadence information to be recognized in a visual, audible, or touchable manner.

Next, in Step ST75, the cycle computer control unit 251 stores the average propulsion force, the average loss force, and the cadence information in the cycle computer RAM 255 of the cycle computer storage unit 253. Thereafter, the cycle computer control unit 251 executes the other processes until the interrupt process of Step ST51 is executed again.

According to this embodiment, the measurement module 301 includes: the first strain gauge 369a, the second strain gauge 369b, the third strain gauge 369c, and the fourth strain gauge 369d disposed on the inner face 119 of the crank 105 of the bicycle 1; the first detection circuit 373a, to which the first strain gauge 369a and the second strain gauge 369b are connected, detecting the bending deformation x occurring in the crank; and the second detection circuit 373b, to which the third strain gauge 369c and the fourth strain gauge 369d are connected, detecting the bending deformation y and the tensile deformation z occurring in the crank 105. In addition, the first strain gauge 369a to the third strain gauge 369c are disposed such that the detection direction is parallel to the longitudinal direction of the crank 105, and the fourth strain gauge 369d is disposed such that the detection direction is perpendicular to the longitudinal direction of the crank 105. Accordingly, the propulsion force Ft and the loss force Fr participating to the crank 105 can be measured based on the bending deformation x detected by the first detection circuit 373a and the bending deformation y and the tensile deformation z detected by the second detection circuit 373b. Thus, the propulsion force Ft and the loss force Fr can be measured by using a simple method. In addition, since the first strain gauge 369a to the fourth strain gauge 369d are disposed only on the inner face 119 of the crank 105, the propulsion force Ft and the loss force Fr can be measured only on one face, and, by arranging the strain gauges on the inner face 119, there is no intervention with the user's foot.

In addition, since the first strain gauge 369a and the second strain gauge 369b are disposed to be symmetrical with respect to the center axis C1 in the longitudinal direction of the inner face 119 of the crank 105, the bending deformation x can be detected with high accuracy.

In addition, since the first detection circuit 373a and the second detection circuit 373b are configured as bridge circuits, the first strain gauge 369a and the second strain gauge 369b are connected in series with the power supply in the bridge circuit configuring the first detection circuit 373a, the third strain gauge 369c and the fourth strain gauge 369d are connected in series with the power supply in the bridge circuit configuring the second detection circuit 373b, and resistors other than the first strain gauge 369a to the fourth strain gauge 369d of the bridge circuit configuring the first detection circuit 373a and the bridge circuit configuring the second detection circuit 373b are configured by fixed resistances R, the bending deformation x, the bending deformation y, and the tensile deformation z can be detected using the bridge circuits, whereby the propulsion force Ft and the loss force Fr can be measured by employing a simple circuit configuration.

In addition, since the fixed resistance R is shared by the first detection circuit and the second detection circuit, the first detection circuit and the second detection circuit can be configured substantially as one circuit, and accordingly, the circuit can be further simplified.

Furthermore, since the torsional deformation rz does not act on the calculation of the propulsion force Ft, the propulsion force Ft does not change also when the load position on the pedal 103 is changed.

In addition, in the description presented above, while the third strain gauge 369c and the fourth strain gauge 369d are arranged as separate components, for example, the strain gauges may overlap each other in a cross shape. By configuring as such, the size of the strain gauge 369 arranged in the crank 105 can be decreased. Furthermore, in a case where the third strain gauge 369c and the fourth strain gauge 369d are arranged as separate components, the fourth strain gauge 369*d* is not limited to being arranged on a further pedal crankshaft 115 side than the third strain gauge 369*c*, and the fourth strain gauge 369*d* may be disposed on a further crankshaft 107 side than the third strain gauge 369*c*. In other words, the arrangement order of the third strain gauge 369*c* and the fourth strain gauge 369*d* is not particularly limited.

In addition, in the case illustrated in FIG. 5, while a circuit in which two bridge circuits are matched to one circuit is used, the circuit may be divided into two bridge circuits as separate circuits. In such a case, two fixed resistances R are necessary for each circuit.

Furthermore, in the first detection circuit 373*a*, the connection order of the first strain gauge 369*a* and the second strain gauge 369*b* may be reversed. In the second detection circuit 373*b*, the connection order of the third strain gauge 369*c* and the fourth strain gauge 369*d* may be reversed.

Second Embodiment

Figure 9:
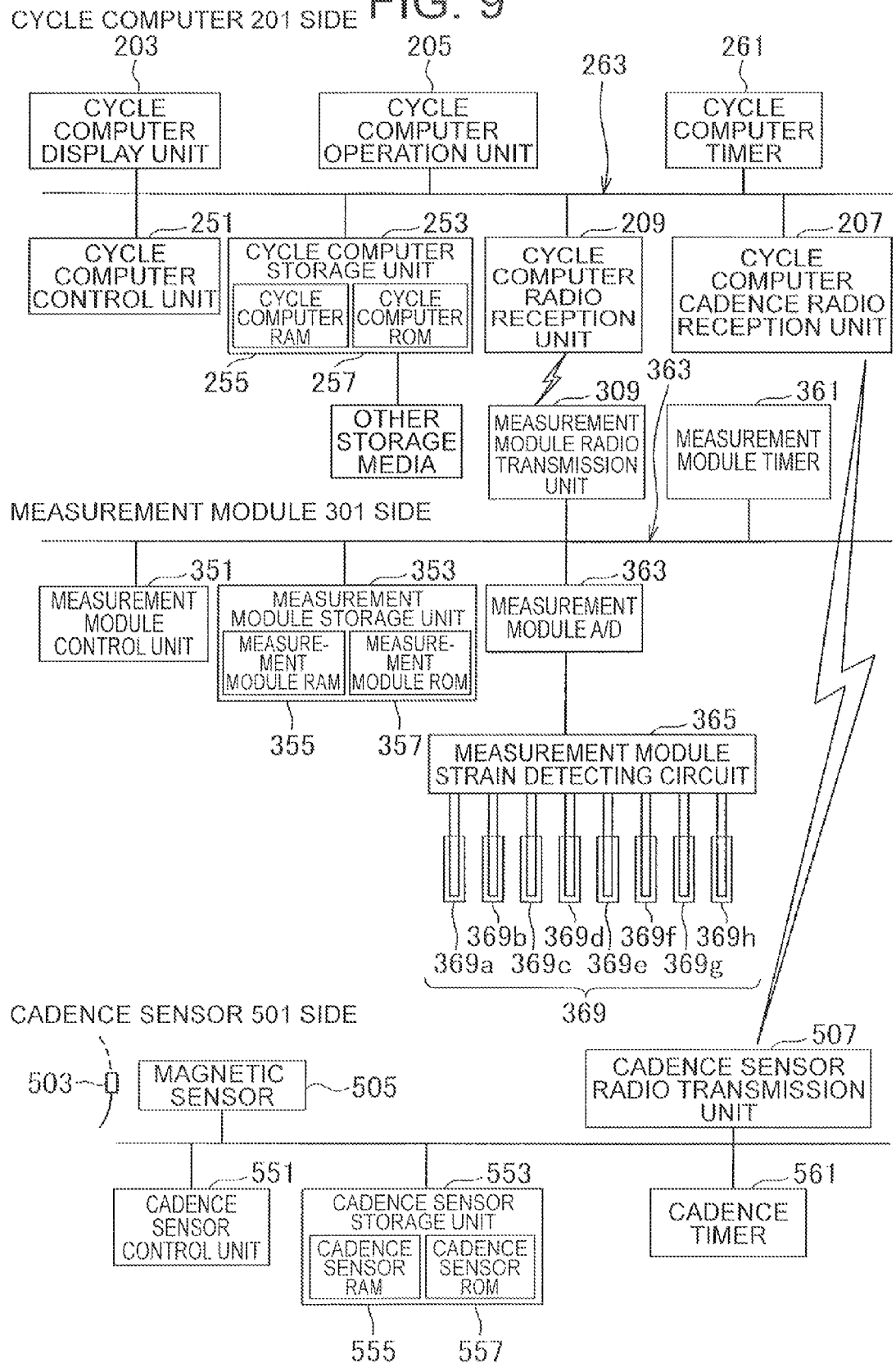
FIG. 9 is a block configuration diagram of a cycle computer, a measurement module, and a cadence sensor according to a second embodiment of the present invention.

Next, a measuring device according to a second embodiment of the present invention will be described with reference to FIGS. 9 to 11. The same reference numeral will be assigned to the same part as that of the first embodiment described above, and the description thereof will not be presented.

In this embodiment, the configuration of a measurement module strain detecting circuit 365 of a measurement module 301 and the arrangement of a strain gauge 369 are different from those of the first embodiment. The strain gauge 369 according to this embodiment, as illustrated in FIG. 9, is configured by: a first strain gauge 369*a*; a second strain gauge 369*b*; a third strain gauge 369*c*; a fourth strain gauge 369*d*; a fifth strain gauge 369*e*; a sixth strain gauge 369*f*; a seventh strain gauge 369*g*; and an eighth strain gauge 369*h*. Then, the terminals of the strain gauge 369 are connected to the measurement module strain detecting circuit 365.

Figure 10:
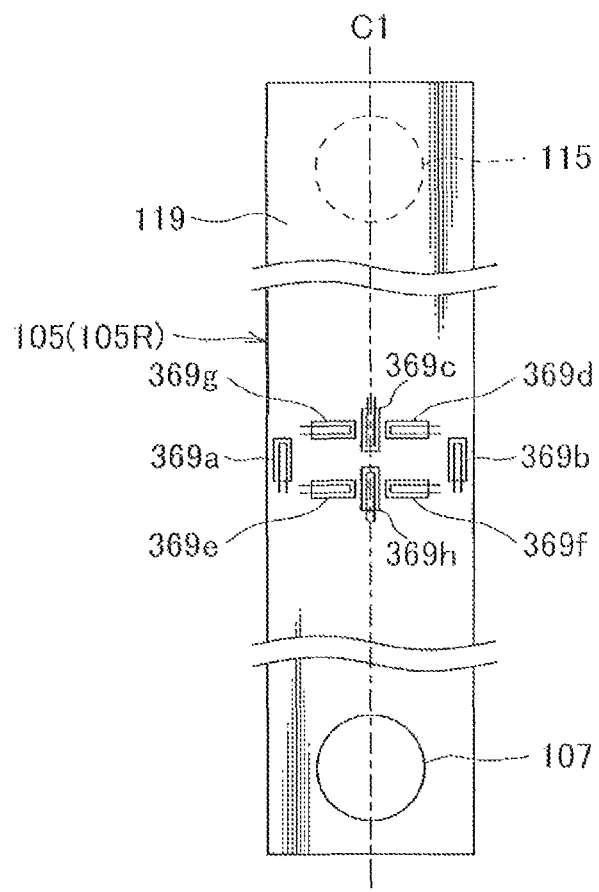
FIG. 10 is an explanatory diagram of the arrangement of a strain gauge illustrated in FIG. 9 in a crank.

FIG. 10 illustrates the arrangement of the strain gauge 369 according to this embodiment in a crank 105. The strain gauge 369 is bonded to the inner face 119 of the crank 105. The first strain gauge 369*a* and the second strain gauge 369*b* are similar to those of the first embodiment illustrated in FIG. 4.

The third strain gauge 369*c* is disposed on the center axis C1, and the detection direction thereof is arranged to be parallel to the center axis C1. The fourth strain gauge 369*d* is disposed such that the detection direction is perpendicular to the longitudinal direction of the crank 105, in other words, perpendicular to the center axis C1 of the inner face 119.

The fifth strain gauge 369*e*, the sixth strain gauge 369*f*, and the seventh strain gauge 369*g* are disposed such that the detection directions thereof are perpendicular to the longitudinal direction of the crank 105, in other words, are perpendicular to the center axis C1 of the inner face 119. The eighth strain gauge 369*h* is disposed on the center axis C1, and the detection direction thereof is disposed to be parallel to the center axis C1.

In addition, the third strain gauge 369*c* and the eighth strain gauge 369*h* are arranged to be aligned along the center axis C1. The fourth strain gauge 369*d* and the seventh strain gauge 369*g* are arranged to have the third strain gauge 369*c* being interposed therebetween. The fifth strain gauge 369*e* and the sixth strain gauge 369*f* are arranged to have the eighth strain gauge 369*h* being interposed therebetween. In addition, the first strain gauge 369*a* and the second strain gauge 369*b* are arranged to be closer to both end portions of the crank 105 in the shorter-side direction than the third strain gauge 369*c* to the eighth strain gauge 369*h*.

In other words, a direction (the vertical direction in FIG. 10) parallel to the center axis C1, in other words, a direction parallel to the longitudinal direction of the crank 105 is the detection direction of the first strain gauge 369*a*, the second strain gauge 369*b*, the third strain gauge 369*c*, and the eighth strain gauge 369*h*, and a direction (the horizontal direction in FIG. 10) perpendicular to the center axis C1, in other words, a direction perpendicular to the longitudinal direction of the crank is the detection direction of the fourth strain gauge 369*d*, the fifth strain gauge 369*e*, the sixth strain gauge 369*f*, and the seventh strain gauge 369*g*. Accordingly, the detection directions of the first strain gauge 369*a*, the second strain gauge 369*b*, the third strain gauge 369*c*, and the eighth strain gauge 369*h* and the detection directions of the fourth strain gauge 369*d*, the fifth strain gauge 369*e*, the sixth strain gauge 369*f*, and the seventh strain gauge 369*g* are orthogonal to each other.

The first strain gauge 369*a*, the second strain gauge 369*b*, the third strain gauge 369*c*, the fourth strain gauge 369*d*, the fifth strain gauge 369*e*, the sixth strain gauge 369*f*, the seventh strain gauge 369*g*, and the eighth strain gauge 369*h* are connected to the measurement module strain detecting circuit 365 according to this embodiment, and the strain amount of the strain gauge 369 is output as a voltage. The output of the measurement module strain detecting circuit 365, similar to the first embodiment, is converted from analog information into strain information that is digital information by a measurement module A/D 363. Then, a strain information signal is output to the measurement module storage unit 353. The strain information signal input to the measurement module storage unit 353 is stored in the measurement module RAM 355 as the strain information.

Figure 11:
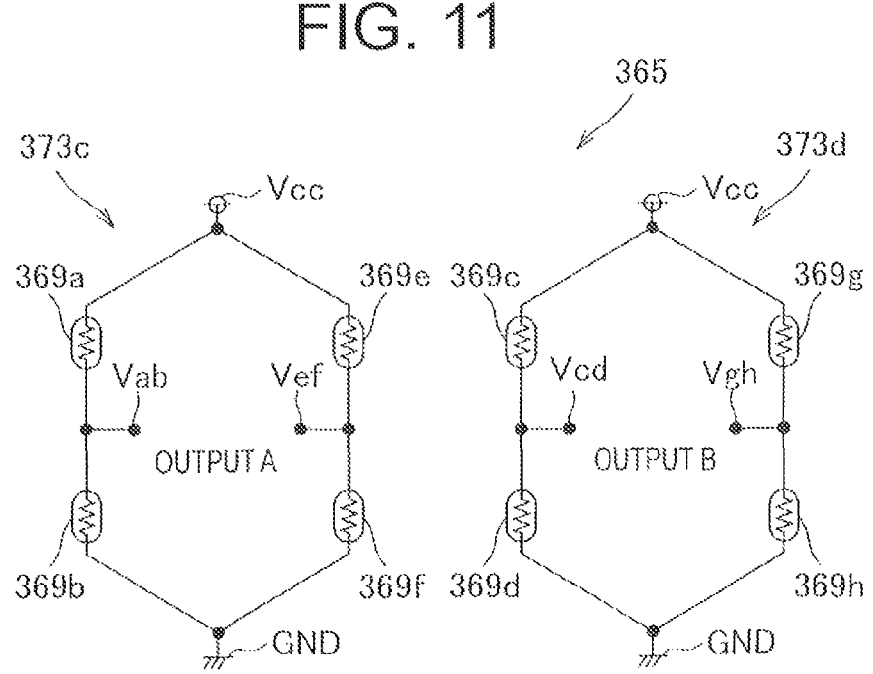
FIG. 11 is a circuit diagram of a measurement module strain detecting circuit illustrated in FIG. 9.

The measurement module strain detecting circuit 365 is illustrated in FIG. 11. The measurement module strain detecting circuit 365 is configured by a first detection circuit 373*c* and a second detection circuit 373*d* that are two bridge circuits. On a first system side of the first detection circuit 373*c*, the first strain gauge 369*a* and the second strain gauge 369*b* are sequentially connected in order from a power supply Vcc. In other words, the first strain gauge 369*a* and the second strain gauge 369*b* are connected in series with the power supply Vcc. On a second system side, the fifth strain gauge 369*e* and the sixth strain gauge 369*f* are sequentially connected. In other words, the fifth strain gauge 369*e* and the sixth strain gauge 369*f* are connected in series with the power supply Vcc.

In the first detection circuit 373*c*, the first strain gauge 373*a* and the sixth strain gauge 373*f* are connected to positions of opposite angles, and the second strain gauge 373*b* and the fifth strain gauge 373*e* are connected to positions of opposite angles.

On a first system side of the second detection circuit 373*d*, the third strain gauge 369*c* and the fourth strain gauge 369*d* are sequentially connected in order from the power supply Vcc. In other words, the third strain gauge 369*c* and the fourth strain gauge 369*d* are connected in series with the power supply Vcc. On a second system side, the seventh strain gauge 369*g* and the eighth strain gauge 369*h* are sequentially connected in order from the power supply Vcc. In other words, the seventh strain gauge 369*g* and the eighth strain gauge 369*h* are connected in series with the power supply Vcc.

In the second detection circuit 373*d*, the third strain gauge 373*c* and the eighth strain gauge 373*h* are connected to positions of opposite angles, and the fourth strain gauge 373*d* and the seventh strain gauge 373*g* are connected to positions of opposite angles. In addition, the first strain gauge 369*a* to the eighth strain gauge 369*h* have the same resistance value.

A connection point between the first strain gauge 369*a* and the second strain gauge 369*b* at which the electric potential Vab between the first strain gauge 369*a* and the second strain gauge 369*b* of the first detection circuit 373*c* can be measured and a connection point between the fifth strain gauge 369*e* and the sixth strain gauge 369*f* at which the electric potential Vef between the fifth strain gauge 369*e* and the sixth strain gauge 369*f* can be measured are configured as an output (hereinafter referred to as an output A) of the first detection circuit 373*c*.

A connection point between the third strain gauge 369*c* and the fourth strain gauge 369*d* at which electric potential Vcd between the third strain gauge 369*c* and the fourth strain gauge 369*d* of the second detection circuit 373*d* can be measured and a connection point between the seventh strain gauge 369*g* and the eighth strain gauge 369*h* at which electric potential Vgh between the seventh strain gauge 369*g* and the eighth strain gauge 369*h* can be measured are configured as an output (hereinafter referred to as an output B) of the second detection circuit 373*d*. The output A and the output B, similarly to the first embodiment, configure the strain information.

Here, a method of detecting (measuring) the bending deformation x, the bending deformation y, the tensile deformation z, and the torsional deformation rz described with reference to FIGS. 6A to 6C by using the measurement module strain detecting circuit 365 according to this embodiment illustrated in FIGS. 10 and 11 will be described.

In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369*a* is compressed and thus has a decreased resistance value, and the second strain gauge 369*b* is expanded and thus has an increased resistance value. Meanwhile, the fifth strain gauge 369*e* is expanded and thus has an increased resistance value, and the sixth strain gauge 369*f* is compressed and thus has a decreased resistance value. For this reason, the output A of the first detection circuit 373*c* is a positive output (the electric potential Vab is high, and the electric potential Vef is low). On the other hand, in a case where the right-side crank 105R is deformed from the lower face 118 toward the upper face 117, the first strain gauge 369*a* is expanded and thus has an increased resistance value, and the second strain gauge 369*b* is compressed and thus has a decreased resistance value. Meanwhile, the fifth strain gauge 369*e* is compressed and has a decreased resistance value, and the sixth strain gauge 369*f* is expanded and has an increased resistance value. Accordingly, the output A of the first detection circuit 373*c* is a negative output (the electric potential Vab is low, and the electric potential Vcd is high).

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369*a* and the second strain gauge 369*b* are compressed, and thus any one thereof has a decreased resistance value. Meanwhile, both the fifth strain gauge 369*e* and the sixth strain gauge 369*f* are expanded, and thus any one thereof has an increased resistance value. For this reason, the output A of the first detection circuit 373*c* is zero (there is no electric potential difference between the electric potential Vab and the electric potential Vcd). On the other hand, in a case where the right-side crank 105R is deformed from the inner face 119 toward the outer face 120, both the first strain gauge 369*a* and the second strain gauge 369*b* are expanded, and thus any one thereof has an increased resistance value. Meanwhile, both the fifth strain gauge 369*e* and the sixth strain gauge 369*f* are compressed, and thus any one thereof has a decreased resistance value. Accordingly, the output A of the first detection circuit 373*c* is zero.

In the tensile deformation z, the right-side crank 105R is deformed to be expanded or compressed in the longitudinal direction. In a case where the right-side crank 105R is expanded, both the first strain gauge 369*a* and the second strain gauge 369*b* are expanded, and thus, any one thereof has an increased resistance value. Meanwhile, both the fifth strain gauge 369*e* and the sixth strain gauge 369*f* are compressed, and thus, any one thereof has a decreased resistance value. For this reason, the output A of the first detection circuit 373*c* is zero. On the other hand, in a case where the right-side crank 105R is compressed, both the first strain gauge 369*a* and the second strain gauge 369*b* are compressed, and thus, any one thereof has a decreased resistance value. Meanwhile, both the fifth strain gauge 369*e* and the sixth strain gauge 369*f* are expanded, and any one thereof has an increased resistance value. For this reason, the output A of the first detection circuit 373*c* is zero.

In the torsional deformation rz, the right-side crank 105R is deformed to be twisted. In a case where the right-side crank 105R is twisted as illustrated in FIG. 6B, both the first strain gauge 369*a* and the second strain gauge 369*b* are expanded, and thus any one thereof has an increased resistance value. Meanwhile, both the fifth strain gauge 369*e* and the sixth strain gauge 369*f* are neither compressed nor expanded in the detection direction, and the resistance values thereof are not changed. For this reason, the output A of the first detection circuit 373*c* is zero. On the other hand, in a case where the right-side crank 105R is twisted in a direction opposite to that illustrated in FIG. 6B, both the first strain gauge 369*a* and the second strain gauge 369*b* are expanded, and thus any one thereof has an increased resistance value. Meanwhile, both the fifth strain gauge 369*e* and the sixth strain gauge 369*f* are neither compressed nor expanded in the detection direction, and the resistance values thereof are not changed. For this reason, the output A of the first detection circuit 373*c* is zero.

As above, similar to the first embodiment, only the bending deformation x is detected from the output A. In other words, the first strain gauge 369*a*, the second strain gauge 369*b*, the fifth strain gauge 373*e*, and the sixth strain gauge 373*f* are connected to the first detection circuit 373*c*, and the first detection circuit 373*c* detects a rotating-direction strain generated in the crank 105.

Next, how each deformation is detected (measured) in the output B of the second detection circuit 373*d* will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the third strain gauge 369*c* is only bent and is neither compressed nor expanded in the detection direction, and accordingly, the resistance value thereof does not change. In addition, since the fourth strain gauge 369*d* is compressed, the resistance value thereof is decreased. On the other hand, the seventh strain gauge 369*g* is expanded and has an increased resistance value, and the eighth strain gauge 369*h* is only bent and is neither compressed nor expanded in the detection direction and there is no change in the resistance value. For this reason, the output B of the second detection circuit 373d is zero. In addition, in a case where the right-side crank 105R is deformed from the lower face 118 toward the upper face 117, the third strain gauge 369c is only bent and is neither compressed nor expanded in the detection direction and there is no change in the resistance value, and the fourth strain gauge 369d is expanded and thus has an increased resistance value. Meanwhile, the seventh strain gauge 369g is compressed and has a decreased resistance value, and the eighth strain gauge 369h is only bent and is neither compressed nor expanded in the detection direction and there is no change in the resistance value. For this reason, the output B of the second detection circuit 373d is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, the third strain gauge 369c is compressed and thus has a decreased resistance value, and the fourth strain gauge 369d is expanded and thus has an increased resistance value. Meanwhile, the seventh strain gauge 369g is expanded and thus has an increased resistance value, and the eighth strain gauge 369h is compressed and thus has a decreased resistance value. For this reason, the output B of the second detection circuit 373d is a positive output (the electric potential Vcd is high, and the electric potential Vgh is low). On the other hand, in a case where the right-side crank 105R is deformed from the inner face 119 toward the outer face 120, the third strain gauge 369c is expanded and thus has an increased resistance value, and the fourth strain gauge 369d is compressed and thus has a decreased resistance value. Meanwhile, the seventh strain gauge 369g is compressed and thus has a decreased resistance value, and the eighth strain gauge 369h is expanded and thus has an increased resistance value. For this reason, the output B of the second detection circuit 373d is a negative output (the electric potential Vcd is low, and the electric potential Vgh is high).

In the tensile deformation z, the right-side crank 105R is deformed to be expanded or compressed in the longitudinal direction. The third strain gauge 369c is expanded and thus has an increased resistance value, and the fourth strain gauge 369d is compressed and thus has a decreased resistance value. Meanwhile, the seventh strain gauge 369g is compressed and thus has a decreased resistance value, and the eighth strain gauge 369h is expanded and thus has an increased resistance value. For this reason, the output B of the second detection circuit 373d is a negative output. On the other hand, in case where the right-side crank 105R is compressed, the third strain gauge 369c is compressed and thus has a decreased resistance value, and the fourth strain gauge 369d is expanded and thus has an increased resistance value. Meanwhile, the seventh strain gauge 369g is expanded and thus has an increased resistance value, and the eighth strain gauge 369h is compressed and thus has a decreased resistance value. For this reason, the output B of the second detection circuit 373d is a positive output.

In the torsional deformation rz, the right-side crank 105R is deformed to be twisted. In a case where the right-side crank 105R is twisted as illustrated in FIG. 6B, the third strain gauge 369c is expanded and thus has an increased resistance value, and the fourth strain gauge 369d is compressed and thus has a decreased resistance value. Meanwhile, the seventh strain gauge 369g is compressed and thus has a decreased resistance value, and the eighth strain gauge 369h is expanded and thus has an increased resistance value. For this reason, the output B of the second detection circuit 373d is a negative output. On the other hand, in a case where the right-side crank 105R is twisted in a direction opposite to the direction illustrated in FIG. 6B, the third strain gauge 369c is expanded and thus has an increased resistance value, and the fourth strain gauge 369d is compressed and thus has a decreased resistance value. Meanwhile, the seventh strain gauge 369g is compressed and thus has a decreased resistance value, and the eighth strain gauge 369h is expanded and thus has an increased resistance value. For this reason, the output B of the second detection circuit 373d is a negative output.

As above, the bending deformation y, the tensile deformation z, and the torsional deformation rz are detected from the output B. In other words, the third strain gauge 369c, the fourth strain gauge 369d, the seventh strain gauge 369g, and the eighth strain gauge 369h are connected to the second detection circuit 373d, and the second detection circuit 373d detects an inward/outward strain and a pulling-direction strain generated in the crank 105.

The propulsion force Ft and the loss force Fr, similarly to the first embodiment, are calculated by using Equations (1) to (6) described above.

In addition, in a case where there is no deviation in the crank direction (a direction parallel to the center axis C1) between the first strain gauge 369a and the second strain gauge 369b and between the fifth strain gauge 369e and the sixth strain gauge 369f, Ae=A0, and the correction according to the output B is not necessary.

The propulsion force Ft and the loss force Fr calculated in this way, similarly to the first embodiment, are transmitted to the cycle computer 201. The operation of the measurement module control unit 351 and the operations of the cycle computer 201 and the cadence sensor 501 are similar to those represented in the flowcharts illustrated in FIGS. 7A to 8C.

According to this embodiment, the measurement module 301 includes: the first strain gauge 369a, the second strain gauge 369b, the third strain gauge 369c, the fourth strain gauge 369d, the fifth strain gauge 369e, the sixth strain gauge 369f, the seventh strain gauge 369g, and the eighth strain gauge 369h disposed on the inner face 119 of the crank 105 of the bicycle 1; the first detection circuit 373c, to which the first strain gauge 369a, the second strain gauge 369b, the fifth strain gauge 369e, and the sixth strain gauge 369f are connected, detecting the bending deformation x occurring in the crank 105; and the second detection circuit 373d, to which the third strain gauge 369c, the fourth strain gauge 369d, the seventh strain gauge 369g, and the eighth strain gauge 369h are connected, detecting the bending deformation y and the tensile deformation z occurring in the crank 105. In addition, the first strain gauge 369a, the second strain gauge 369b, the third strain gauge 369c, and the eighth strain gauge 369h are disposed such that the detection direction is parallel to the longitudinal direction of the crank 105, and the fourth strain gauge 369d, the fifth strain gauge 369e, the sixth strain gauge 369f, and the seventh strain gauge 369g are disposed such that the detection directions thereof are perpendicular to the longitudinal direction of the crank 105. Accordingly, the propulsion force Ft and the loss force Fr participating to the crank 105 can be measured based on the bending deformation x detected by the first detection circuit 373c and the bending deformation y and the tensile deformation z detected by the second detection circuit 373d. Thus, the propulsion force Ft and the loss force Fr can be measured by using a simple method. In addition, since the first strain gauge 369a to the eighth strain gauge 369h are disposed only on the inner face 119 of the crank 105, the propulsion force Ft and the loss force Fr can be measured only on one face, and, by arranging the strain gauges on the inner face 119, there is no intervention with the user's foot. Furthermore, the first strain gauge 369a, the second strain gauge 369b, the fifth strain gauge 369e, and the sixth strain gauge 369f are connected to the first detection circuit 373c, and the first detection circuit 373c detects the bending deformation x, and accordingly, a detected voltage value is large, whereby the influence of a noise can be reduced.

In addition, it may be configured such that the first detection circuit 373c and the second detection circuit are configured as bridge circuits, the first strain gauge 369a and the sixth strain gauge 369f and the second strain gauge 369b and the fifth strain gauge 369e are connected to positions of opposite angles in the bridge circuits configuring the first detection circuit 373c, and the third strain gauge 369c and the eighth strain gauge 369h and the fourth strain gauge 369d and the seventh strain gauge 369g are connected to positions of opposite angles in the bridge circuits configuring the second detection circuit 373d. In this way, by using the bridge circuits, the bending deformation x, the bending deformation y, and the tensile deformation z can be detected, whereby the propulsion force and the loss force can be measured by employing a simple circuit configuration.

Furthermore, also in the second embodiment, the positions of the strain gauges 369 of the bridge circuits may be interchanged. For example, in the first detection circuit 373c, the first strain gauge 369a and the second strain gauge 369b may be interchanged. In such a case, in order to maintain the positional relation of the opposite angles, the fifth strain gauge 369e and the sixth strain gauge 369f need to be interchanged. In the second detection circuit 373d, the positions may be similarly interchanged as well.

In addition, also in the second embodiment, a plurality of strain gauges 369 may be stacked together. For example, the third strain gauge 369c and the fourth strain gauge 369d or the seventh strain gauge 369g may overlap each other in a cross shape. The eighth strain gauge 369h and the fifth strain gauge 369e or the sixth strain gauge 369f may overlap each other in a cross shape.

Third Embodiment

Figure 12:
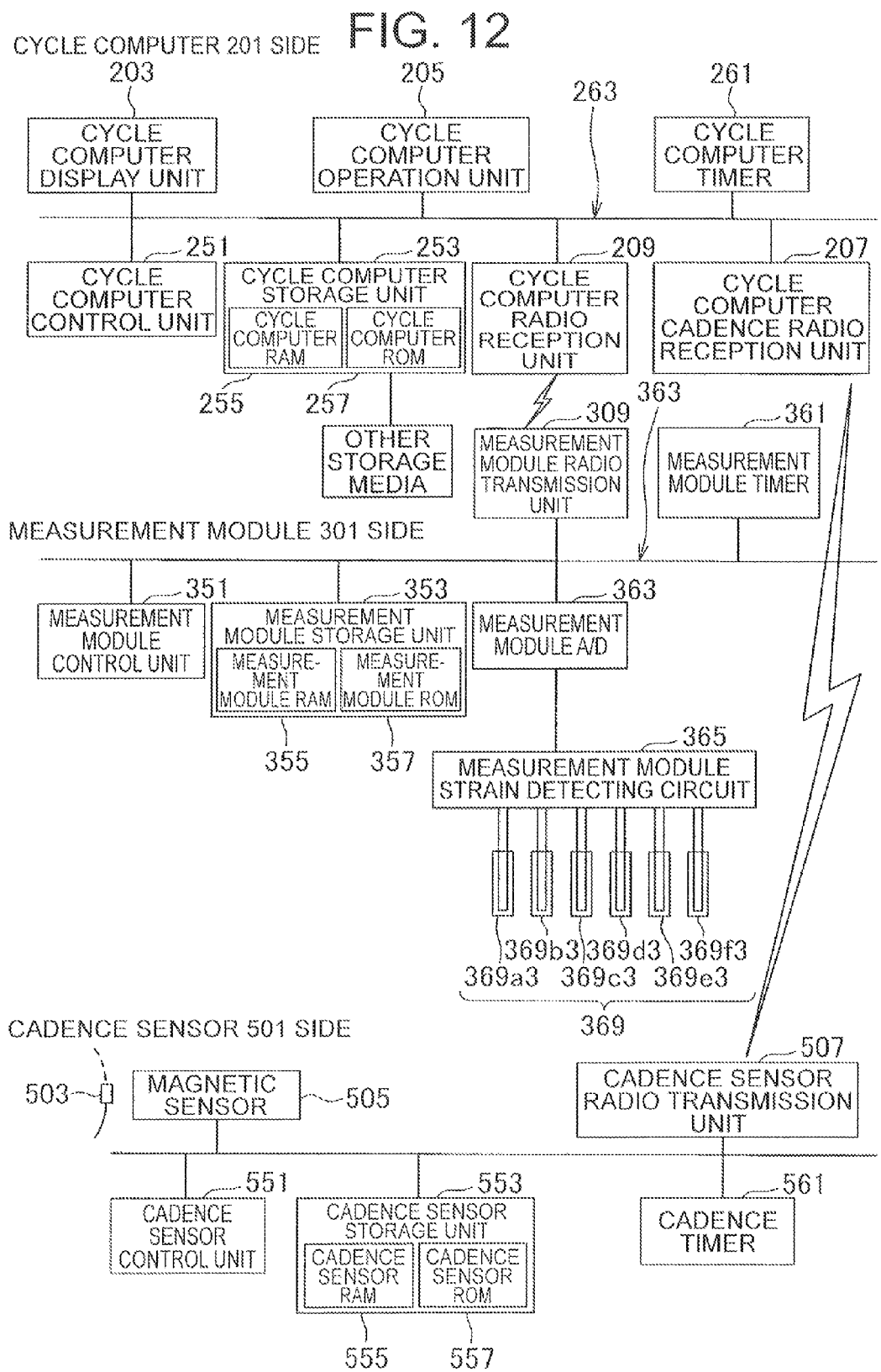
FIG. 12 is a block configuration diagram of a cycle computer, a measurement module, and a cadence sensor according to a third embodiment of the present invention.
Figure 13:
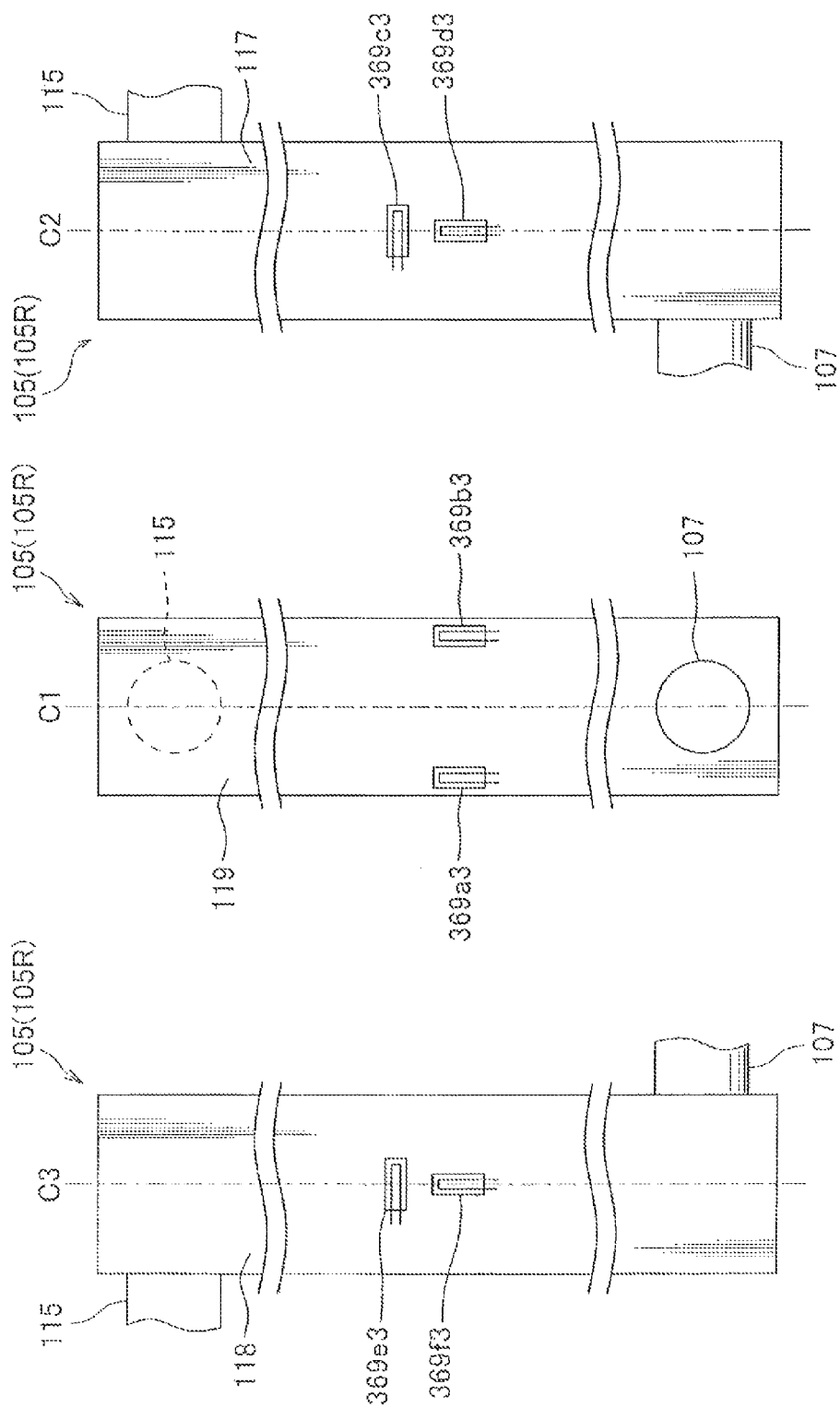
FIGS. 13A to 13C are explanatory diagrams of the arrangement of a strain gauge illustrated in FIG. 12 in a crank.

Next, a measuring device according to a third embodiment of the present invention will be described with reference to FIGS. 12 to 14. The same reference numeral will be assigned to the same part as that of the first embodiment described above, and the description thereof will not be presented.

In this embodiment, the configuration of a measurement module strain detecting circuit 365 of a measurement module 301 and the arrangement of a strain gauge 369 are different from those of the first embodiment. The strain gauge 369 according to this embodiment, as illustrated in FIG. 12, is configured by: a first strain gauge 369a3; a second strain gauge 369b3; a third strain gauge 369c3; a fourth strain gauge 369d3; a fifth strain gauge 369e3; and a sixth strain gauge 369f3. Then, the terminals of the strain gauge 369 are connected to the measurement module strain detecting circuit 365.

FIGS. 13A to 13C illustrate the arrangement of the strain gauge 369 according to this embodiment in a crank 105. The strain gauge 369 is bonded to the inner face 119, the upper face 117, and the lower face 118 of the crank 105. Here, the inner face 105 of the crank 105 is a face on which the crankshaft 107 is disposed to project (connected) and is a face (side face) parallel to a plane including a circle that is defined by the rotational movement of the crank 105. The upper face 117 of the crank 105 is one of faces, of which the longitudinal directions extend in the same direction as that of the inner face 119 and the outer face 120 (extending in the diameter direction of a circle defined by the rotational movement of the crank 105), being orthogonal to the inner face 119. The lower face 118 of the crank 105 is a face that faces the upper face 117. In addition, while not illustrated in FIGS. 13A to 13C, the outer face 120 of the crank 105 is a face, on which the pedal crankshaft 115 is disposed to project (connected), facing the inner face 119. In other words, the outer face is a face on which the pedal 103 is disposed to be freely rotatable.

The first strain gauge 369a3 and the second strain gauge 369b3, as illustrated in FIG. 13B, are disposed on the inner face 119 of the crank 105. The first strain gauge 369a3 and the second strain gauge 369b3 are disposed such that the detection direction is parallel to the longitudinal direction of the crank 105, in other words, parallel to a center axis C1 of the inner face 119 and is symmetrical with respect to the center axis C1 of the inner face 119.

The third strain gauge 369c3 and the fourth strain gauge 369d3, as illustrated in FIG. 13C, are disposed on the upper face 117 of the crank 105. The third strain gauge 369d3 is disposed such that the detection direction is perpendicular to the longitudinal direction of the crank 105, in other words, perpendicular to a center axis C2 of the upper face 117 and is disposed on the center axis C2. The fourth strain gauge 369d3 is disposed such that the detection direction is parallel to the longitudinal direction of the crank 105, in other words, parallel to the center axis C2 of the upper face 117 and is disposed on the center axis C2.

The fifth strain gauge 369e3 and the sixth strain gauge 369f3, as illustrated in FIG. 13A, are disposed on the lower face 118 of the crank 105. The fifth strain gauge 369e3 is disposed such that the detection direction is perpendicular to the longitudinal direction of the crank 105, in other words, perpendicular to a center axis C3 of the lower face 118 and is disposed on the center axis C3. The sixth strain gauge 369f3 is disposed such that the detection direction is parallel to the longitudinal direction of the crank 105, in other words, parallel to a center axis C3 of the lower face 118 and is disposed on the center axis C3.

In other words, a direction (the vertical direction in FIGS. 13A to 13C) parallel to the center axes C1, C2, and C3 that are axes extending in the longitudinal direction of the crank 105, in other words, a direction parallel to the longitudinal direction of the crank 105 is the detection direction of each of the first strain gauge 369a3, the second strain gauge 369b3, the fourth strain gauge 369d3, and the sixth strain gauge 369f3, and a direction (the horizontal direction in FIGS. 13A to 13C) perpendicular to the center axes C2 and C3, in other words, a direction perpendicular to the longitudinal direction of the crank 105 is the detection direction of each of the third strain gauge 369c3 and the fifth strain gauge 369e3. Accordingly, the detection directions of the first strain gauge 369a3, the second strain gauge 369b3, the fourth strain gauge 369d3, and the sixth strain gauge 369f3 and the detection directions of the third strain gauge 369c3 and the fifth strain gauge 369e3 are orthogonal to each other.

The arrangement of the first strain gauge 369a3 to the sixth strain gauge 369f3 is not limited to that illustrated in FIGS. 13A to 13C. In other words, any other arrangement may be employed as long as the parallel or perpendicular relation with the center axes C1, C2, and C3 is maintained.

However, it is preferable to arrange the first strain gauge 369a3 and the second strain gauge 369b3 to be symmetrical to each other with the center axis C1 being interposed therebetween and arrange the third strain gauge 369c3 to the sixth strain gauge 369f3 on the center axes C2 and C3 for detecting each deformation to be described later with high accuracy.

In the case illustrated in FIGS. 13A to 13C, while the crank 105 is described as a simple rectangular parallelepiped, according to a design or the like, the corner may be rounded, and some faces thereof may be configured as curved faces. Even in such a case, by arranging the strain gauge 369 such that the arrangement described above is maintained as much as possible, each deformation to be described later can be detected. However, as the relation (parallel or perpendicular) with the center axes C1, C2, and C3 described above is out of alignment, the detection accuracy decreases.

The first strain gauge 369a3, the second strain gauge 369b3, the third strain gauge 369c3, the fourth strain gauge 369d3, the fifth strain gauge 369e3, and the sixth strain gauge 369f3 are connected to the measurement module strain detecting circuit 365, and the strain amount of the strain gauge 369 is output as a voltage. The output of the measurement module strain detecting circuit 365 is converted from analog information into strain information that is digital information by a measurement module A/D 363. Then, a strain information signal is output to the measurement module storage unit 353. The strain information signal input to the measurement module storage unit 353 is stored in the measurement module RAM 355 as the strain information.

Figure 14:
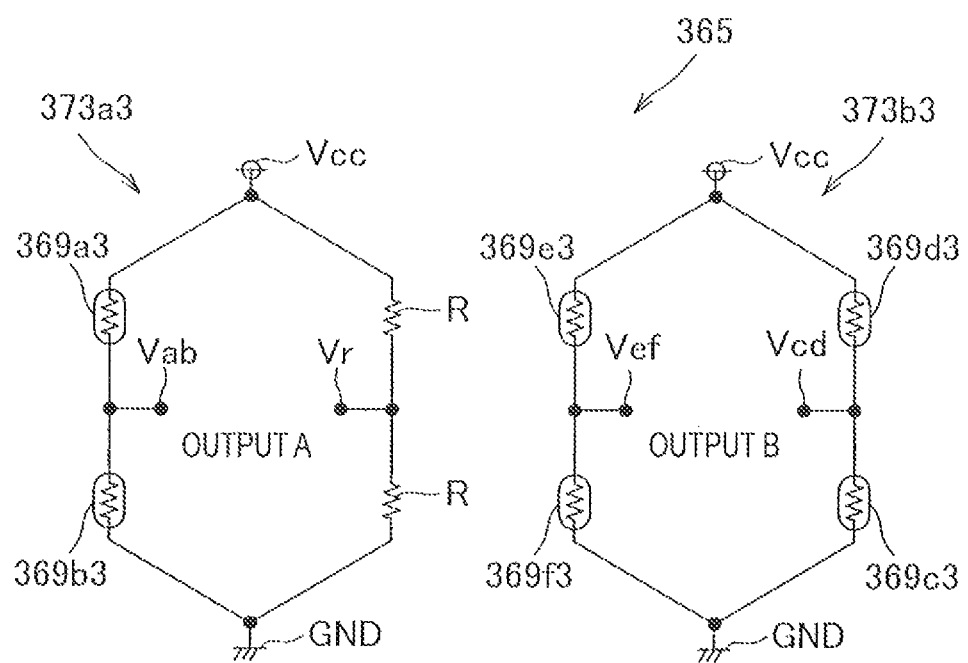
FIG. 14 is a circuit diagram of a measurement module strain detecting circuit illustrated in FIG. 12.

The measurement module strain detecting circuit 365 is illustrated in FIG. 14. The measurement module strain detecting circuit 365 is configured by a first detection circuit 373a3 and a second detection circuit 373b3 that are two bridge circuits. On a first system side of the first detection circuit 373a3, the first strain gauge 369a3 and the second strain gauge 369b3 are sequentially connected in order from a power supply Vcc. In other words, the first strain gauge 369a3 and the second strain gauge 369b3 are connected in series with the power supply Vcc. On a second system side, a fixed resistance R and a fixed resistance R are sequentially connected in order from the power supply Vcc.

On a first system side of the second detection circuit 373b3, the fourth strain gauge 369d3 and the third strain gauge 369c3 are sequentially connected in order from the power supply Vcc. In other words, the third strain gauge 369c3 and the fourth strain gauge 369d3 are connected in series with the power supply Vcc. On a second system side, the fifth strain gauge 369e3 and the sixth strain gauge 369f3 are sequentially connected in order from the power supply Vcc. In other words, the fifth strain gauge 369e3 and the sixth strain gauge 369f3 are connected in series with the power supply Vcc.

In the second detection circuit 373b3, the third strain gauge 373c3 and the fifth strain gauge 373e3 are connected to positions of opposite angles, and the fourth strain gauge 373d3 and the sixth strain gauge 373f3 are connected to positions of opposite angles. In addition, the first strain gauge 369a3 to the sixth strain gauge 369f3 have the same resistance value. Furthermore, the two fixed resistances R have the same resistance value as the resistor value before the occurrence of compression or expansion of the strain gauge 369.

As is known, the resistance value of the strain gauge 369 has a decreased resistance value in the case of compression and has an increased resistance value in the case of expansion. Such a change in the resistance value has a proportional relation in a case where the amount of the change is small. In addition, the detection direction of the strain gauge 369 is a direction in which the wiring grows, and, as described above, the detection direction of the first strain gauge 369a3, the second strain gauge 369b3, the fourth strain gauge 369d3, and the sixth strain gauge 369f3 is the direction parallel to the center axes C1, C2, and C3 and the detection direction of the third strain gauge 369c3 and the fifth strain gauge 369e3 is the direction perpendicular to the center axes C2 and C3. In a case where compression or expansion occurs in a direction other than the detection directions, a change in the resistance value of the strain gauge 369 does not occur.

In the first detection circuit 373a3 using the strain gauge 369 having such characteristics, in a case where the first strain gauge 369a3 and the second strain gauge 369b3 are not compressed or expanded in the detection direction, an electric potential difference between electric potential Vab between the first strain gauge 369a3 and the second strain gauge 369b3 and electric potential Vr between the two fixed resistances R is almost zero.

In a case where the first strain gauge 369a3 is compressed, and the second strain gauge 369b3 is expanded, since the resistance value of the first strain gauge 369a3 is decreased, and the resistance value of the second strain gauge 369b3 is increased, the electric potential Vab increases, but the electric potential Vr does not change. In other words, an electric potential difference between the electric potential Vab and the electric potential Vr occurs. In a case where the first strain gauge 369a3 is expanded, and the second strain gauge 369b3 is compressed, since the resistance value of the first strain gauge 369a3 is increased, and the resistance value of the second strain gauge 369b3 is decreased, the electric potential Vab decreases, but the electric potential Vr does not change. In other words, an electric potential difference between the electric potential Vab and the electric potential Vr occurs.

In a case where both the first strain gauge 369a3 and the second strain gauge 369b3 are compressed, since the resistance values of both the first strain gauge 369a3 and the second strain gauge 369b3 are decreased, the electric potential difference between the electric potential Vab and the electric potential Vr is almost zero. In a case where both the first strain gauge 369a3 and the second strain gauge 369b3 are expanded, since the resistance values of both the first strain gauge 369a3 and the second strain gauge 369b3 are increased, the electric potential difference between the electric potential Vab and the electric potential Vr is almost zero.

In the second detection circuit 373b3, in a case where the third strain gauge 369c3 to the sixth strain gauge 369f3 are neither compressed nor expanded in the detection direction, an electric potential difference between the electric potential Vcd between the third strain gauge 369c3 and the fourth strain gauge 369d3 and the electric potential Vef between the fifth strain gauge 369e3 and the sixth strain gauge 369f3 is almost zero.

In a case where the fourth strain gauge 369d3 is compressed, and the third strain gauge 369c3 is expanded, the resistance value of the fourth strain gauge 369d3 decreases, and the resistance value of the third strain gauge 369c3 increases, whereby the electric potential Vcd increases. At this time, in a case where the fifth strain gauge 369e3 is compressed, and the sixth strain gauge 369f3 is expanded, the resistance value of the fifth strain gauge 369e3 decreases, and the resistance value of the sixth strain gauge 369f3 increases, and the electric potential Vef increases, whereby an electric potential difference between the electric potential Vcd and the electric potential Vef is almost zero. On the other hand, in a case where the fifth strain gauge 369$e$3 is expanded, and the sixth strain gauge 369$f$3 is compressed, the resistance value of the fifth strain gauge 369$e$3 increases, and the resistance value of the sixth strain gauge 369$f$3 decreases, and the electric potential Vef decreases, whereby an electric potential difference between the electric potential Vcd and the electric potential Vef occurs. In addition, in a case where the fifth strain gauge 369$e$3 and the sixth strain gauge 369$f$3 are neither compressed nor expanded, the electric potential Vef does not change, whereby an electric potential difference between the electric potential Vcd and the electric potential Vef occurs.

In a case where the fourth strain gauge 369$d$3 is expanded, and the third strain gauge 369$c$3 is compressed, the resistance value of the fourth strain gauge 369$d$3 increases, and the resistance value of the third strain gauge 369$c$3 decreases, whereby the electric potential Vcd decreases. At this time, in a case where the fifth strain gauge 369$e$3 is compressed, and the sixth strain gauge 369$f$3 is expanded, the resistance value of the fifth strain gauge 369$e$3 decreases, and the resistance value of the sixth strain gauge 369$f$3 increases, and the electric potential Vef increases, whereby an electric potential difference between the electric potential Vcd and the electric potential Vef occurs. On the other hand, in a case where the fifth strain gauge 369$e$3 is expanded, and the sixth strain gauge 369$f$3 is compressed, the resistance value of the fifth strain gauge 369$e$3 increases, and the resistance value of the sixth strain gauge 369$f$3 decreases, and the electric potential Vef decreases, whereby an electric potential difference between the electric potential Vcd and the electric potential Vef is almost zero. In addition, in a case where the fifth strain gauge 369$e$3 and the sixth strain gauge 369$f$3 are neither compressed nor expanded, the electric potential Vef does not change, whereby an electric potential difference between the electric potential Vcd and the electric potential Vef occurs.

In a case where the fourth strain gauge 369$d$3 and the third strain gauge 369$c$3 are neither compressed nor expanded, the resistance value of each of the fourth strain gauge 369$d$3 and the third strain gauge 369$c$3 does not change, whereby the electric potential Vcd does not change. At this time, in a case where the fifth strain gauge 369$e$3 is compressed and the sixth strain gauge 369$f$3 is expanded, the resistance value of the fifth strain gauge 369$e$3 decreases, and the resistance value of the sixth strain gauge 369$f$3 increases, and the electric potential Vef increases, whereby an electric potential difference between the electric potential Vcd and the electric potential Vef occurs. On the other hand, in a case where the fifth strain gauge 369$e$3 is expanded and the sixth strain gauge 369$f$3 is compressed, the resistance value of the fifth strain gauge 369$e$3 increases, and the resistance value of the sixth strain gauge 369$f$3 decreases, and the electric potential Vef decreases, whereby an electric potential difference between the electric potential Vcd and the electric potential Vef occurs.

Thus, a connection point between the first strain gauge 369$a$3 and the second strain gauge 369$b$3 at which the electric potential Vab of the first detection circuit 373$a$3 can be measured and a connection point between the two fixed resistances R at which the electric potential Vr can be measured are configured as an output (hereinafter referred to as an output A) of the first detection circuit 373$a$3. In addition, a connection point between the third strain gauge 369$c$3 and the fourth strain gauge 369$d$3 at which the electric potential Vcd of the second detection circuit 373$b$3 can be measured and the connection point between the fifth strain gauge 369$e$3 and the sixth strain gauge 369$f$3 at which the electric potential Vef can be measured are configured as an output (hereinafter referred to as an output B) of the second detection circuit 373$b$3. The outputs A and B configure the strain information.

Here, a method for detecting (measuring) the bending deformation x, the bending deformation y, the tensile deformation z, and the torsional deformation rz by using the measurement module strain detecting circuit 365 to which the first strain gauge 369$a$3, the second strain gauge 369$b$3, the third strain gauge 369$c$3, the fourth strain gauge 369$d$3, the fifth strain gauge 369$e$3, and the sixth strain gauge 369$f$3, which are arranged as illustrated in FIGS. 13A to 13C and are connected as illustrated in FIG. 14, will be described.

First, how each deformation is detected (measured) in the output A of the first detection circuit 373$a$3 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369$a$3 is compressed and thus has a decreased resistance value, and the second strain gauge 369$b$3 is expanded and thus has an increased resistance value. For this reason, the output A of the first detection circuit 373$a$3 is a positive output (the electric potential Vab is high, and the electric potential Vr is low). In addition, in a case where the right-side crank 105R is deformed from the lower face 118 toward the upper face 117, the first strain gauge 369$a$3 is expanded and has an increased resistance value, and the second strain gauge 369$b$3 is compressed and has a decreased resistance value. Accordingly, the output A of the first detection circuit 373$a$3 is a negative output (the electric potential Vab is low, and the electric potential Vr is high).

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369$a$3 and the second strain gauge 369$b$3 are compressed, and thus any one thereof has a decreased resistance value. For this reason, the output A of the first detection circuit 373$a$3 is zero (there is no electric potential difference between the electric potential Vab and the electric potential Vr). In addition, in a case where the right-side crank 105R is deformed from the inner face 119 toward the outer face 120, both the first strain gauge 369$a$3 and the second strain gauge 369$b$3 are expanded, and thus any one thereof has an increased resistance value. Accordingly, the output A of the first detection circuit 373$a$3 is zero.

In the tensile deformation z, the right-side crank 105R is deformed to be expanded or compressed in the longitudinal direction. In a case where the right-side crank 105R is expanded, both the first strain gauge 369$a$3 and the second strain gauge 369$b$3 are expanded, and thus, any one thereof has an increased resistance value. For this reason, the output A of the first detection circuit 373$a$3 is zero. On the other hand, in a case where the right-side crank 105R is compressed, both the first strain gauge 369$a$3 and the second strain gauge 369$b$3 are compressed, and thus, any one thereof has a decreased resistance value. For this reason, the output A of the first detection circuit 373$a$3 is zero.

In the torsional deformation rz, the right-side crank 105R is deformed to be twisted. In a case where the right-side crank 105R is twisted in a direction denoted by an arrow illustrated in FIG. 6B, both the first strain gauge 369a3 and the second strain gauge 369b3 are expanded, and thus any one thereof has an increased resistance value. For this reason, the output A of the first detection circuit 373a3 is zero. On the other hand, in a case where the right-side crank 105R is twisted in a direction opposite to that of the arrow illustrated in FIG. 6B, both the first strain gauge 369a3 and the second strain gauge 369b3 are expanded, and thus any one thereof has an increased resistance value. For this reason, the output A of the first detection circuit 373a3 is zero.

As above, only the bending deformation x is detected from the output A. In other words, the first strain gauge 369a3 and the second strain gauge 369b3 are connected to the first detection circuit 373a3, and the first detection circuit 373a3 detects a rotating-direction strain generated in the crank 105.

Next, how each deformation is detected (measured) in the output B of the second detection circuit 373b3 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the third strain gauge 369c3 is compressed and thus has a decreased resistance value, and the fourth strain gauge 369d3 is expanded and thus has an increased resistance value. Meanwhile, the fifth strain gauge 369e3 is expanded and thus has an increased resistance value, and the sixth strain gauge 369f3 is compressed and thus has a decreased resistance value. For this reason, the output B of the second detection circuit 373b3 is zero. On the other hand, in a case where the right-side crank 105R is deformed from the lower face 118 toward the upper face 117, the third strain gauge 369c3 is expanded and thus has an increased resistance value, and the fourth strain gauge 369d3 is compressed and thus has a decreased resistance value. Meanwhile, the fifth strain gauge 369e3 is compressed and has a decreased resistance value, and the sixth strain gauge 369f3 is expanded and has an increased resistance value. Accordingly, the output B of the second detection circuit 373b3 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, the third strain gauge 369c3 to the sixth strain gauge 369f3 are neither compressed nor expanded in the detection direction, and thus there is no change in each resistance value. For this reason, the output B of the second detection circuit 373b3 is zero. On the other hand, in a case where the right-side crank 105R is deformed from the inner face 119 toward the outer face 120, the third strain gauge 369c3 to the sixth strain gauge 369f3 are neither compressed nor expanded in the detection direction, and thus there is no change in each resistance value thereof. Accordingly, the output B of the second detection circuit 373b3 is zero.

In the tensile deformation z, the right-side crank 105R is deformed to be expanded or compressed in the longitudinal direction. In case where the right-side crank 105R is expanded, the third strain gauge 369c3 is compressed and thus has a decreased resistance value, and the fourth strain gauge 369d3 is expanded and thus has an increased resistance value. Meanwhile, the fifth strain gauge 369e3 is compressed and thus has a decreased resistance value, and the sixth strain gauge 369f3 is expanded and thus has an increased resistance value. For this reason, the output B of the second detection circuit 373b3 is a positive output (the electric potential Vef is high, and the electric potential Vcd is low). On the other hand, in case where the right-side crank 105R is compressed, the third strain gauge 369c3 is expanded and thus has an increased resistance value, and the fourth strain gauge 369d3 is compressed and thus has a decreased resistance value. Meanwhile, the fifth strain gauge 369e3 is expanded and thus has an increased resistance value, and the sixth strain gauge 369f3 is compressed and thus has a decreased resistance value. For this reason, the output B of the second detection circuit 373b3 is a negative output (the electric potential Vef is low, and the electric potential Vcd is high).

In the torsional deformation rz, the right-side crank 105R is deformed to be twisted. In a case where the right-side crank 105R is twisted in the direction denoted by the arrow illustrated in FIG. 6B, the third strain gauge 369c3 is neither compressed nor expanded in the detection direction and there is no change in the resistance value, and the fourth strain gauge 369d3 is expanded and thus has an increased resistance value. Meanwhile, the fifth strain gauge 369e3 is neither compressed nor expanded in the detection direction and thus there is no change in the resistance value, and the sixth strain gauge 369f3 is expanded and thus has an increased resistance value. For this reason, the output B of the second detection circuit 373b3 is a positive output. On the other hand, in a case where the right-side crank 105R is twisted in a direction opposite to the direction denoted by the arrow illustrated in FIG. 6B, the third strain gauge 369c3 is neither compressed nor expanded in the detection direction and thus there is no change in the resistance value, and the fourth strain gauge 369d3 is expanded and thus has an increased resistance value. Meanwhile, the fifth strain gauge 369e3 is neither compressed nor expanded in the detection direction and thus there is no change in the resistance value, and the sixth strain gauge 369f3 is expanded and thus has an increased resistance value. For this reason, the output B of the second detection circuit 373b3 is a positive output.

As above, the tensile deformation z and the torsional deformation rz are detected from the output B. In other words, the third strain gauge 369c3 to the sixth strain gauge 369f3 are connected to the second detection circuit 373b3, and the second detection circuit 373b3 detects a pulling-direction strain generated in the crank 105.

Then, based on the output A of the first detection circuit 373a3 and the output B of the second detection circuit 373b3, the propulsion force Ft is calculated using Equation (1) represented in the first embodiment, and the loss force Fr is calculated by using the following Equation (7). Equation (1) is presented again as below.

$$Ft = p(A-A0) + q(B-B0) [kgf] \quad (1)$$

$$Fr = -s|A-A0| + u(B-B0) [kgf] \quad (7)$$

Here, p, q, s, u are coefficients and are values calculated by the simultaneous equations of Equations (3) to (6) represented in the first embodiment. Equations (3) to (6) are presented again as below.

$$m = p(Am-A0) + q(Be-B0) \quad (3)$$

$$0 = s(Am-A0) + u(Be-B0) \quad (4)$$

$$0 = p(Ae-A0) + q(Bm-B0) \quad (5)$$

$$m = s(Ae-A0) + u(Bm-B0) \quad (6)$$

Since the coefficients p, q, s, and u and A0 and B0 are values that can be calculated in advance or can be measured, by substituting A and B in Equations (1) and (7), the propulsion force Ft and the loss force Fr can be calculated.

In addition, in Equation (1), the output A is corrected by using the output B. In Equation (7), the output B is corrected by using the output A. In other words, the measurement module control unit 351 executing calculation of each equation to be described later serves as a correction means. Accordingly, the influence of the strain other than the detection target included in the first detection circuit 373$a$3 or the second detection circuit 373$b$3 can be excluded. In addition, in a case where there is no deviation of the first strain gauge 369$a$3 and the second strain gauge 369$b$3 from the crank direction (a direction parallel to the center axis C1), Ae=A0, and the correction according to the output B is not necessary.

The propulsion force Ft and the loss force Fr calculated in this way, similarly to the first embodiment, are transmitted to the cycle computer 201. The operation of the measurement module control unit 351 and the operations of the cycle computer 201 and the cadence sensor 501 are similar to those represented in the flowcharts illustrated in FIGS. 7A to 8C.

According to this embodiment, the measurement module 301 includes: the first strain gauge 369$a$3 and the second strain gauge 369$b$3 disposed on the inner face 119 of the crank 105 of the bicycle 1; the third strain gauge 369$c$3 and the fourth strain gauge 369$d$3 disposed on the upper face 117 of the crank 105; the fifth strain gauge 369$e$3 and the sixth strain gauge 369$f$3 disposed on the lower face 118 of the crank 105; the first detection circuit 373$a$3, to which the first strain gauge 369$a$3 and the second strain gauge 369$b$3 are connected, detecting the bending deformation x occurring in the crank 105; and the second detection circuit 373$b$3, to which the third strain gauge 369$c$3 to the sixth strain gauge 369$f$3 are connected, detecting the tensile deformation z occurring in the crank 105. In addition, the first strain gauge 369$a$3, the second strain gauge 369$b$3, the fourth strain gauge 369$d$3, and the sixth strain gauge 369$f$3 are disposed such that the detection directions thereof are parallel to the longitudinal direction of the crank 105, and the third strain gauge 369$c$3 and the fifth strain gauge 369$e$3 are disposed such that the detection directions thereof are perpendicular to the longitudinal direction of the crank 105. Accordingly, the propulsion force Ft and the loss force Fr participating to the crank 105 can be measured based on the bending deformation x detected by the first detection circuit 373$a$3 and the tensile deformation z detected by the second detection circuit 373$b$3. Thus, the propulsion force Ft and the loss force Fr can be measured by using a simple method. In addition, by arranging the first strain gauge 369$a$3 and the second strain gauge 369$b$3 on the inner face 119 of the crank 105, there is no intervention with the user's foot.

In addition, since the first strain gauge 369$a$3 and the second strain gauge 369$b$3 are disposed to be symmetrical with respect to the center axis C1 in the longitudinal direction of the inner face 119 of the crank 105, the bending deformation x can be detected with high accuracy.

In addition, since the first detection circuit 373$a$3 and the second detection circuit 373$b$3 are configured as bridge circuits, the first strain gauge 369$a$3 and the second strain gauge 369$b$3 are connected in series with the power supply in the bridge circuit configuring the first detection circuit 373$a$3, the third strain gauge 369$c$3 and the fifth strain gauge 369$e$3 and the fourth strain gauge 369$d$3 and the sixth strain gauge 369$f$3 are connected to positions of opposite angles in the bridge circuit configuring the second detection circuit 373$b$3, and resistors other than the first strain gauge 369$a$3 and the second strain gauge 369$b$3 of the bridge circuit configuring the first detection circuit 373$a$3 are configured by fixed resistances R, the bending deformation x and the tensile deformation z can be detected using the bridge circuits, whereby the propulsion force Ft and the loss force Fr can be measured by employing a simple circuit configuration.

Furthermore, since the torsional deformation rz does not act on the calculation of the propulsion force Ft, the propulsion force Ft does not change also when the load position on the pedal 103 is changed.

In addition, in the description presented above, while the third strain gauge 369$c$3 and the fourth strain gauge 369$d$3 are arranged as separate components, for example, the strain gauges may overlap each other in a cross shape. Furthermore, while the fifth strain gauge 369$e$3 and the sixth strain gauge 369$f$3 are arranged as separate components, for example, the strain gauges may overlap each other in a cross shape. By configuring as such, the size of the strain gauge 369 arranged in the crank 105 can be decreased. Furthermore, the order of the arrangement of the third strain gauge 369$c$3 and the fourth strain gauge 369$d$3 and the order of the arrangement of the fifth strain gauge 369$e$3 and the sixth strain gauge 369$f$3 may be opposite to those illustrated in FIGS. 13A to 13C and are not particularly limited.

Furthermore, in the first detection circuit 373$a$3, the connection order of the first strain gauge 369$a$3 and the second strain gauge 369$b$3 may be reversed. In the second detection circuit 373$b$3, the connection order of the third strain gauge 369$c$3 and the fourth strain gauge 369$d$3 may be reversed, however, in such a case, the connection order of the fifth strain gauge 369$e$3 and the sixth strain gauge 369$f$3 needs to be changed as well. In other words, in the second detection circuit 373$b$3, the positional relation of the opposite angles needs to be maintained.

Fourth Embodiment

Next, a measuring device according to a fourth embodiment of the present invention will be described with reference to FIGS. 15 to 17. The same reference numeral will be assigned to the same part as that of the first embodiment described above, and the description thereof will not be presented.

In this embodiment, the configuration of a measurement module strain detecting circuit 365 of a measurement module 301 and the arrangement of a strain gauge 369 are different from those of the first embodiment. The strain gauge 369 according to this embodiment, as illustrated in FIG. 15, is configured by: a first strain gauge 369$a$4; a second strain gauge 369$b$4; a third strain gauge 369$c$4; and a fourth strain gauge 369$d$4. Then, the terminals of the strain gauge 369 are connected to the measurement module strain detecting circuit 365.

Figures 16A, 16B:
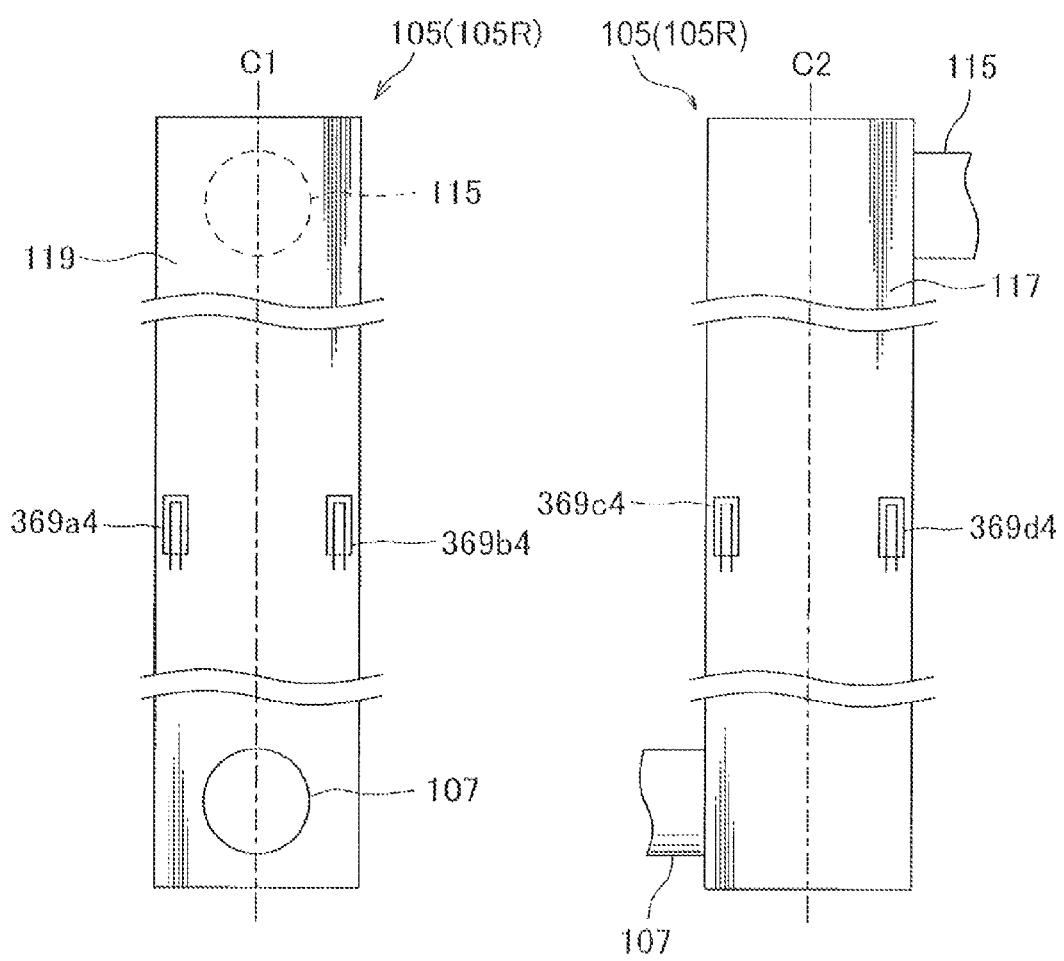
FIGS. 16A and 16B are explanatory diagrams of the arrangement of a strain gauge illustrated in FIG. 15 in a crank.

FIGS. 16A and 16B illustrate the arrangement of the strain gauge 369 according to this embodiment in a crank 105. The strain gauge 369 is bonded to the inner face 119 and the upper face 117 of the crank 105. Here, the inner face of the crank 105 is a face on which the crankshaft 107 is disposed to project (connected) and is a face (side face) parallel to a plane including a circle that is defined by the rotational movement of the crank 105. The upper face 117 of the crank 105 is one of faces, of which the longitudinal directions extend in the same direction as that of the inner face 119 and the outer face 120 (extending in the diameter direction of a circle defined by the rotational movement of the crank 105), being orthogonal to the inner face 119. In addition, while not illustrated in FIGS. 16A and 16B, the outer face 120 of the crank 105 is a face, on which the pedal crankshaft 115 is disposed to project (connected), facing the inner face 119. In other words, the outer face is a face on which the pedal 103 is disposed to be freely rotatable. The lower face 118 of the crank 105 is a face that faces the upper face 117.

The first strain gauge 369a and the second strain gauge 369b, as illustrated in FIG. 16A, are disposed on the inner face 119 of the crank 105. The first strain gauge 369a and the second strain gauge 369b are disposed such that the detection direction is parallel to the longitudinal direction of the crank 105, in other words, parallel to a center axis C1 of the inner face 119 and is symmetrical with respect to the center axis C1 of the inner face 119.

The third strain gauge 369c and the fourth strain gauge 369d, as illustrated in FIG. 16B, are disposed on the upper face 117 of the crank 105. The third strain gauge 369c and the fourth strain gauge 369d are disposed such that the detection directions thereof are parallel to the longitudinal direction of the crank 105, in other words, parallel to the center axis C2 of the upper face 117 and are disposed to be symmetrical with respect to the center axis C2 of the upper face 117.

In other words, a direction (the vertical direction in FIGS. 16A and 16B) parallel to the center axes C1 and C2 that are axes extending in the longitudinal direction of the crank 105, in other words, a direction parallel to the longitudinal direction of the crank 105 is the detection direction of each of the first strain gauge 369a4 to the fourth strain gauge 369d4.

The arrangement of the first strain gauge 369a4 to the fourth strain gauge 369d4 is not limited to that illustrated in FIGS. 16A and 16B. In other words, any other arrangement may be employed as long as the parallel relation with the center axes C1 and C2 is maintained. However, it is preferable to arrange the first strain gauge 369a4 and the second strain gauge 369b4 to be symmetrical to each other with the center axis C1 being interposed therebetween and to arrange the third strain gauge 369c4 and the fourth strain gauge 369d4 to be symmetrical to each other with the center axis C2 being interposed therebetween for detecting each deformation to be described later with high accuracy.

In the case illustrated in FIGS. 16A and 16B, while the crank 105 is described as a simple rectangular parallelepiped, according to a design or the like, the corner may be rounded, and some faces thereof may be configured as curved faces. Even in such a case, by arranging the strain gauge 369 such that the arrangement described above is maintained as much as possible, each deformation to be described later can be detected. However, as the relation (parallel) with the center axes C1 and C2 described above is out of alignment, the detection accuracy decreases.

The first strain gauge 369a4, the second strain gauge 369b4, the third strain gauge 369c4, and the fourth strain gauge 369d4 are connected to the measurement module strain detecting circuit 365, and the strain amount of the strain gauge 369 is output as a voltage. The output of the measurement module strain detecting circuit 365 is converted from analog information into strain information that is digital information by a measurement module A/D 363. Then, a strain information signal is output to the measurement module storage unit 353. The strain information signal input to the measurement module storage unit 353 is stored in the measurement module RAM 355 as the strain information.

Figure 17:
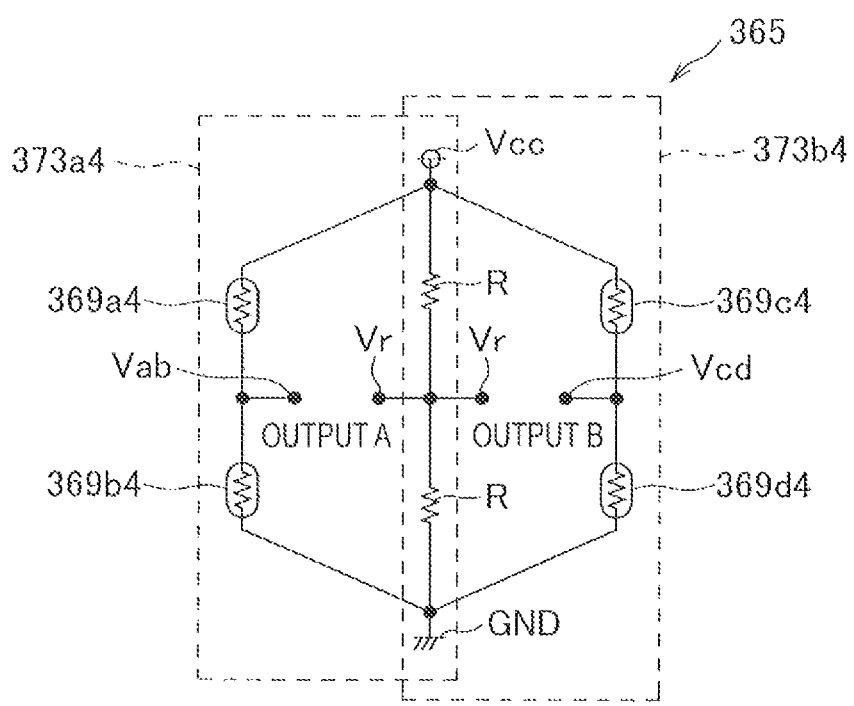
FIG. 17 is a circuit diagram of a measurement module strain detecting circuit illustrated in FIG. 15.

The measurement module strain detecting circuit 365 is illustrated in FIG. 17. The measurement module strain detecting circuit 365 is configured by a first detection circuit 373a4 and a second detection circuit 373b4 that are two bridge circuits. On a first system side of the first detection circuit 373a4, the first strain gauge 369a4 and the second strain gauge 369b4 are sequentially connected in order from a power supply Vcc. In other words, the first strain gauge 369a4 and the second strain gauge 369b4 are connected in series with the power supply Vcc. On a second system side, a fixed resistance R and a fixed resistance R are sequentially connected in order from the power supply Vcc. On a first system side of the second detection circuit 373b4, the third strain gauge 369c4 and the fourth strain gauge 369d4 and are sequentially connected in order from the power supply Vcc. In other words, the third strain gauge 369c4 and the fourth strain gauge 369d4 are connected in series with the power supply Vcc. On a second system side, a fixed resistance R and a fixed resistance R are sequentially connected in order from the power supply Vcc.

In other words, the two fixed resistances R are shared by the first detection circuit 373a4 and the second detection circuit 373b4. Here, the two fixed resistances R has a same resistance value. In addition, the two fixed resistances R have the same resistance value as that of the strain gauge 369 before the occurrence of compression or expansion. Furthermore, the first strain gauge 369a4 to the fourth strain gauge 369d4 have the same resistance value.

As is known, the resistance value of the strain gauge 369 has a decreased resistance value in the case of compression and has an increased resistance value in the case of expansion. Such a change in the resistance value has a proportional relation in a case where the amount of the change is small. In addition, the detection direction of the strain gauge 369 is a direction in which the wiring grows, and, as described above, the detection direction of the first strain gauge 369a4 to the fourth strain gauge 369d4 is the direction parallel to the center axes C1 and C2. In a case where compression or expansion occurs in a direction other than the detection direction, a change in the resistance value of the strain gauge 369 does not occur.

In the first detection circuit 373a4 using the strain gauge 369 having such characteristics, in a case where the first strain gauge 369a4 and the second strain gauge 369b4 are not compressed or expanded in the detection direction, an electric potential difference between electric potential Vab between the first strain gauge 369a4 and the second strain gauge 369b4 and electric potential Vr between the two fixed resistances R is almost zero.

In a case where the first strain gauge 369a4 is compressed, and the second strain gauge 369b4 is expanded, since the resistance value of the first strain gauge 369a4 is decreased, and the resistance value of the second strain gauge 369b4 is increased, the electric potential Vab increases, but the electric potential Vr does not change. In other words, an electric potential difference between the electric potential Vab and the electric potential Vr occurs. In a case where the first strain gauge 369a4 is expanded, and the second strain gauge 369b4 is compressed, since the resistance value of the first strain gauge 369a4 is increased, and the resistance value of the second strain gauge 369b4 is decreased, the electric potential Vab decreases, but the electric potential Vr does not change. In other words, an electric potential difference between the electric potential Vab and the electric potential Vr occurs.

In a case where both the first strain gauge 369a4 and the second strain gauge 369b4 are compressed, since the resistance values of both the first strain gauge 369a4 and the second strain gauge 369b4 are decreased, the electric potential difference between the electric potential Vab and the electric potential Vr is almost zero. In a case where both the first strain gauge 369a4 and the second strain gauge 369b4 are expanded, since the resistance values of both the first strain gauge 369a4 and the second strain gauge 369b4 are increased, the electric potential difference between the electric potential Vab and the electric potential Vr is almost zero.

The operation of the second detection circuit 373b4 is similar to that of the first detection circuit 373a4. In other words, in a case where the third strain gauge 369c4 is compressed, and the fourth strain gauge 369d4 is expanded, the electric potential Vcd increases, but the electric potential Vr decreases, whereby an electric potential difference between the electric potential Vcd and the electric potential Vr occurs. In a case where the third strain gauge 369c4 is expanded, and the fourth strain gauge 369d4 is compressed, the electric potential Vcd decreases, but the electric potential Vr increases, whereby an electric potential difference between the electric potential Vcd and the electric potential Vr occurs. In a case where both the third strain gauge 369c4 and the fourth strain gauge 369d4 are compressed and in a case where both the third strain gauge 369c4 and the fourth strain gauge 369d4 are expanded, the electric potential difference between the electric potential Vcd and the electric potential Vr is almost zero.

Thus, a connection point between the first strain gauge 369a4 and the second strain gauge 369b4 at which the electric potential Vab of the first detection circuit 373a4 can be measured and a connection point between the two fixed resistances R at which the electric potential Vr can be measured are configured as an output (hereinafter referred to as an output A) of the first detection circuit 373a4. In addition, a connection point between the third strain gauge 369c4 and the fourth strain gauge 369d4 at which the electric potential Vcd of the second detection circuit 373b4 can be measured and the connection point between the two fixed resistances R at which the electric potential Vr can be measured are configured as an output (hereinafter referred to as an output B) of the second detection circuit 373b4. The outputs A and B configure the strain information.

Here, in the case of the arrangement as illustrated in FIGS. 16A and 16B, a method for detecting (measuring) the bending deformation x, the bending deformation y, the tensile deformation z, and the torsional deformation rz by using the measurement module strain detecting circuit 365 to which the first strain gauge 369a4, the second strain gauge 369b4, the third strain gauge 369c4, and the fourth strain gauge 369d4 are connected as illustrated in FIG. 17 will be described.

First, how each deformation is detected (measured) in the output A of the first detection circuit 373a4 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369a is compressed and thus has a decreased resistance value, and the second strain gauge 369b4 is expanded and thus has an increased resistance value. For this reason, the output A of the first detection circuit 373a4 is a positive output (the electric potential Vab is high, and the electric potential Vr is low). In addition, in a case where the right-side crank 105R is deformed from the lower face 118 toward the upper face 117, the first strain gauge 369a4 is expanded and has an increased resistance value, and the second strain gauge 369b4 is compressed and has a decreased resistance value.

Accordingly, the output A of the first detection circuit 373a4 is a negative output (the electric potential Vab is low, and the electric potential Vr is high).

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369a4 and the second strain gauge 369b4 are compressed, and thus any one thereof has a decreased resistance value. For this reason, the output A of the first detection circuit 373a4 is zero (there is no electric potential difference between the electric potential Vab and the electric potential Vr). On the other hand, in a case where the right-side crank 105R is deformed from the inner face 119 toward the outer face 120, both the first strain gauge 369a4 and the second strain gauge 369b4 are expanded, and thus any one thereof has an increased resistance value. Accordingly, the output A of the first detection circuit 373a4 is zero.

In the tensile deformation z, the right-side crank 105R is deformed to be expanded or compressed in the longitudinal direction. In a case where the right-side crank 105R is expanded, both the first strain gauge 369a4 and the second strain gauge 369b4 are expanded, and thus, any one thereof has an increased resistance value. For this reason, the output A of the first detection circuit 373a4 is zero. On the other hand, in a case where the right-side crank 105R is compressed, both the first strain gauge 369a4 and the second strain gauge 369b4 are compressed, and thus, any one thereof has a decreased resistance value. For this reason, the output A of the first detection circuit 373a4 is zero.

In the torsional deformation rz, the right-side crank 105R is deformed to be twisted. In a case where the right-side crank 105R is twisted in a direction denoted by an arrow illustrated in FIG. 6B, both the first strain gauge 369a4 and the second strain gauge 369b4 are expanded, and thus any one thereof has an increased resistance value. For this reason, the output A of the first detection circuit 373a4 is zero. On the other hand, in a case where the right-side crank 105R is twisted in a direction opposite to that of the arrow illustrated in FIG. 6B, both the first strain gauge 369a4 and the second strain gauge 369b4 are expanded, and thus any one thereof has an increased resistance value. For this reason, the output A of the first detection circuit 373a4 is zero.

As above, only the bending deformation x is detected from the output A. In other words, the first strain gauge 369a4 and the second strain gauge 369b4 are connected to the first detection circuit 373a4, and the first detection circuit 373a4 detects a rotating-direction strain generated in the crank 105.

Next, how each deformation is detected (measured) in the output B of the second detection circuit 373b4 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, both the third strain gauge 369c4 and the fourth strain gauge 369d4 are expanded and thus have an increased resistance value. For this reason, the output B of the second detection circuit 373b4 is zero. On the other hand, in a case where the right-side crank 105R is deformed from the lower face 118 toward the upper face 117, both the third strain gauge 369c4 and the fourth strain gauge 369d4 are compressed and have a decreased resistance value. For this reason, the output B of the second detection circuit 373b4 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, the third strain gauge 369c4 is compressed and thus has a decreased resistance value, and the fourth strain gauge 369d4 is expanded and thus has an increased resistance value. For this reason, the output B of the second detection circuit 373b4 is a positive output (the electric potential Vcd is high, and the electric potential Vr is low). On the other hand, in a case where the right-side crank 105R is deformed from the inner face 119 toward the outer face 120, the third strain gauge 369c4 is expanded and thus has an increased resistance value, and the fourth strain gauge 369d4 is compressed and thus has a decreased resistance value. For this reason, the output B of the second detection circuit 373b4 is a negative output (the electric potential Vcd is low, and the electric potential Vr is high).

In the tensile deformation z, the right-side crank 105R is deformed to be expanded or compressed in the longitudinal direction. In a case where the right-side crank 105R is expanded, both the third strain gauge 369c4 and the fourth strain gauge 369d4 are expanded, and thus have an increased resistance value. For this reason, the output B of the second detection circuit 373b4 is zero. On the other hand, in a case where the right-side crank 105R is compressed, both the third strain gauge 369c4 and the fourth strain gauge 369d4 are compressed and thus have a decreased resistance value. For this reason, the output B of the second detection circuit 373b4 is zero.

In the torsional deformation rz, the right-side crank 105R is deformed to be twisted. In a case where the right-side crank 105R is twisted in a direction denoted by the arrow illustrated in FIG. 6B, both the third strain gauge 369c4 and the fourth strain gauge 369d4 are expanded and thus have an increased resistance value. For this reason, the output B of the second detection circuit 373b4 is zero. On the other hand, in a case where the right-side crank 105R is twisted in a direction opposite to that of the arrow illustrated in FIG. 6B, both the third strain gauge 369c4 and the fourth strain gauge 369d4 are expanded and thus have an increased resistance value. For this reason, the output B of the second detection circuit 373b4 is zero.

As above, the bending deformation y is detected from the output B. In other words, the third strain gauge 369c4 and the fourth strain gauge 369d4 are connected to the second detection circuit 373b4, and the second detection circuit 373b4 detects an inward/outward strain generated in the crank 105.

Then, based on the output A of the first detection circuit 373a4 and the output B of the second detection circuit 373b4, the propulsion force Ft is calculated using Equation (1) represented in the first embodiment, and the loss force Fr is calculated by using the following Equation (8). Equation (1) is presented again as below.

$$Ft = p(A - A0) + q(B - B0) [kgf] \quad (1)$$

$$Fr = s(A - A0) + u(B - B0) [kgf] \quad (8)$$

Here, p, q, s, u are coefficients and are values calculated by the simultaneous equations of Equations (3) to (6) represented in the first embodiment. Equations (3) to (6) are presented again as below.

$$m = p(Am - A0) + q(Be - B0) \quad (3)$$

$$0 = s(Am - A0) + u(Be - B0) \quad (4)$$

$$0 = p(Ae - A0) + q(Bm - B0) \quad (5)$$

$$m = s(Ae - A0) + u(Bm - B0) \quad (6)$$

Since the coefficients p, q, s, and u and A0 and B0 are values that can be calculated in advance or can be measured, by substituting A and B in Equations (1) and (8), the propulsion force Ft and the loss force Fr can be calculated.

In addition, in Equation (1), the output A is corrected by using the output B. In Equation (8), the output B is corrected by using the output A. In other words, the measurement module control unit 351 executing calculation of each equation to be described later serves as a correction means. Accordingly, the influence of the strain other than the detection target included in the first detection circuit 373a4 or the second detection circuit 373b4 can be excluded. In addition, in a case where there is no deviation of the first strain gauge 369a4 and the second strain gauge 369b4 from the crank direction (a direction parallel to the center axis C1), Ae=A0, and the correction according to the output B is not necessary. Furthermore, in a case where there is no deviation of the third strain gauge 369c4 and the fourth strain gauge 369d4 from the crank direction, Be=B0, and the correction according to the output A is not necessary.

The propulsion force Ft and the loss force Fr calculated in this way, similarly to the first embodiment, are transmitted to the cycle computer 201. The operation of the measurement module control unit 351 and the operations of the cycle computer 201 and the cadence sensor 501 are similar to those represented in the flowcharts illustrated in FIGS. 7A to 8C.

According to this embodiment, the measurement module 301 includes: the first strain gauge 369a4 and the second strain gauge 369b4 disposed on the inner face 119 of the crank 105 of the bicycle 1; the third strain gauge 369c4 and the fourth strain gauge 369d4 disposed on the upper face 117 of the crank 105; the first detection circuit 373a4, to which the first strain gauge 369a4 and the second strain gauge 369b4 are connected, detecting the bending deformation x occurring in the crank 105; and the second detection circuit 373b4, to which the third strain gauge 369c4 and the fourth strain gauge 369d4 are connected, detecting the bending deformation y occurring in the crank 105. In addition, the first strain gauge 369a4 to the fourth strain gauge 369d4 are disposed such that the detection directions thereof are parallel to the longitudinal direction of the crank 105. Accordingly, the propulsion force Ft and the loss force Fr participating to the crank 105 can be measured based on the bending deformation x detected by the first detection circuit 373a4 and the bending deformation y detected by the second detection circuit 373b4. Thus, the propulsion force Ft and the loss force Fr can be measured by using a simple method. In addition, by arranging the first strain gauge 369a4 and the second strain gauge 369b4 on the inner face 119 of the crank 105, there is no intervention with the user's foot.

In addition, since the first strain gauge 369a4 and the second strain gauge 369b4 are disposed to be symmetrical with respect to the center axis C1 in the longitudinal direction of the inner face 119 of the crank 105, the bending deformation x can be detected with high accuracy.

Furthermore, since the third strain gauge 369c4 and the fourth strain gauge 369d4 are disposed to be symmetrical with respect to the center axis C2 in the longitudinal direction of the upper face 117 of the crank 105, the bending deformation y can be detected with high accuracy.

In addition, since the first detection circuit 373a4 and the second detection circuit 373b4 are configured as bridge circuits, the first strain gauge 369a4 and the second strain gauge 369b4 are connected in series with the power supply in the bridge circuit configuring the first detection circuit 373a4, the third strain gauge 369c4 and the fourth strain gauge 369d4 are connected in series with the power supply in the bridge circuit configuring the second detection circuit 373b4, and resistors other than the first strain gauge 369a4 to the fourth strain gauge 369d4 of the bridge circuit configuring the first detection circuit 373a4 and the bridge circuit configuring the second detection circuit 373b4 are configured by fixed resistances R, the bending deformation x and the bending deformation y can be detected using the bridge circuits, whereby the propulsion force Ft and the loss force Fr can be measured by employing a simple circuit configuration.

In addition, since the fixed resistance R is shared by the first detection circuit and the second detection circuit, the first detection circuit and the second detection circuit can be configured substantially as one circuit, and accordingly, the circuit can be further simplified.

Furthermore, since the torsional deformation rz does not act on the calculation of the propulsion force Ft, the propulsion force Ft does not change also when the load position on the pedal 103 is changed.

Furthermore, in the first detection circuit 373a4, the connection order of the first strain gauge 369a4 and the second strain gauge 369b4 may be reversed. In the second detection circuit 373b4, the connection order of the third strain gauge 369c4 and the fourth strain gauge 369d4 may be reversed.

Fifth Embodiment

Next, a measuring device according to a fifth embodiment of the present invention will be described with reference to FIGS. 18 to 21. The same reference numeral will be assigned to the same part as that of the first embodiment described above, and the description thereof will not be presented.

Figure 18:
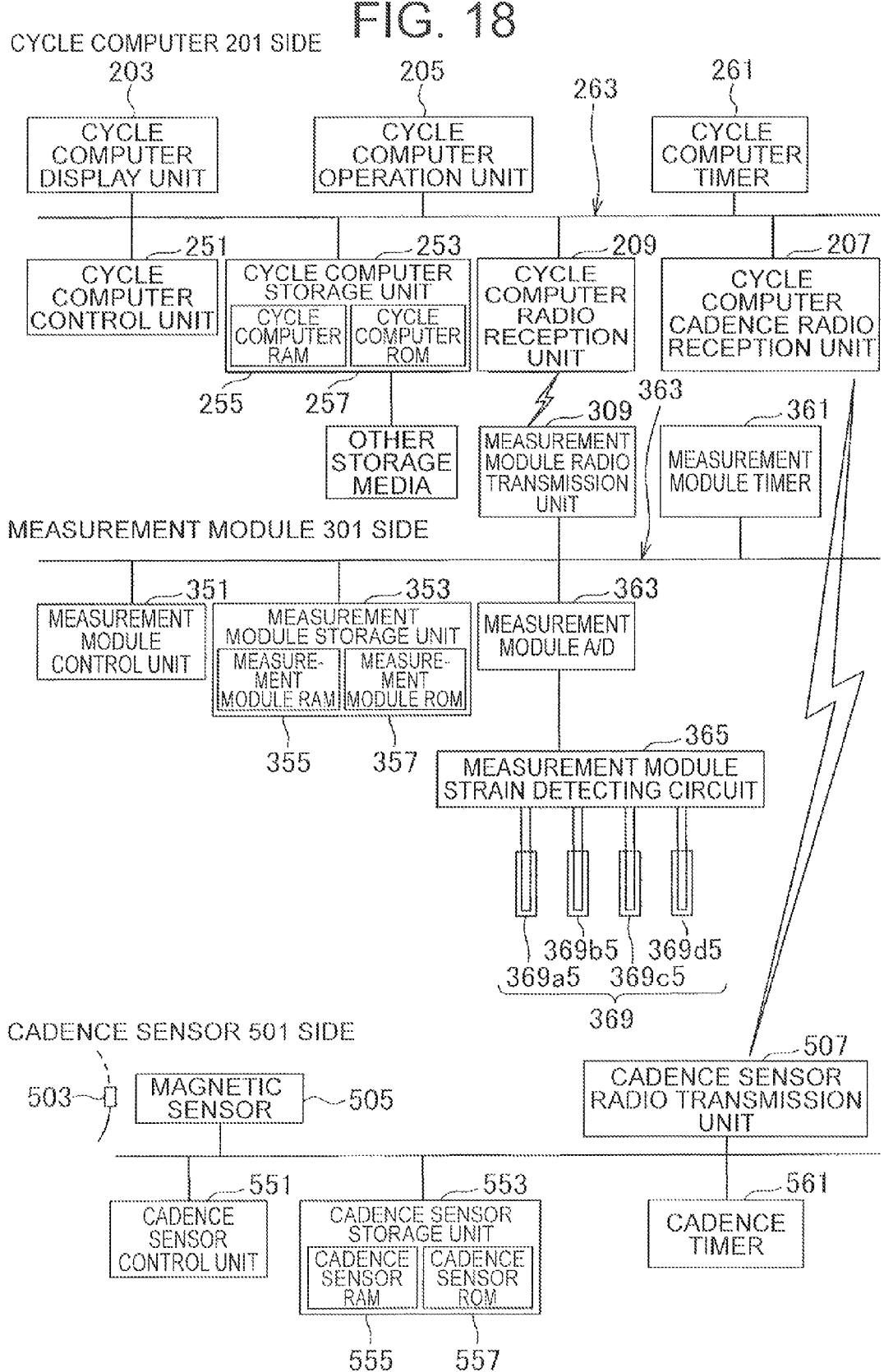
FIG. 18 is a block configuration diagram of a cycle computer, a measurement module, and a cadence sensor according to a fifth embodiment of the present invention.

In this embodiment, the configuration of a measurement module strain detecting circuit 365 of a measurement module 301 and the arrangement of a strain gauge 369 are different from those of the first embodiment. The strain gauge 369 according to this embodiment, as illustrated in FIG. 18, is configured by: a first strain gauge 369a5; a second strain gauge 369b5; a third strain gauge 369c5; and a fourth strain gauge 369d5. Then, the terminals of the strain gauge 369 are connected to the measurement module strain detecting circuit 365.

Figure 19:
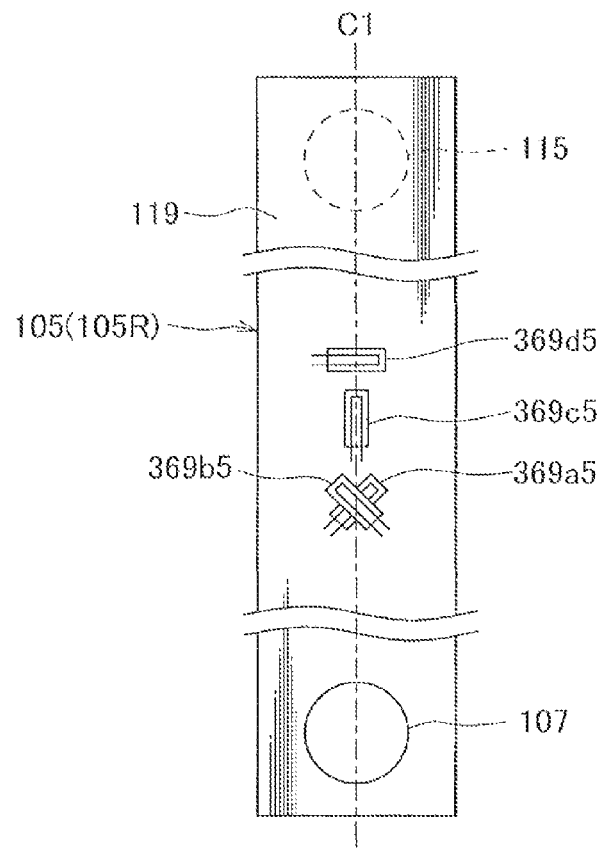
FIG. 19 is an explanatory diagram of the arrangement of a strain gauge illustrated in FIG. 18 in a crank.

FIG. 19 illustrates the arrangement of the strain gauge 369 in the crank 105 in this embodiment. The strain gauge 369 is bonded to the inner face 119 of the crank 105. Here, the inner face of the crank 105 is a face on which the crankshaft 107 is disposed to project (connected) and is a face (side face) parallel to a plane including a circle that is defined by the rotational movement of the crank 105. In addition, while not illustrated in FIG. 19, the outer face 120 of the crank 105 is a face, on which the pedal crankshaft 115 is disposed to project (connected), facing the inner face 119. In other words, the outer face is a face on which the pedal 103 is disposed to be freely rotatable. An upper face 117 of the crank 105 has the longitudinal direction extending in the same direction as those of the inner face 119 and the outer face 120 and is one of faces orthogonal to the inner face 119 and the outer face 120. A lower face 118 of the crank 105 is a face that faces the upper face 117.

The first strain gauge 369a5 and the second strain gauge 369b5 are arranged to be orthogonal to each other and overlap (multi-layered) each other. In addition, the strain gauges are arranged such that a middle direction between the detection direction of the first strain gauge 369a5 and the detection direction of the second strain gauge 369b5 is the longitudinal direction of the crank 105. In other words, the detection direction of the first strain gauge 369a5 and the axial direction of the crank 105 form an angle of 45 degrees. The detection direction of the second strain gauge 369b5 and the axial direction of the crank 105 form an angle of 45 degrees. In addition, an intersection portion at which the first strain gauge 369a5 and the second strain gauge 369b5 is arranged on the center axis C1 of the inner face 119. In other words, the first strain gauge 369a5 and the second strain gauge 369b5 are arranged to be symmetrical with respect to the center axis C1 as the center.

The third strain gauge 369c5 is disposed such that the detection direction is parallel to the longitudinal direction of the crank 105, in other words, parallel to the center axis C1 of the inner face 119 and is disposed on the center axis C1. The fourth strain gauge 369d5 is disposed such that the detection direction is perpendicular to the longitudinal direction of the crank 105, in other words, perpendicular to the center axis C1 of the inner face 119 and is disposed on the center axis C1.

In other words, a direction (the vertical direction in FIG. 19) parallel to the center axis C1 that is an axis extending in the longitudinal direction of the crank 105, in other words, a direction parallel to the longitudinal direction of the crank 105, is the detection direction of the third strain gauge 369c5, and a direction (the horizontal direction in FIG. 19) perpendicular to the center axis C1, in other words, a direction perpendicular to the longitudinal direction of the crank 105, is the detection direction of the fourth strain gauge 369d5. Accordingly, the detection directions of the third strain gauge 369c5 and the fourth strain gauge 369d5 are orthogonal to each other.

Here, the arrangement of the first strain gauge 369a5 to the fourth strain gauge 369d5 is not limited to that illustrated in FIG. 19. In other words, any other arrangement may be employed as long as the third strain gauge 369c5 and the fourth strain gauge 369d5 are maintained to have a parallel or perpendicular relation with the center axis C1, and the first strain gauge 369a5 and the second strain gauge 369b5 are orthogonal to each other and are maintained to have a 45 degrees relation with the center axis C1. However, the strain gauges are preferably arranged on the center axis C1 for detecting each deformation to be described later with high accuracy.

In the case illustrated in FIG. 19, while the crank 105 is described as a simple rectangular parallelepiped, according to a design or the like, the corner may be rounded, and some faces thereof may be configured as curved faces. Even in such a case, by arranging the strain gauge 369 such that the arrangement described above is maintained as much as possible, each deformation to be described later can be detected. However, as the relation (parallel, perpendicular, or 45 degrees) with the center axis C1 described above and the orthogonal relation between the first strain gauge 369a5 and the second strain gauge 369b5 are out of alignment, the detection accuracy decreases.

The first strain gauge 369a5, the second strain gauge 369b5, the third strain gauge 369c5, and the fourth strain gauge 369d5 are connected to the measurement module strain detecting circuit 365, and the strain amount of the strain gauge 369 is output as a voltage. The output of the measurement module strain detecting circuit 365 is converted from analog information into strain information that is digital information by a measurement module A/D 363.

Then, a strain information signal is output to the measurement module storage unit 353. The strain information signal input to the measurement module storage unit 353 is stored in the measurement module RAM 355 as the strain information.

Figure 20:
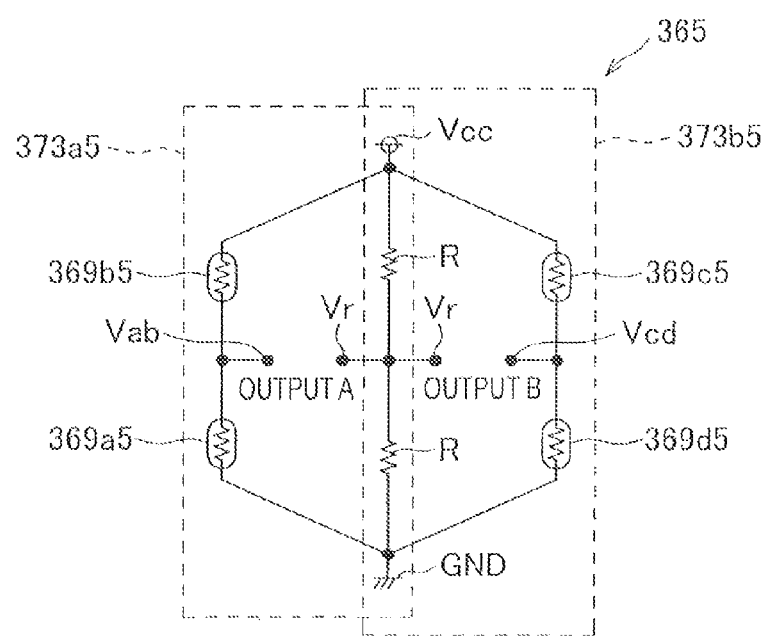
FIG. 20 is a circuit diagram of a measurement module strain detecting circuit illustrated in FIG. 18.

The measurement module strain detecting circuit 365 is illustrated in FIG. 20. The measurement module strain detecting circuit 365 is configured by a first detection circuit 373a5 and a second detection circuit 373b5 that are two bridge circuits. On a first system side of the first detection circuit 373a5, the second strain gauge 369b5 and the first strain gauge 369a5 are sequentially connected in order from a power supply Vcc. In other words, the first strain gauge 369a5 and the second strain gauge 369b5 are connected in series with the power supply Vcc. On a second system side, a fixed resistance R and a fixed resistance R are sequentially connected in order from the power supply Vcc. On a first system side of the second detection circuit 373b5, the third strain gauge 369c5 and the fourth strain gauge 369d5 are sequentially connected in order from the power supply Vcc. In other words, the third strain gauge 369c5 and the fourth strain gauge 369d5 are connected in series with the power supply Vcc. On a second system side, a fixed resistance R and a fixed resistance R are sequentially connected in order from the power supply Vcc.

In other words, the two fixed resistances R are shared by the first detection circuit 373a5 and the second detection circuit 373b5. Here, the two fixed resistance R has a same resistance value. In addition, the two fixed resistances R have the same resistance value as that of the strain gauge 369 before the occurrence of compression or expansion. Furthermore, the first strain gauge 369a5 to the fourth strain gauge 369d5 have the same resistance value.

As is known, the resistance value of the strain gauge 369 has a decreased resistance value in the case of compression and has an increased resistance value in the case of expansion. Such a change in the resistance value has a proportional relation in a case where the amount of the change is small. In addition, the detection direction of the strain gauge 369 is a direction in which the wiring grows, and, as described above, the detection direction of the third strain gauge 369c1 is the direction parallel to the center axis C1, and the detection direction of the fourth strain gauge 369d1 is the direction perpendicular to the center axis C1. The detection directions of the first strain gauge 369a5 and the second strain gauge 369b5 are directions of 45 degrees. In a case where compression or expansion occurs in a direction other than the detection directions, a change in the resistance value of the strain gauge 369 does not occur.

In the first detection circuit 373a5 using the strain gauge 369 having such characteristics, in a case where the first strain gauge 369a5 and the second strain gauge 369b5 are not compressed or expanded in the detection direction, an electric potential difference between electric potential Vab between the first strain gauge 369a5 and the second strain gauge 369b5 and electric potential Vr between the two fixed resistances R is almost zero.

In a case where the first strain gauge 369a5 is compressed, and the second strain gauge 369b5 is expanded, since the resistance value of the first strain gauge 369a5 is decreased, and the resistance value of the second strain gauge 369b5 is increased, the electric potential Vab decreases, but the electric potential Vr does not change. In other words, an electric potential difference between the electric potential Vab and the electric potential Vr occurs. In a case where the first strain gauge 369a5 is expanded, and the second strain gauge 369b5 is compressed, since the resistance value of the first strain gauge 369a5 is increased, and the resistance value of the second strain gauge 369b5 is decreased, the electric potential Vab increases, but the electric potential Vr does not change. In other words, an electric potential difference between the electric potential Vab and the electric potential Vr occurs.

In a case where both the first strain gauge 369a5 and the second strain gauge 369b5 are compressed, since the resistance values of both the first strain gauge 369a5 and the second strain gauge 369b5 are decreased, the electric potential difference between the electric potential Vab and the electric potential Vr is almost zero. In a case where both the first strain gauge 369a5 and the second strain gauge 369b5 are expanded, since the resistance values of both the first strain gauge 369a5 and the second strain gauge 369b5 are increased, the electric potential difference between the electric potential Vab and the electric potential Vr is almost zero.

The operation of the second detection circuit 373b5 is similar to that of the first detection circuit 373a5. In other words, in a case where the third strain gauge 369c5 is compressed, and the fourth strain gauge 369d5 is expanded, the electric potential Vcd increases, but the electric potential Vr decreases, whereby an electric potential difference between the electric potential Vcd and the electric potential Vr occurs. In a case where the third strain gauge 369c5 is expanded, and the fourth strain gauge 369d5 is compressed, the electric potential Vcd decreases, but the electric potential Vr increases, whereby an electric potential difference between the electric potential Vcd and the electric potential Vr occurs. In a case where both the third strain gauge 369c5 and the fourth strain gauge 369d5 are compressed and in a case where both the third strain gauge 369c5 and the fourth strain gauge 369d5 are expanded, the electric potential difference between the electric potential Vcd and the electric potential Vr is almost zero.

Thus, a connection point between the first strain gauge 369a5 and the second strain gauge 369b5 at which the electric potential Vab of the first detection circuit 373a5 can be measured and a connection point between the two fixed resistances R at which the electric potential Vr can be measured are configured as an output (hereinafter referred to as an output A) of the first detection circuit 373a5. In addition, a connection point between the third strain gauge 369c5 and the fourth strain gauge 369d5 at which the electric potential Vcd of the second detection circuit 373b5 can be measured and the connection point between the two fixed resistances R at which the electric potential Vr can be measured are configured as an output (hereinafter referred to as an output B) of the second detection circuit 373b5. The outputs A and B configure the strain information.

Here, in the case of the arrangement as illustrated in FIG. 19, a method for detecting (measuring) the bending deformation x, the bending deformation y, the tensile deformation z, and the torsional deformation rz by using the measurement module strain detecting circuit 365 to which the first strain gauge 369a5, the second strain gauge 369b5, the third strain gauge 369c5, and the fourth strain gauge 369d5 are connected as illustrated in FIG. 20 will be described.

Figure 21:
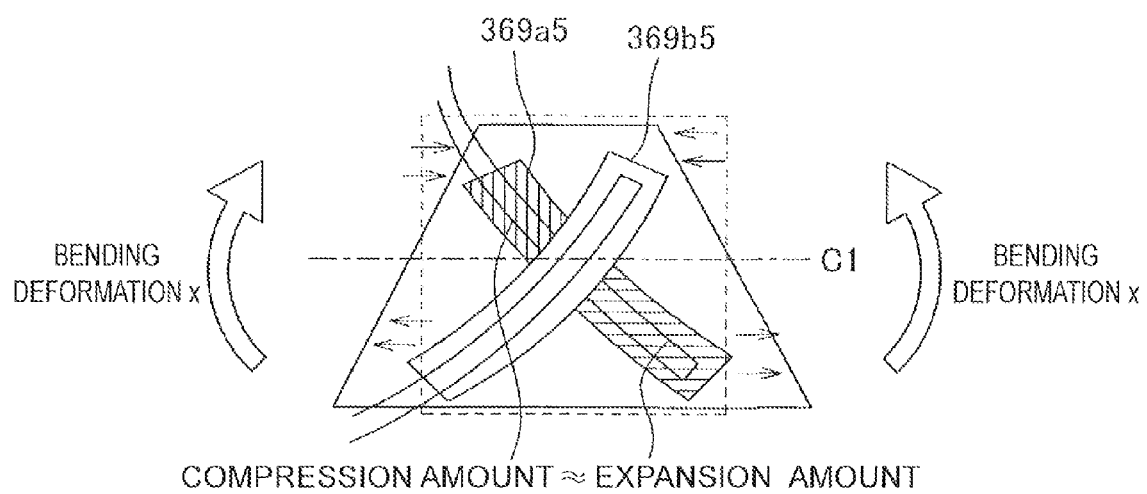
FIG. 21 is an explanatory diagram of a case where a first strain gauge and a second strain gauge are deformed according to bending deformation x.

First, how each deformation is detected (measured) in the output A of the first detection circuit 373a5 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, as illustrated in FIG. 21, while one end of the first strain gauge 369a5 is expanded, the other end thereof is compressed. As a result, inside the first strain gauge 369*a*5, both expansion and compression occur, and the resistance value of the first strain gauge 369*a*5 does not change. This similarly applies to the second strain gauge 369*b*5. Accordingly, the output A of the first detection circuit 373*a*5 is zero. On the other hand, in a case where the right-side crank 105R is deformed from the lower face 118 toward the upper face 117, similarly, both expansion and compression occur in both the first strain gauge 369*a*5 and the second strain gauge 369*b*5, and the resistance values thereof do not change. Accordingly, the output A of the first detection circuit 373*a*5 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369*a*5 and the second strain gauge 369*b*5 are expanded, and thus any one thereof has an increased resistance value. For this reason, the output A of the first detection circuit 373*a*5 is zero. On the other hand, in a case where the right-side crank 105R is deformed from the inner face 119 toward the outer face 120, both the first strain gauge 369*a*5 and the second strain gauge 369*b*5 are compressed, and thus any one thereof has a decreased resistance value. Accordingly, the output A of the first detection circuit 373*a*5 is zero.

In the tensile deformation z, the right-side crank 105R is deformed to be expanded or compressed in the longitudinal direction. In a case where the right-side crank 105R is expanded, both the first strain gauge 369*a*5 and the second strain gauge 369*b*5 are compressed, and thus, any one thereof has a decreased resistance value. For this reason, the output A of the first detection circuit 373*a*5 is zero. On the other hand, in a case where the right-side crank 105R is compressed, both the first strain gauge 369*a*5 and the second strain gauge 369*b*5 are expanded, and thus, any one thereof has an increased resistance value. For this reason, the output A of the first detection circuit 373*a*5 is zero.

In the torsional deformation rz, the right-side crank 105R is deformed to be twisted. In a case where the right-side crank 105R is twisted in the direction denoted by the arrow illustrated in FIG. 6B, the first strain gauge 369*a*5 is expanded and thus has an increased resistance value, and the second strain gauge 369*b*5 is compressed and thus has a decreased resistance value. For this reason, the output A of the first detection circuit 373*a*5 is a positive output (the electric potential Vab is high, and the electric potential Vr is low). On the other hand, in a case where the right-side crank 105R is twisted in a direction opposite to the direction of the arrow illustrated in FIG. 6B, the first strain gauge 369*a*5 is compressed and thus has a decreased resistance value, and the second strain gauge 369*b*5 is expanded and thus has an increased resistance value. For this reason, the output A of the first detection circuit 373*a*5 is a negative output (the electric potential Vab is low, and the electric potential Vr is high).

As above, only the torsional deformation rz is detected from the output A. In other words, the first strain gauge 369*a*5 and the second strain gauge 369*b*5 are connected to the first detection circuit 373*a*5, and the first detection circuit 373*a*5 detects a twist-direction strain generated in the crank 105.

Next, how each deformation is detected (measured) in the output B of the second detection circuit 373*b*5 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the third strain gauge 369*c*5 and the fourth strain gauge 369*d*5 are only bent, and there is neither compression nor expansion in the detection direction, and accordingly, the resistance value does not change. For this reason, the output B of the second detection circuit 373*b*5 is zero. On the other hand, in a case where the right-side crank 105R is deformed from the lower face 118 toward the upper face 117, the third strain gauge 369*c*5 and the fourth strain gauge 369*d*5 are only bent, and there is neither compression nor expansion in the detection direction, and accordingly, the resistance value does not change. For this reason, the output B of the second detection circuit 373*b*5 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, the third strain gauge 369*c*5 is compressed and thus has a decreased resistance value, and the fourth strain gauge 369*d*5 is expanded and thus has an increased resistance value. For this reason, the output B of the second detection circuit 373*b*5 is a positive output (the electric potential Vcd is high, and the electric potential Vr is low). On the other hand, in a case where the right-side crank 105R is deformed from the inner face 119 toward the outer face 120, the third strain gauge 369*c*5 is expanded and thus has an increased resistance value, and the fourth strain gauge 369*d*5 is compressed and thus has a decreased resistance value. For this reason, the output B of the second detection circuit 373*b*5 is a negative output (the electric potential Vcd is low, and the electric potential Vr is high).

In the tensile deformation z, the right-side crank 105R is deformed to be expanded or compressed in the longitudinal direction. In a case where the right-side crank 105R is expanded, the third strain gauge 369*c*5 is expanded and thus has an increased resistance value, and the fourth strain gauge 369*d*5 is compressed and thus has a decreased resistance value. For this reason, the output B of the second detection circuit 373*b*5 is a negative output. On the other hand, in case where the right-side crank 105R is compressed, the third strain gauge 369*c*5 is compressed and thus has a decreased resistance value, and the fourth strain gauge 369*d*5 is expanded and thus has an increased resistance value. For this reason, the output B of the second detection circuit 373*b*5 is a positive output.

In the torsional deformation rz, the right-side crank 105R is deformed to be twisted. In a case where the right-side crank 105R is twisted in the direction denoted by the arrow illustrated in FIG. 6B, the third strain gauge 369*c*5 is expanded and thus has an increased resistance value, and the fourth strain gauge 369*d*5 is not deformed in the detection direction and thus there is no change in the resistance value. For this reason, the output B of the second detection circuit 373*b*5 is a negative output. On the other hand, in a case where the right-side crank 105R is twisted in a direction opposite to the direction denoted by the arrow illustrated in FIG. 6B, the third strain gauge 369*c*5 is expanded and thus has an increased resistance value, and the fourth strain gauge 369*d*5 is not deformed in the detection direction and thus there is no change in the resistance value. For this reason, the output B of the second detection circuit 373*b*5 is a negative output.

As above, the bending deformation y, the tensile deformation z, and the torsional deformation rz are detected from the output B. In other words, the third strain gauge 369*c*5 and the fourth strain gauge 369*d*5 are connected to the second detection circuit 373*b*5, and the second detection circuit 373b5 detects an inward/outward strain or a pulling-direction strain generated in the crank 105.

Then, based on the output A of the first detection circuit 373a5 and the output B of the second detection circuit 373b5, the propulsion force Ft and the loss force Fr are calculated by respectively using Equations (1) and (2) represented in the first embodiment. Here, compared to the bending deformation y, the tensile deformation z is relatively small and is negligible. Equations (1) and (2) are presented again as below.

$$Ft = p(A-A0) + q(B-B0) [kgf] \quad (1)$$

$$Fr = s|A-A0| + u(B-B0) [kgf] \quad (2)$$

Here, p, q, s, u are coefficients and are values calculated by the simultaneous equations of Equations (3) to (6) represented in the first embodiment. Equations (3) to (6) are presented again as below.

$$m = p(Am-A0) + q(Be-B0) \quad (3)$$

$$0 = s(Am-A0) + u(Be-B0) \quad (4)$$

$$0 = p(Ae-A0) + q(Bm-B0) \quad (5)$$

$$m = s(Ae-A0) + u(Bm-B0) \quad (6)$$

Since the coefficients p, q, s, and u and A0 and B0 are values that can be calculated in advance or can be measured, by substituting A and B in Equations (1) and (2), the propulsion force Ft and the loss force Fr can be calculated.

In addition, in Equation (1), the output A is corrected by using the output B. In Equation (2), the output B is corrected by using the output A. In other words, the measurement module control unit 351 executing calculation of each equation serves as a correction means. Accordingly, the influence of the strain other than the detection target included in the first detection circuit 373a5 or the second detection circuit 373b5 can be excluded. In addition, in a case where there is no deviation of the first strain gauge 369a5 and the second strain gauge 369b5 from the crank direction (a direction parallel to the center axis C1), Ae=A0, and the correction according to the output B is not necessary.

The propulsion force Ft and the loss force Fr calculated in this way, similarly to the first embodiment, are transmitted to the cycle computer 201. The operation of the measurement module control unit 351 and the operations of the cycle computer 201 and the cadence sensor 501 are similar to those represented in the flowcharts illustrated in FIGS. 7A to 8C.

According to this embodiment, the measurement module 301 includes: the first strain gauge 369a5, the second strain gauge 369b5, the third strain gauge 369c5, and the fourth strain gauge 369d5 disposed on the inner face 119 of the crank 105 of the bicycle 1; the first detection circuit 373a5, to which the first strain gauge 369a5 and the second strain gauge 369b5 are connected, detecting the torsional deformation rz occurring in the crank; and the second detection circuit 373b5, to which the third strain gauge 369c5 and the fourth strain gauge 369d5 are connected, detecting the bending deformation y and the tensile deformation z occurring in the crank 105. In addition, the detection directions of the first strain gauge 369a5 and the second strain gauge 369b5 are orthogonal to each other, a middle direction between the detection directions of the first strain gauge 369a5 and the second strain gauge 369b5 is arranged to be the longitudinal direction of the crank 105, the third strain gauge 369c5 is arranged to have the detection direction to be parallel to the longitudinal direction of the crank 105, and the fourth strain gauge 369d5 is arranged to have the detection direction to be perpendicular to the longitudinal direction of the crank 105. By configuring as such, the propulsion force Ft and the loss force Fr participating to the crank 105 can be measured based on the torsional deformation rz detected by the first detection circuit 373a5 and the bending deformation y and the tensile deformation z detected by the second detection circuit 373b5. Thus, the propulsion force Ft and the loss force Fr can be measured by using a simple method. In addition, since the first strain gauge 369a5 to the fourth strain gauge 369d5 are disposed only on the inner face 119 of the crank 105, the propulsion force Ft and the loss force Fr can be measured only on one face, and, by arranging the strain gauges on the inner face 119, there is no intervention with the user's foot.

In addition, since the first strain gauge 369a5 and the second strain gauge 369b5 overlap each other, the size of the strain gauge 369 can be decreased.

In addition, since the first detection circuit 373a5 and the second detection circuit 373b5 are configured as bridge circuits, the first strain gauge 369a5 and the second strain gauge 369b5 are connected in series with the power supply in the bridge circuit configuring the first detection circuit 373a5, the third strain gauge 369c5 and the fourth strain gauge 369d5 are connected in series with the power supply in the bridge circuit configuring the second detection circuit 373b5, and resistors other than the first strain gauge 369a5 to the fourth strain gauge 369d5 of the bridge circuit configuring the first detection circuit 373a5 and the bridge circuit configuring the second detection circuit 373b5 are configured by fixed resistances R, the bending deformation x, the bending deformation y, and the tensile deformation z can be detected using the bridge circuits, whereby the propulsion force Ft and the loss force Fr can be measured by employing a simple circuit configuration.

In addition, since the fixed resistance R is shared by the first detection circuit and the second detection circuit, the first detection circuit and the second detection circuit can be configured substantially as one circuit, and accordingly, the circuit can be further simplified.

In addition, in the description presented above, while the third strain gauge 369c5 and the fourth strain gauge 369d5 are arranged as separate components, for example, the strain gauges may overlap each other in a cross shape. By configuring as such, the size of the strain gauge 369 arranged in the crank 105 can be decreased. Furthermore, all the first strain gauges 369a5 to the fourth strain gauges 369d5 may be configured to overlap each other. In such a case, the size of the strain gauge 369 can be decreased much. Alternatively, instead of configuring the first strain gauge 369a5 and the second strain gauge 369b5 to overlap each other, the strain gauges may be individually arranged.

In addition, the arrangement order of the first strain gauge 369a5 to the fourth strain gauge 369d5 may not be that illustrated in FIG. 19 and is not particularly limited.

In addition, in the case illustrated in FIG. 20, while a circuit in which two bridge circuits are matched to one circuit is used, the circuit may be divided into two bridge circuits as separate circuits. In such a case, two fixed resistances R are necessary for each circuit.

Furthermore, in the first detection circuit 373a5, the connection order of the first strain gauge 369a5 and the second strain gauge 369b5 may be reversed. In the second detection circuit 373b5, the connection order of the third strain gauge 369c5 and the fourth strain gauge 369d5 may be reversed.

Sixth Embodiment

Next, a measuring device according to a sixth embodiment of the present invention will be described with reference to FIGS. 22 to 25. The same reference numeral will be assigned to the same part as that of the first embodiment described above, and the description thereof will not be presented.

Figure 22:
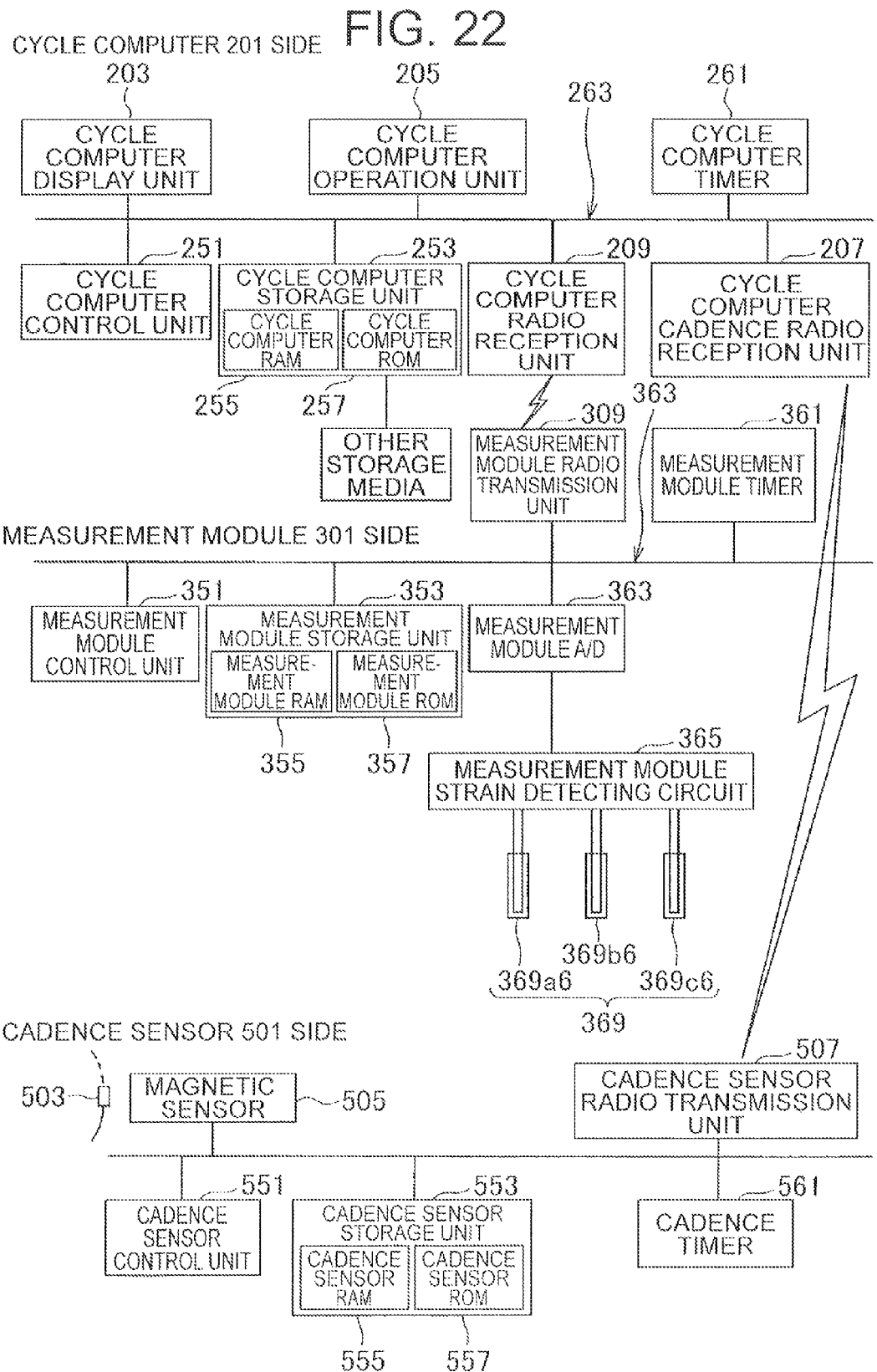
FIG. 22 is a block configuration diagram of a cycle computer, a measurement module, and a cadence sensor according to a sixth embodiment of the present invention.

In this embodiment, the configuration of a measurement module strain detecting circuit 365 of a measurement module 301 and the arrangement of a strain gauge 369 are different from those of the first embodiment. The strain gauge 369 according to this embodiment, as illustrated in FIG. 22, is configured by: a first strain gauge 369a6; a second strain gauge 369b6; and a third strain gauge 369c6. Then, the terminals of the strain gauge 369 are connected to the measurement module strain detecting circuit 365.

Figure 23:
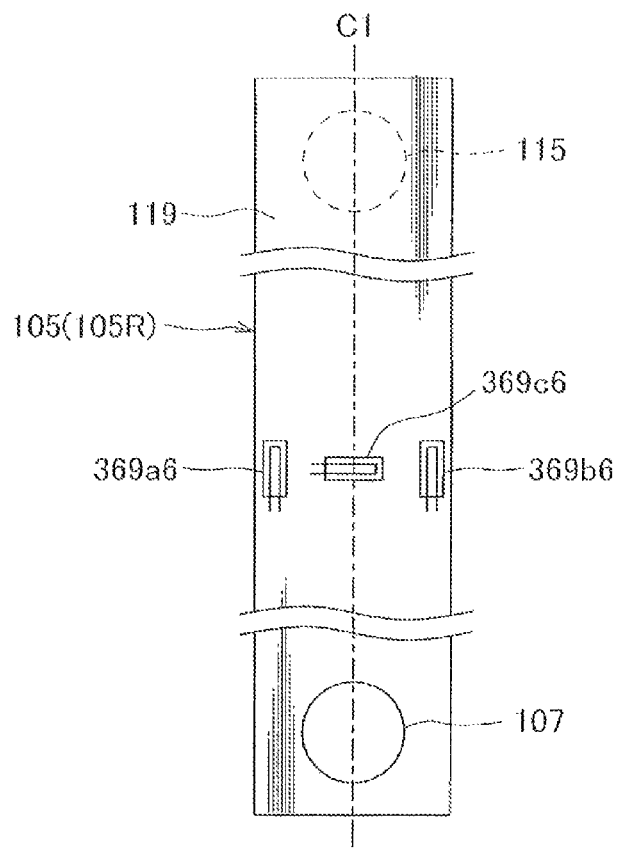
FIG. 23 is an explanatory diagram of the arrangement of a strain gauge illustrated in FIG. 22 in a crank.

FIG. 23 illustrates the arrangement of the strain gauge 369 in the crank 105 in this embodiment. The strain gauge 369 is bonded to the inner face 119 of the crank 105. Here, the inner face of the crank 105 is a face on which the crankshaft 107 is disposed to project (connected) and is a face (side face) parallel to a plane including a circle that is defined by the rotating movement of the crank 105. In addition, while not illustrated in FIG. 23, the outer face 120 of the crank 105 is a face, on which the pedal crankshaft 115 is disposed to project (connected), facing the inner face 119. In other words, the outer face is a face on which the pedal 103 is disposed to be freely rotatable. An upper face 117 of the crank 105 has the longitudinal direction extending in the same direction as those of the inner face 119 and the outer face 120 and is one of faces orthogonal to the inner face 119 and the outer face 120. A lower face 118 of the crank 105 is a face that faces the upper face 117.

The first strain gauge 369a6 and the second strain gauge 369b6 are disposed such that the detection directions thereof are parallel to the longitudinal direction of the crank 105, in other words, parallel to the center axis C1 of the inner face 119 and are disposed to be symmetrical with respect to the center axis C1 of the inner face 119. The third strain gauge 369c6 is disposed on the center axis C1 and is disposed such that the detection direction is perpendicular to the center axis C1 and is interposed between the first strain gauge 369a6 and the second strain gauge 369b6.

In other words, a direction (the vertical direction in FIG. 23) parallel to the center axis C1 that is an axis extending in the longitudinal direction of the crank 105, in other words, a direction parallel to the longitudinal direction of the crank 105 is the detection direction of each of the first strain gauge 369a6 and the second strain gauge 369b6, and a direction (the horizontal direction in FIG. 23) perpendicular to the center axis C1, in other words, a direction perpendicular to the longitudinal direction of the crank 105 is the detection direction of the third strain gauge 369c6. Accordingly, the detection directions of the first strain gauge 369a6 and the second strain gauge 369b6 and the detection direction of the third strain gauge 369c6 are orthogonal to each other.

The arrangement of the first strain gauge 369a6 to the third strain gauge 369c6 is not limited to that illustrated in FIG. 23. In other words, any other arrangement may be employed as long as the parallel or perpendicular relation with the center axis C1 is maintained. However, it is preferable to arrange the first strain gauge 369a6 and the second strain gauge 369b6 to be symmetrical to each other with the center axis C1 being interposed therebetween and arrange the third strain gauge 369c6 on the center axis C1 for detecting each deformation to be described later with high accuracy.

In the case illustrated in FIG. 23, while the crank 105 is described as a simple rectangular parallelepiped, according to a design or the like, the corner may be rounded, and some faces thereof may be configured as curved faces. Even in such a case, by arranging the strain gauge 369 such that the arrangement described above is maintained as much as possible, each deformation to be described later can be detected. However, as the relation (parallel or perpendicular) with the center axis C1 described above is out of alignment, the detection accuracy decreases.

The first strain gauge 369a6, the second strain gauge 369b6, the third strain gauge 369c6, and the fourth strain gauge 369d6 are connected to the measurement module strain detecting circuit 365, and the strain amount of the strain gauge 369 is output as a voltage. The output of the measurement module strain detecting circuit 365 is converted from analog information into strain information that is digital information by a measurement module A/D 363. Then, a strain information signal is output to the measurement module storage unit 353. The strain information signal input to the measurement module storage unit 353 is stored in the measurement module RAM 355 as the strain information.

Figure 24:
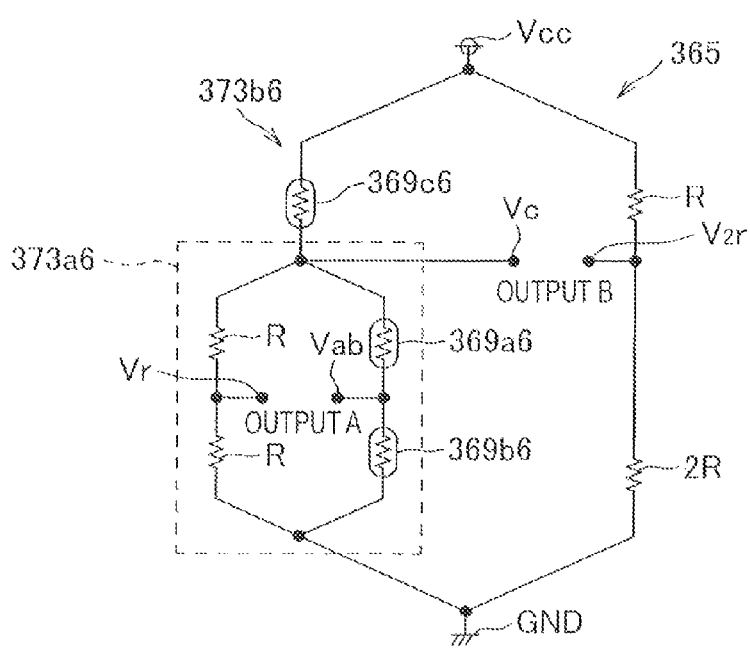
FIG. 24 is a circuit diagram of a measurement module strain detecting circuit illustrated in FIG. 22.

The measurement module strain detecting circuit 365 is illustrated in FIG. 24. The measurement module strain detecting circuit 365 is configured by a first detection circuit 373a6 and a second detection circuit 373b6 that are two bridge circuits. On a first system side of the first detection circuit 373a6, the first strain gauge 369a6 and the second strain gauge 369b6 are sequentially connected in order from a power supply Vcc. In other words, the first strain gauge 369a6 and the second strain gauge 369b6 are connected in series with the power supply Vcc. On a second system side, a fixed resistance R and a fixed resistance R are sequentially connected in order from the power supply Vcc. On a first system side of the second detection circuit 373b6, the third strain gauge 369c6 and the first detection circuit 373a6 are sequentially connected in order from the power supply Vcc. In other words, the first detection circuit 373a6 is connected in series with the third strain gauge 369c6 of the second detection circuit 373b6 and the power supply Vcc. On a second system side, a fixed resistance R and a fixed resistance 2R are sequentially connected in order from the power supply Vcc.

In the first detection circuit 373a6, the power supply Vcc side is connected to the third strain gauge 369c6. By configuring as such, when seen from the second detection circuit 373b6, the power supply Vcc, the third strain gauge 369c6, the first strain gauge 369a6, and the second strain gauge 369b6 are sequentially connected in series. Here, three fixed resistances R have the same resistance value that is much larger than the resistance value of the first strain gauge 369a6 to the third strain gauge 369c6 (for example, in a case where the resistance value of the strain gauge 369 is 1 kΩ, the resistance value of the fixed resistance R is 100 kΩ or higher). In other words, when the resistance value of the first strain gauge 369a6 to the third strain gauge 369c6 is denoted by GR, a relation of R>>GR is formed. In addition, a fixed resistance 2R has a resistance value that is twice that of the fixed resistance R. In addition, the first strain gauge 369a6 to the third strain gauge 369c6 have the same resistance value. By configuring as such, a current hardly flows through the fixed resistance R of the first detection circuit 373a6 at the time of no load, and the magnitudes of currents flowing through the first strain gauge 369a6 to the third strain gauge 369c6 are the same.

As is known, the resistance value of the strain gauge 369 has a decreased resistance value in the case of compression and has an increased resistance value in the case of expansion. Such a change in the resistance value has a proportional relation in a case where the amount of the change is small. In addition, the detection direction of the strain gauge 369 is a direction in which the wiring grows, and, as described above, the detection direction of the first strain gauge 369a6 and the second strain gauge 369b6 is the direction parallel to the center axis C1, and the detection direction of the third strain gauge 369c6 is the direction perpendicular to the center axis C1. In a case where compression or expansion occurs in a direction other than the detection directions, a change in the resistance value of the strain gauge 369 does not occur.

In the first detection circuit 373a6 using the strain gauge 369 having such characteristics, in a case where the first strain gauge 369a6 and the second strain gauge 369b6 are not compressed or expanded in the detection direction, an electric potential difference between electric potential Vab between the first strain gauge 369a6 and the second strain gauge 369b6 and electric potential Vr between the two fixed resistances R is almost zero.

In a case where the first strain gauge 369a6 is compressed, and the second strain gauge 369b6 is expanded, since the resistance value of the first strain gauge 369a6 is decreased, and the resistance value of the second strain gauge 369b6 is increased, the electric potential Vab increases, but the electric potential Vr does not change. In other words, an electric potential difference between the electric potential Vab and the electric potential Vr occurs. In a case where the first strain gauge 369a6 is expanded, and the second strain gauge 369b6 is compressed, since the resistance value of the first strain gauge 369a6 is increased, and the resistance value of the second strain gauge 369b6 is decreased, the electric potential Vab decreases, but the electric potential Vr does not change. In other words, an electric potential difference between the electric potential Vab and the electric potential Vr occurs.

In a case where both the first strain gauge 369a6 and the second strain gauge 369b6 are compressed, since the resistance values of both the first strain gauge 369a6 and the second strain gauge 369b6 are decreased, the electric potential difference between the electric potential Vab and the electric potential Vr is almost zero. In a case where both the first strain gauge 369a6 and the second strain gauge 369b6 are expanded, since the resistance values of both the first strain gauge 369a6 and the second strain gauge 369b6 are increased, the electric potential difference between the electric potential Vab and the electric potential Vr is almost zero.

In a case where the second detection circuit 373b6 is neither compressed nor expanded in the detection direction of the third strain gauge 369c6, an electric potential difference between electric potential Vc between the third strain gauge 369c6 and the first detection circuit 373a6 and electric potential V2r between the fixed resistance R and the fixed resistance 2R is almost zero.

In a case where the third strain gauge 369c6 is compressed, the resistance value of the third strain gauge 369c6 decreases, and accordingly, the electric potential Vc increases, but the electric potential V2r does not change. In other words, an electric potential difference between the electric potential Vc and the electric potential V2r occurs. On the other hand, in case where the third strain gauge 369c6 is expanded, the resistance value of the third strain gauge 369c6 increases, and accordingly, the electric potential Vc decreases, but the electric potential V2r does not change. In other words, an electric potential difference between the electric potential Vc and the electric potential V2r occurs.

Thus, a connection point between the first strain gauge 369a6 and the second strain gauge 369b6 at which the electric potential Vab of the first detection circuit 373a6 can be measured and a connection point between the two fixed resistances R at which the electric potential Vr can be measured are configured as an output (hereinafter referred to as an output A) of the first detection circuit 373a6. In addition, a connection point between the third strain gauge 369c6 and the first detection circuit 373a6 at which electric potential Vc of the second detection circuit 373b6 can be measured and a connection point between the fixed resistance R and the fixed resistance 2R at which the electric potential V2r can be measured are configured as an output (hereinafter referred to as an output B) of the second detection circuit 373b6. The outputs A and B configure the strain information.

Here, in the case of the arrangement as illustrated in FIG. 23, a method for detecting (measuring) the bending deformation x, the bending deformation y, the tensile deformation z, and the torsional deformation rz by using the measurement module strain detecting circuit 365 to which the first strain gauge 369a6, the second strain gauge 369b6, and the third strain gauge 369c6 are connected as illustrated in FIG. 24 will be described.

First, how each deformation is detected (measured) in the output A of the first detection circuit 373a6 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369a6 is compressed and thus has a decreased resistance value, and the second strain gauge 369b6 is expanded and thus has an increased resistance value. For this reason, the output A of the first detection circuit 373a6 is a positive output (the electric potential Vab is high, and the electric potential Vr is low). In addition, in a case where the right-side crank 105R is deformed from the lower face 118 toward the upper face 117, the first strain gauge 369a6 is expanded and has an increased resistance value, and the second strain gauge 369b6 is compressed and has a decreased resistance value. Accordingly, the output A of the first detection circuit 373a6 is a negative output (the electric potential Vab is low, and the electric potential Vr is high).

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369a6 and the second strain gauge 369b6 are compressed, and thus any one thereof has a decreased resistance value. For this reason, the output A of the first detection circuit 373a6 is zero (there is no electric potential difference between the electric potential Vab and the electric potential Vr). On the other hand, in a case where the right-side crank 105R is deformed from the inner face 119 toward the outer face 120, both the first strain gauge 369a6 and the second strain gauge 369b6 are expanded, and thus any one thereof has an increased resistance value. Accordingly, the output A of the first detection circuit 373a6 is zero.

In the tensile deformation z, the right-side crank 105R is deformed to be expanded or compressed in the longitudinal direction. In a case where the right-side crank 105R is expanded, both the first strain gauge 369a6 and the second strain gauge 369b6 are expanded, and thus, any one thereof has an increased resistance value. For this reason, the output A of the first detection circuit 373a6 is zero. On the other hand, in a case where the right-side crank 105R is compressed, both the first strain gauge 369a6 and the second strain gauge 369b6 are compressed, and thus, any one thereof has a decreased resistance value. For this reason, the output A of the first detection circuit 373a6 is zero.

In the torsional deformation rz, the right-side crank 105R is deformed to be twisted. In a case where the right-side crank 105R is twisted in a direction denoted by an arrow illustrated in FIG. 6B, both the first strain gauge 369a6 and the second strain gauge 369b6 are expanded, and thus any one thereof has an increased resistance value. For this reason, the output A of the first detection circuit 373a6 is zero. On the other hand, in a case where the right-side crank 105R is twisted in a direction opposite to that of the arrow illustrated in FIG. 6B, both the first strain gauge 369a6 and the second strain gauge 369b6 are expanded, and thus any one thereof has an increased resistance value. For this reason, the output A of the first detection circuit 373a6 is zero.

As above, only the bending deformation x is detected from the output A. In other words, the first strain gauge 369a6 and the second strain gauge 369b6 are connected to the first detection circuit 373a6, and the first detection circuit 373a6 detects a rotating-direction strain generated in the crank 105.

Next, how each deformation is detected (measured) in the output B of the second detection circuit 373b will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369a6 is compressed and thus has a decreased resistance value, the second strain gauge 369b6 is expanded and thus has an increased resistance value, and the third strain gauge 369c6 is neither compressed nor expanded in the detection direction and there is no change in the resistance value. For this reason, the output B of the second detection circuit 373b6 is zero. On the other hand, in a case where the right-side crank 105R is deformed from the lower face 118 toward the upper face 117, the first strain gauge 369a6 is expanded and thus has an increased resistance value, the second strain gauge 369b6 is compressed and thus has a decreased resistance value, and the third strain gauge 369c6 is neither compressed nor expanded in the detection direction and there is no change in the resistance value. For this reason, the output B of the second detection circuit 373b6 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, the first strain gauge 369a6 and the second strain gauge 369b6 are compressed and thus have decreased resistance values, and the third strain gauge 369c6 is expanded and thus has an increased resistance value. For this reason, the output B of the second detection circuit 373b6 is a positive output (the electric potential Vc is high, and the electric potential V2r is low). On the other hand, in a case where the right-side crank 105R is deformed from the inner face 119 toward the outer face 120, the first strain gauge 369a6 and the second strain gauge 369b6 are expanded and thus have increased resistance values, and the third strain gauge 369c6 is compressed and thus has a decreased resistance value. For this reason, the output B of the second detection circuit 373b6 is a negative output (the electric potential Vc is low, and the electric potential V2r is high).

In the tensile deformation z, the right-side crank 105R is deformed to be expanded or compressed in the longitudinal direction. In a case where the right-side crank 105R is expanded, the first strain gauge 369a6 and the second strain gauge 369b6 are expanded and thus have increased resistance values, and the third strain gauge 369c6 is compressed and thus has a decreased resistance value. For this reason, the output B of the second detection circuit 373b6 is a negative output. On the other hand, in case where the right-side crank 105R is compressed, the first strain gauge 369a6 and the second strain gauge 369b6 are compressed and thus have decreased resistance values, and the third strain gauge 369c6 is expanded and thus has an increased resistance value. For this reason, the output B of the second detection circuit 373b6 is a positive output.

In the torsional deformation rz, the right-side crank 105R is deformed to be twisted. In a case where the right-side crank 105R is twisted in the direction denoted by the arrow illustrated in FIG. 6B, the first strain gauge 369a6 and the second strain gauge 369b6 are expanded and thus have increased resistance values and the third strain gauge 369c6 is neither compressed nor expanded in the detection direction and thus there is no change in the resistance value. For this reason, the output B of the second detection circuit 373b6 is a negative output. On the other hand, in a case where the right-side crank 105R is twisted in a direction opposite to the direction denoted by the arrow illustrated in FIG. 6B, the first strain gauge 369a6 and the second strain gauge 369b6 are expanded and thus have increased resistance values, and the third strain gauge 369c6 is neither compressed nor expanded in the detection direction and thus there is no change in the resistance value. For this reason, the output B of the second detection circuit 373b6 is a negative output.

As above, the bending deformation y, the tensile deformation z, and the torsional deformation rz are detected from the output B. In other words, the third strain gauge 369c6 is connected to the second detection circuit 373b6, and the second detection circuit 373b6 detects an inward/outward strain or a pulling-direction strain generated in the crank 105.

Then, based on the output A of the first detection circuit 373a6 and the output B of the second detection circuit 373b6, the propulsion force Ft and the loss force Fr are calculated by respectively using Equations (1) and (2) represented in the first embodiment. Here, compared to the bending deformation y, the tensile deformation z is relatively small and is negligible. Equations (1) and (2) are presented again as below.

$$Ft = p(A-A0) + q(B-B0) [kgf] \quad (1)$$

$$Fr = s|A-A0| + u(B-B0) [kgf] \quad (2)$$

Here, p, q, s, u are coefficients and are values calculated by the simultaneous equations of Equations (3) to (6) represented in the first embodiment. Equations (3) to (6) are presented again as below.

$$m = p(Am-A0) + q(Be-B0) \quad (3)$$

$$0 = s(Am-A0) + u(Be-B0) \quad (4)$$

$$0 = p(Ae-A0) + q(Bm-B0) \quad (5)$$

$$m = s(Ae-A0) + u(Bm-B0) \quad (6)$$

Since the coefficients p, q, s, and u and A0 and B0 are values that can be calculated in advance or can be measured, by substituting A and B in Equations (1) and (2), the propulsion force Ft and the loss force Fr can be calculated.

In addition, in Equation (1), the output A is corrected by using the output B. In Equation (2), the output B is corrected by using the output A. In other words, the measurement module control unit 351 executing calculation of each equation serves as a correction means. Accordingly, the influence of the strain other than the detection target included in the first detection circuit 373a6 or the second detection circuit 373b6 can be excluded. In addition, in a case where there is no deviation of the first strain gauge 369a6 and the second strain gauge 369b6 from the crank direction (a direction parallel to the center axis C1), Ae=A0, and the correction according to the output B is not necessary.

The propulsion force Ft and the loss force Fr calculated in this way, similarly to the first embodiment, are transmitted to the cycle computer 201. The operation of the measurement module control unit 351 and the operations of the cycle computer 201 and the cadence sensor 501 are similar to those represented in the flowcharts illustrated in FIGS. 7A to 8C.

According to this embodiment, the measurement module 301 includes: the first strain gauge 369a6, the second strain gauge 369b6, and the third strain gauge 369c6 disposed on the inner face 119 of the crank 105 of the bicycle 1; the first detection circuit 373a6, to which the first strain gauge 369a6 and the second strain gauge 369b6 are connected, detecting the bending deformation x occurring in the crank 105; and the second detection circuit 373b6, to which the third strain gauge 369c6 is connected, detecting the bending deformation y and the tensile deformation z occurring in the crank 105. In addition, the first strain gauge 369a6 and the second strain gauge 369b6 are disposed such that the detection directions thereof are parallel to the longitudinal direction of the crank 105, and the third strain gauge 369c6 is disposed such that the detection direction is perpendicular to the longitudinal direction of the crank 105. By configuring as such, the propulsion force Ft and the loss force Fr participating to the crank 105 can be measured based on the bending deformation x detected by the first detection circuit 373a6 and the bending deformation y and the tensile deformation z detected by the second detection circuit 373b6. Thus, the propulsion force Ft and the loss force Fr can be measured by using a simple method. In addition, since the first strain gauge 369a6 to the third strain gauge 369c6 are disposed only on the inner face 119 of the crank 105, the propulsion force Ft and the loss force Fr can be measured only on one face, and, by arranging the strain gauges on the inner face 119, there is no intervention with the user's foot.

In addition, since the first detection circuit 373a6 and the second detection circuit 373b6 are configured as bridge circuits, the first strain gauge 369a6 and the second strain gauge 369b6 are connected in series with the power supply Vcc in the bridge circuit configuring the first detection circuit 373a6, the third strain gauge 369c6 is connected in series with the power supply Vcc in the bridge circuit configuring the second detection circuit 373b6, and resistors other than the first strain gauge 369a6 to the third strain gauge 369c6 of the bridge circuit configuring the first detection circuit 373a6 and the bridge circuit configuring the second detection circuit 373b6 are configured by the fixed resistance R and the fixed resistance 2R, the bending deformation x, the bending deformation y, and the tensile deformation z can be detected using the bridge circuits, whereby the propulsion force Ft and the loss force Fr can be measured by employing a simple circuit configuration.

In addition, since the first detection circuit 373a6 is connected in series with the third strain gauge 369c6 of the second detection circuit 373b6 and the power supply Vcc, the first detection circuit 373a6 and the second detection circuit 373b6 can be configured as one circuit, whereby the circuit configuration may be further simplified.

Furthermore, when the resistance value of the fixed resistance R is R, and the resistance value of each of the first strain gauge 369a6 to the third strain gauge 369c6 is GR, R and GR have the relation of R>>GR, and accordingly, currents flowing respectively through the first strain gauge 369a6 to the third strain gauges 369c6 can be configured to be the same. Thus, the output B is in the equilibrium state at the time of no load.

Since the first strain gauge 369a6 and the second strain gauge 369b6 are disposed to be symmetrical with respect to the center axis C1, the bending deformation x can be detected with high accuracy.

Figure 25:
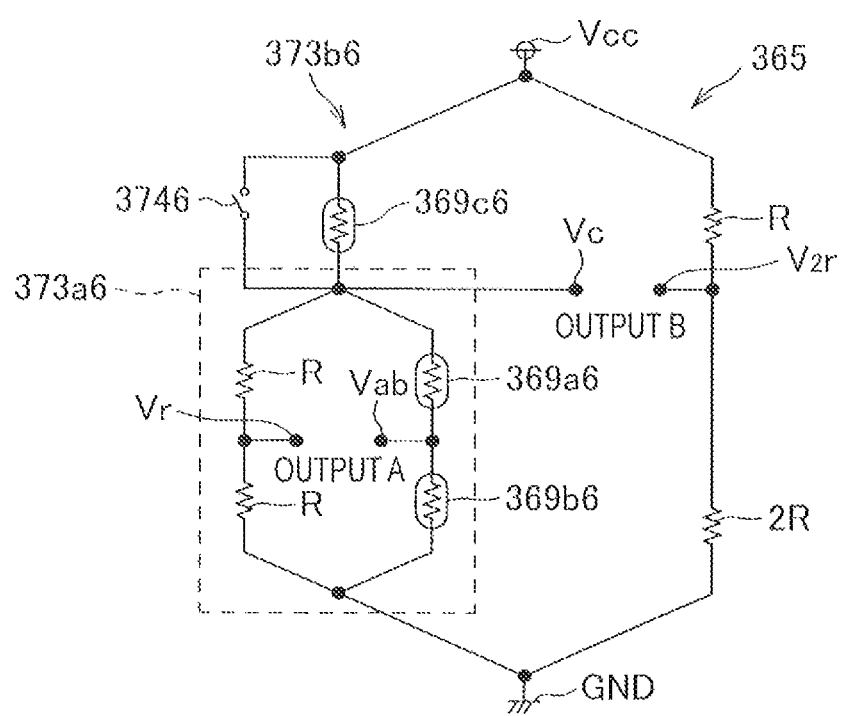
FIG. 25 is a circuit diagram of another example of the measurement module strain detecting circuit illustrated in FIG. 22.

In addition, in this embodiment, as illustrated in FIG. 25, a changeover switch 374b may be connected in parallel with the third strain gauge 369c in the measurement module strain detecting circuit 365. In other words, a switching means that directly connects the first detection circuit 373a to the power supply Vcc is included.

A case where the changeover switch 374b is OFF is similar to the case illustrated in FIG. 24. On the other hand, in a case where the changeover switch 374b is ON, the power supply Vcc side of the first detection circuit 373a6 is directly connected to the power supply Vcc. For this reason, the output voltage value of the output A can be increased. Accordingly, the influence of noises can be reduced.

In addition, in the description presented above, while the first strain gauge 369a6, the second strain gauge 369b6, and the third strain gauge 369c6 are arranged as separate components, for example, the first the strain gauge 369a6 and the third strain gauge 369c6 or the second strain gauge 369a6 and the third strain gauge 369c6 may be configured to overlap each other in a cross shape. By configuring as such, the size of the strain gauge 369 arranged in the crank 105 can be decreased.

Furthermore, the arrangement order of the first strain gauge 369a6 to the third strain gauge 369c6 may not be that illustrated in FIG. 23 and is not particularly limited.

In addition, in the case illustrated in FIG. 24, while a circuit in which two bridge circuits are matched to one circuit is used, the circuit may be divided into two bridge circuits as separate circuits. In such a case, in the second detection circuit 373b6, a resistor such as the fixed resistance 2R needs to be connected to a portion to which the first detection circuit 373a6 is connected.

Furthermore, in the first detection circuit 373a6, the connection order of the first strain gauge 369a6 and the second strain gauge 369b6 may be reversed. In the second detection circuit 373b6, the connection order of the third strain gauge 369c6 and the first detection circuit 373a6 may be reversed. However, in a case where the connection order of the third strain gauge 369c6 and the first detection circuit 373a6 is reversed, the connection order of the fixed resistance R and the fixed resistance 2R needs to be reversed.

Seventh Embodiment

Figure 26:
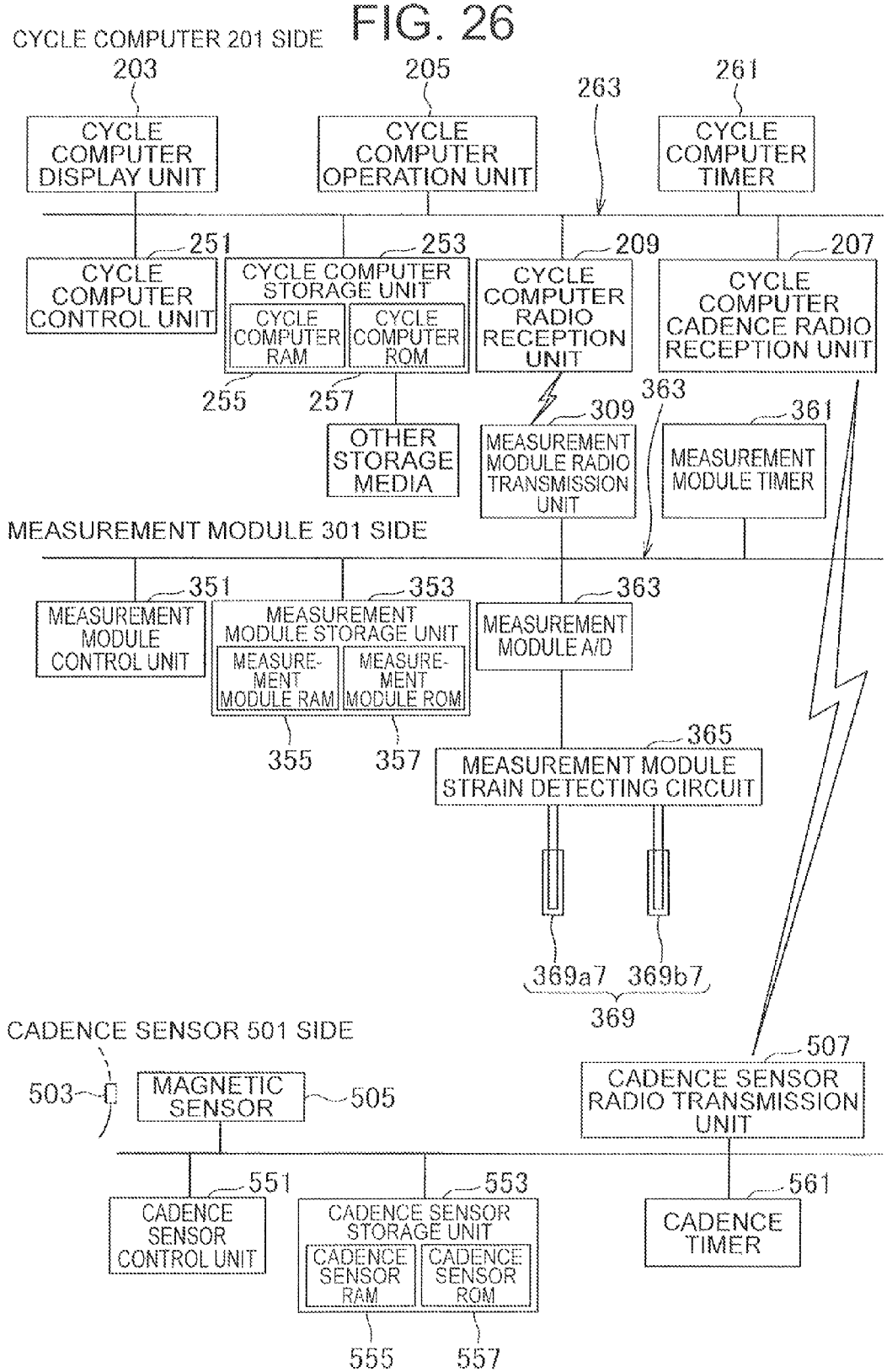
FIG. 26 is a block configuration diagram of a cycle computer, a measurement module, and a cadence sensor according to a seventh embodiment of the present invention.

Next, a measuring device according to a seventh embodiment of the present invention will be described with reference to FIGS. 26 to 28. The same reference numeral will be assigned to the same part as that of the first embodiment described above, and the description thereof will not be presented.

In this embodiment, the configuration of a measurement module strain detecting circuit 365 of a measurement module 301 and the arrangement of a strain gauge 369 are different from those of the first embodiment. The strain gauge 369 according to this embodiment, as illustrated in FIG. 26, is configured by: a first strain gauge 369a7; and a second strain gauge 369b7. Then, the terminals of the strain gauge 369 are connected to the measurement module strain detecting circuit 365.

Figure 27:
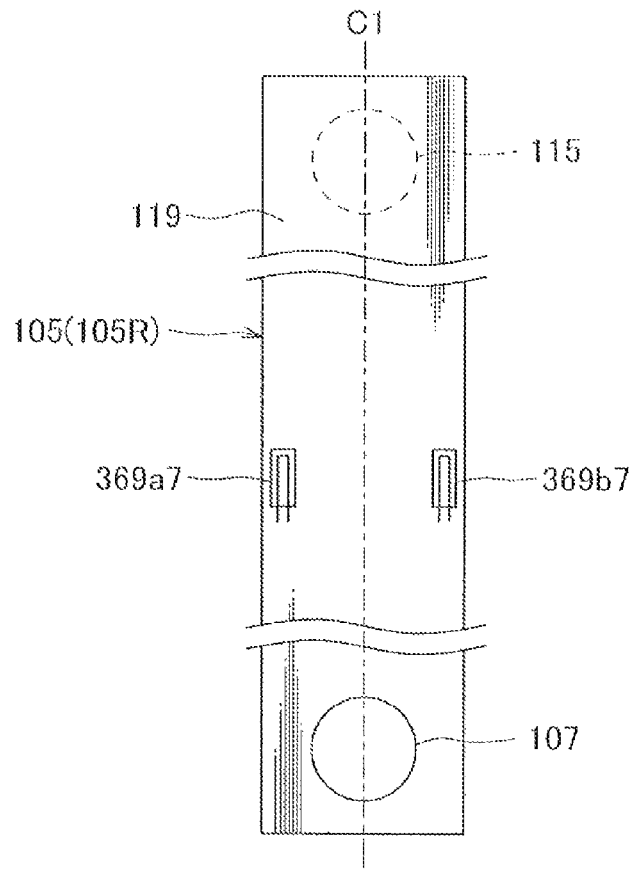
FIG. 27 is an explanatory diagram of the arrangement of a strain gauge illustrated in FIG. 26 in a crank.

FIG. 27 illustrates the arrangement of the strain gauge 369 in the crank 105 in this embodiment. The strain gauge 369 is bonded to the inner face 119 of the crank 105. Here, the inner face of the crank 105 is a face on which the crankshaft 107 is disposed to project (connected) and is a face (side face) parallel to a plane including a circle that is defined by the rotational movement of the crank 105. In addition, while not illustrated in FIG. 27, the outer face 120 of the crank 105 is a face, on which the pedal crankshaft 115 is disposed to project (connected), facing the inner face 119. In other words, the outer face is a face on which the pedal 103 is disposed to be freely rotatable. An upper face 117 of the crank 105 has the longitudinal direction extending in the same direction as those of the inner face 119 and the outer face 120 and is one of faces orthogonal to the inner face 119 and the outer face 120. A lower face 118 of the crank 105 is a face that faces the upper face 117.

The first strain gauge 369a7 and the second strain gauge 369b7 are disposed such that the detection directions thereof are parallel to the longitudinal direction of the crank 105, in other words, parallel to the center axis C1 of the inner face 119 and are disposed to be symmetrical with respect to the center axis C1 of the inner face 119.

In other words, a direction (the vertical direction in FIG. 27) parallel to the center axis C1 that is an axis extending in the longitudinal direction of the crank 105, in other words, a direction parallel to the longitudinal direction of the crank 105 is the detection direction of each of the first strain gauge 369a7 and the second strain gauge 369b7.

The arrangement of the first strain gauge 369a7 and the second strain gauge 369b7 is not limited to that illustrated in FIG. 27. In other words, any other arrangement may be employed as long as the parallel relation with the center axis C1 is maintained. However, it is preferable to arrange the first strain gauge 369a7 and the second strain gauge 369b7 to be symmetrical to each other with the center axis C1 being interposed therebetween for detecting each deformation to be described later with high accuracy.

In the case illustrated in FIG. 27, while the crank 105 is described as a simple rectangular parallelepiped, according to a design or the like, the corner may be rounded, and some faces thereof may be configured as curved faces. Even in such a case, by arranging the strain gauge 369 such that the arrangement described above is maintained as much as possible, each deformation to be described later can be detected. However, as the (parallel) relation with the center axis C1 described above is out of alignment, the detection accuracy decreases.

The first strain gauge 369a7 and the second strain gauge 369b7 are connected to the measurement module strain detecting circuit 365, and the strain amount of the strain gauge 369 is output as a voltage. The output of the measurement module strain detecting circuit 365 is converted from analog information into strain information that is digital information by a measurement module A/D 363.

Then, a strain information signal is output to the measurement module storage unit 353. The strain information signal input to the measurement module storage unit 353 is stored in the measurement module RAM 355 as the strain information.

Figure 28:
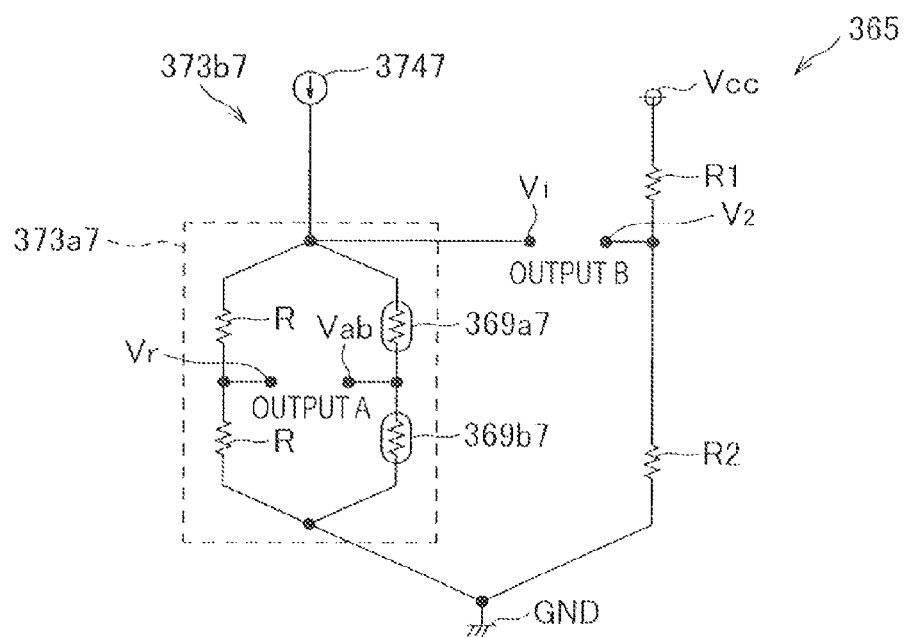
FIG. 28 is a circuit diagram of a measurement module strain detecting circuit illustrated in FIG. 26.

The measurement module strain detecting circuit 365 is illustrated in FIG. 28. The measurement module strain detecting circuit 365 is configured by a first detection circuit 373a7 and a second detection circuit 373b7 that are two bridge circuits. On a first system side of the first detection circuit 373a7, the first strain gauge 369a7 and the second strain gauge 369b7 are sequentially connected in order from a constant-current power supply 3747 side. In other words, the first strain gauge 369a7 and the second strain gauge 369b7 are connected in series with the constant-current power supply 374. On a second system side, a fixed resistance R and a fixed resistance R are sequentially connected in order from the constant-current power supply 3747 side. On a first system side of the second detection circuit 373b7, the first detection circuit 373a7 is connected to the constant-current power supply 3747. In other words, the first strain gauge 369a7 and the second strain gauge 369b7 are connected in series with the constant-current power supply 3747 in the bridge circuit configuring the first detection circuit 373a7. On a second system side, in order from a constant-voltage power supply Vcc, a fixed resistance R1 and a fixed resistance R2 are sequentially connected. In addition, the first detection circuit 373a7 serves as a resistor in the bridge circuit configuring the second detection circuit 373b7. In other words, the first detection circuit 373a7 is caused to serve as one resistor in the bridge circuit configuring the second detection circuit 373b7.

The constant-current power supply 3747 side is directly connected to the first detection circuit 373a7. By configuring as such, changes in the resistance values of the first strain gauge 369a7 and the second strain gauge 369b7 can be directly taken out from the output B to be described later. In other words, by using the constant-current power supply 3747, electric potential V1 (see FIG. 28) to be described later can be changed in accordance with the operation of the first detection circuit 373a7, and accordingly, a strain gauge component does not need to be arranged between the power supply and the first detection circuit 373a7. Here, the two fixed resistances R have the same resistance value. In addition, the first strain gauge 369a7 and the second strain gauge 369b7 have the same resistance value. The fixed resistances R1 and R2 are preferably configured to have a resistance value for which electric potential V2 (see FIG. 28) to be described later is the same as the electric potential V1 (see FIG. 28) in a no-load state.

As is known, the resistance value of the strain gauge 369 has a decreased resistance value in the case of compression and has an increased resistance value in the case of expansion. Such a change in the resistance value has a proportional relation in a case where the amount of the change is small. In addition, the detection direction of the strain gauge 369 is a direction in which the wiring grows, and, as described above, the detection direction of each of the first strain gauge 369a7 and the second strain gauge 369b7 is the direction parallel to the center axis C1. In a case where compression or expansion occurs in a direction other than the detection directions, a change in the resistance value of the strain gauge 369 does not occur.

In the first detection circuit 373a7 using the strain gauge 369 having such characteristics, in a case where the first strain gauge 369a7 and the second strain gauge 369b7 are not compressed or expanded in the detection direction, an electric potential difference between electric potential Vab between the first strain gauge 369a7 and the second strain gauge 369b7 and electric potential Vr between the two fixed resistances R is almost zero.

In a case where the first strain gauge 369a7 is compressed, and the second strain gauge 369b7 is expanded, since the resistance value of the first strain gauge 369a7 is decreased, and the resistance value of the second strain gauge 369b7 is increased, the electric potential Vab increases, but the electric potential Vr does not change. In other words, an electric potential difference between the electric potential Vab and the electric potential Vr occurs. In a case where the first strain gauge 369a7 is expanded, and the second strain gauge 369b7 is compressed, since the resistance value of the first strain gauge 369a7 is increased, and the resistance value of the second strain gauge 369b7 is decreased, the electric potential Vab decreases, but the electric potential Vr does not change. In other words, an electric potential difference between the electric potential Vab and the electric potential Vr occurs.

In a case where both the first strain gauge 369a7 and the second strain gauge 369b7 are compressed, since the resistance values of both the first strain gauge 369a7 and the second strain gauge 369b7 are decreased, the electric potential difference between the electric potential Vab and the electric potential Vr is almost zero. In a case where both the first strain gauge 369a7 and the second strain gauge 369b7 are expanded, since the resistance values of both the first strain gauge 369a7 and the second strain gauge 369b7 are increased, the electric potential difference between the electric potential Vab and the electric potential Vr is almost zero.

In the second detection circuit 373b7, in a case where the resistance values of the first strain gauge 369a7 and the second strain gauge 369b7 of the first detection circuit 373a7 are increased, the electric potential V1 between the constant-current power supply 3747 and the first detection circuit 373a7 increases, and the electric potential V2 between the fixed resistance R1 and the fixed resistance R2 does not change. In other words, an electric potential difference between the electric potential V1 and the electric potential V2 occurs. In a case where the resistance values of the first strain gauge 369a7 and the second strain gauge 369b7 of the first detection circuit 373a7 are decreased, the electric potential V1 decreases, but the electric potential V2 does not change. In other words, an electric potential difference between the electric potential V1 and the electric potential V2 occurs. In a case where the resistance values of both the first strain gauge 369a7 and the second strain gauge 369b7 of the first detection circuit 373a7 are not changed or in a case one thereof is increased, and the other is decreased, the electric potential V1 and the electric potential V2 do not change. In other words, an electric potential difference between the electric potential V1 and the electric potential V2 is almost zero.

Thus, a connection point between the first strain gauge 369a7 and the second strain gauge 369b7 at which the electric potential Vab of the first detection circuit 373a7 can be measured and a connection point between the two fixed resistances R at which the electric potential Vr can be measured are configured as an output (hereinafter referred to as an output A) of the first detection circuit 373a7. In addition, a connection point between the constant-current power supply 3747 and the first detection circuit 373a7 at which the electric potential V1 of the second detection circuit 373b7 can be measured and a connection point between the fixed resistance R1 and the fixed resistance R2 at which the electric potential V2 can be measured are configured as an output (hereinafter referred to as an output B) of the second detection circuit 373b7. The outputs A and B configure the strain information.

Here, in the case of the arrangement as illustrated in FIG. 27, a method for detecting (measuring) the bending deformation x, the bending deformation y, the tensile deformation z, and the torsional deformation rz by using the measurement module strain detecting circuit 365 to which the first strain gauge 369a7 and the second strain gauge 369b7 are connected as illustrated in FIG. 28 will be described.

First, how each deformation is detected (measured) in the output A of the first detection circuit 373a7 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369a7 is compressed and thus has a decreased resistance value, and the second strain gauge 369b7 is expanded and thus has an increased resistance value. For this reason, the output A of the first detection circuit 373a7 is a positive output (the electric potential Vab is high, and the electric potential Vr is low). In addition, in a case where the right-side crank 105R is deformed from the lower face 118 toward the upper face 117, the first strain gauge 369a7 is expanded and has an increased resistance value, and the second strain gauge 369b7 is compressed and has a decreased resistance value. Accordingly, the output A of the first detection circuit 373a7 is a negative output (the electric potential Vab is low, and the electric potential Vr is high).

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369a7 and the second strain gauge 369b7 are compressed, and thus any one thereof has a decreased resistance value. For this reason, the output A of the first detection circuit 373a7 is zero (there is no electric potential difference between the electric potential Vab and the electric potential Vr). On the other hand, in a case where the right-side crank 105R is deformed from the inner face 119 toward the outer face 120, both the first strain gauge 369a7 and the second strain gauge 369b7 are expanded, and thus any one thereof has an increased resistance value. Accordingly, the output A of the first detection circuit 373a7 is zero.

In the tensile deformation z, the right-side crank 105R is deformed to be expanded or compressed in the longitudinal direction. In a case where the right-side crank 105R is expanded, both the first strain gauge 369a7 and the second strain gauge 369b7 are expanded, and thus, any one thereof has an increased resistance value. For this reason, the output A of the first detection circuit 373a7 is zero. On the other hand, in a case where the right-side crank 105R is compressed, both the first strain gauge 369a7 and the second strain gauge 369b7 are compressed, and thus, any one thereof has a decreased resistance value. For this reason, the output A of the first detection circuit 373a7 is zero.

In the torsional deformation rz, the right-side crank 105R is deformed to be twisted. In a case where the right-side crank 105R is twisted in a direction denoted by an arrow illustrated in FIG. 6B, both the first strain gauge 369a7 and the second strain gauge 369b7 are expanded, and thus any one thereof has an increased resistance value. For this reason, the output A of the first detection circuit 373a7 is zero. On the other hand, in a case where the right-side crank 105R is twisted in a direction opposite to that of the arrow illustrated in FIG. 6B, both the first strain gauge 369a7 and the second strain gauge 369b7 are expanded, and thus any one thereof has an increased resistance value. For this reason, the output A of the first detection circuit 373a7 is zero.

As above, only the bending deformation x is detected from the output A. In other words, the first strain gauge 369a7 and the second strain gauge 369b7 are connected to the first detection circuit 373a7, and the first detection circuit 373a7 detects a rotating-direction strain generated in the crank 105.

Next, how each deformation is detected (measured) in the output B of the second detection circuit 373b7 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, the first strain gauge 369a7 is compressed and thus has a decreased resistance value, and the second strain gauge 369b7 is expanded and thus has an increased resistance value. For this reason, the electric potential V1 does not change, and accordingly, the output B of the second detection circuit 373b7 is zero. On the other hand, in a case where the right-side crank 105R is deformed from the lower face 118 toward the upper face 117, the first strain gauge 369a7 is expanded and thus has an increased resistance value, and the second strain gauge 369b7 is compressed and thus has a decreased resistance value. For this reason, the electric potential V1 does not change, and accordingly, the output B of the second detection circuit 373b7 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369a7 and the second strain gauge 369b7 are compressed, and any one thereof has a decreased resistance value. For this reason, the output B of the second detection circuit 373b7 is a positive output (the electric potential V1 is high, and the electric potential V2 is low). On the other hand, in a case where the right-side crank 105R is deformed from the inner face 119 toward the outer face 120, both the first strain gauge 369a7 and the second strain gauge 369b7 are expanded, and any one thereof has an increased resistance value. For this reason, the output B of the second detection circuit 373b7 is a negative output (the electric potential V1 is low, and the electric potential V2 is high).

In the tensile deformation z, the right-side crank 105R is deformed to be expanded or compressed in the longitudinal direction. In a case where the right-side crank 105R is expanded, both the first strain gauge 369a7 and the second strain gauge 369b7 are expanded, and thus any one thereof has an increased resistance value. For this reason, the output B of the second detection circuit 373b7 is a negative output. On the other hand, in a case where the right-side crank 105R is compressed, both the first strain gauge 369a7 and the second strain gauge 369b7 are compressed, and any one thereof has a decreased resistance value. For this reason, the output B of the second detection circuit 373b7 is a positive output.

In the torsional deformation rz, the right-side crank 105R is deformed to be twisted. In a case where the right-side crank 105R is twisted in a direction denoted by the arrow illustrated in FIG. 6B, both the first strain gauge 369a7 and the second strain gauge 369b7 are expanded, and any one thereof has an increased resistance value. For this reason, the output B of the second detection circuit 373b7 is a negative output. On the other hand, in a case where the right-side crank 105R is twisted in a direction opposite to that of the arrow illustrated in FIG. 6B, both the first strain gauge 369a7 and the second strain gauge 369b7 are expanded, and thus any one thereof has an increased resistance value. For this reason, the output B of the second detection circuit 373b7 is a negative output.

As above, the bending deformation y, the tensile deformation z, and the torsional deformation rz are detected from the output B. In other words, the first detection circuit 373a7 and the constant-current power supply 3747 are connected to the second detection circuit 373b7, and the second detection circuit 373b7 detects an inward/outward strain or a pulling-direction strain generated in the crank 105.

Then, based on the output A of the first detection circuit 373a7 and the output B of the second detection circuit 373b7, the propulsion force Ft and the loss force Fr are calculated by respectively using Equations (1) and (2) represented in the first embodiment. Here, compared to the bending deformation y, the tensile deformation z is relatively small and is negligible. Equations (1) and (2) are presented again as below.

$$Ft = p(A-A0) + q(B-B0) [kgf] \quad (1)$$

$$Fr = s|A-A0| + u(B-B0) [kgf] \quad (2)$$

Here, p, q, s, u are coefficients and are values calculated by the simultaneous equations of Equations (3) to (6) represented in the first embodiment. Equations (3) to (6) are presented again as below.

$$m = p(Am-A0) + q(Be-B0) \quad (3)$$

$$0 = s(Am-A0) + u(Be-B0) \quad (4)$$

$$0 = p(Ae-A0) + q(Bm-B0) \quad (5)$$

$$m = s(Ae-A0) + u(Bm-B0) \quad (6)$$

Since the coefficients p, q, s, and u and A0 and B0 are values that can be calculated in advance or can be measured, by substituting A and B in Equations (1) and (2), the propulsion force Ft and the loss force Fr can be calculated.

In addition, in Equation (1), the output A is corrected by using the output B. In Equation (2), the output B is corrected by using the output A. In other words, the measurement module control unit 351 executing calculation of each equation serves as a correction means. Accordingly, the influence of the strain other than the detection target included in the first detection circuit 373a7 or the second detection circuit 373b7 can be excluded. In addition, in a case where there is no deviation of the first strain gauge 369a7 and the second strain gauge 369b7 from the crank direction (a direction parallel to the center axis C1), Ae=A0, and the correction according to the output B is not necessary.

The propulsion force Ft and the loss force Fr calculated in this way, similarly to the first embodiment, are transmitted to the cycle computer 201. The operation of the measurement module control unit 351 and the operations of the cycle computer 201 and the cadence sensor 501 are similar to those represented in the flowcharts illustrated in FIGS. 7A to 8C.

According to this embodiment, the measurement module 301 includes: the first strain gauge 369a7 and the second strain gauge 369b7 disposed on the inner face 119 of the crank 105 of the bicycle 1; the first detection circuit 373a7, to which the first strain gauge 369a7, the second strain gauge 369b7, and the constant-current power supply 374 are connected, detecting the bending deformation x occurring in the crank 105; and the second detection circuit 373$b$7, to which the first detection circuit 373$a$7 and the constant-current power supply 374 are connected, detecting the bending deformation y and the tensile deformation z occurring in the crank 105. In addition, the detection directions of the first strain gauge 369$a$7 and the second strain gauge 369$b$7 arranged to be parallel to the longitudinal direction of the crank 105. By configuring as such, the propulsion force Ft and the loss force Fr participating to the crank 105 can be measured based on the bending deformation x detected by the first detection circuit 373$a$7 and the bending deformation y and the tensile deformation z detected by the second detection circuit 373$b$7. Thus, the propulsion force Ft and the loss force Fr can be measured by using a simple method. In addition, since the constant-current power supply 3747 is used, the number of components of the strain gauge can be decreased. Furthermore, since the first strain gauge 369$a$7 and the second strain gauge 369$b$7 are disposed only on the inner face 119 of the crank 105, the propulsion force Ft and the loss force Fr can be measured only on one face, and, by arranging the strain gauges on the inner face 119, there is no intervention with the user's foot.

In addition, since the first detection circuit 373$a$7 and the second detection circuit 373$b$7 are configured as bridge circuits, the first strain gauge and the second strain gauge are connected in series with the constant-current power supply 3747 in the bridge circuit configuring the first detection circuit 373$a$7, and resistors other than the first strain gauge 369$a$7 and the second strain gauge 369$b$7 of the bridge circuit configuring the first detection circuit 373$a$7 and the bridge circuit configuring the second detection circuit 373$b$7 are configured by fixed resistance R, the fixed resistance R1, and the fixed resistance R2, the bending deformation x, the bending deformation y, and the tensile deformation z can be detected using the bridge circuits, whereby the propulsion force Ft and the loss force Fr can be measured by employing a simple circuit configuration.

In addition, since the first strain gauge 369$a$7 and the second strain gauge 369$b$7 are disposed to be symmetrical with respect to the center axis C1, the bending deformation x can be detected with high accuracy.

Furthermore, in the first detection circuit 373$a$7, the connection order of the first strain gauge 369$a$7 and the second strain gauge 369$b$7 may be reversed.

Eighth Embodiment

Next, a measuring device according to an eighth embodiment of the present invention will be described with reference to FIGS. 29 to 31. The same reference numeral will be assigned to the same part as that of the first embodiment described above, and the description thereof will not be presented.

In this embodiment, the configuration of a measurement module strain detecting circuit 365 of a measurement module 301 and the arrangement of a strain gauge 369 are different from those of the first embodiment. The strain gauge 369 according to this embodiment, as illustrated in FIG. 29, is configured by: a first strain gauge 369$a$8; and a second strain gauge 369$b$8. Then, the terminals of the strain gauge 369 are connected to the measurement module strain detecting circuit 365.

Figure 30:
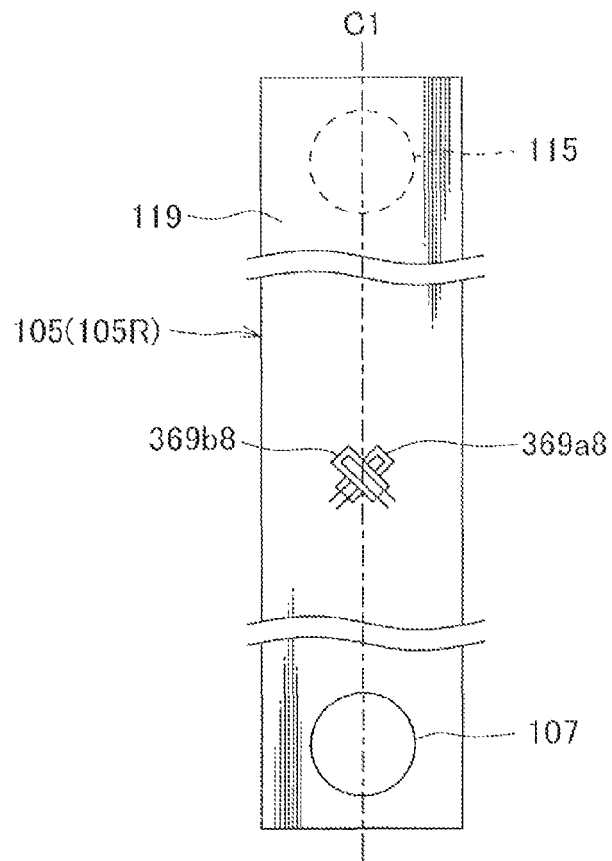
FIG. 30 is an explanatory diagram of the arrangement of a strain gauge illustrated in FIG. 29 in a crank.

FIG. 30 illustrates the arrangement of the strain gauge 369 in the crank 105 in this embodiment. The strain gauge 369 is bonded to the inner face 119 of the crank 105. Here, the inner face 119 of the crank 105 is a face on which the crankshaft 107 is disposed to project (connected) and is a face (side face) parallel to a plane including a circle that is defined by the rotating movement of the crank 105. In addition, while not illustrated in FIG. 30, the outer face 120 of the crank 105 is a face, on which the pedal crankshaft 115 is disposed to project (connected), facing the inner face 119. In other words, the outer face is a face on which the pedal 103 is disposed to be freely rotatable. An upper face 117 of the crank 105 has the longitudinal direction extending in the same direction as those of the inner face 119 and the outer face 120 and is one of faces orthogonal to the inner face 119 and the outer face 120. A lower face 118 of the crank 105 is a face that faces the upper face 117.

The first strain gauge 369$a$8 and the second strain gauge 369$b$8 are arranged to be orthogonal to each other and overlap (multi-layered) each other. In addition, the strain gauges are arranged such that a middle direction between the detection direction of the first strain gauge 369$a$8 and the detection direction of the second strain gauge 369$b$8 is the longitudinal direction of the crank 105. In other words, the detection direction of the first strain gauge 369$a$8 and the direction of the center axis C1 of the crank 105 form an angle of 45 degrees. The detection direction of the second strain gauge 369$b$8 and the direction of the center axis C1 of the crank 105 form an angle of 45 degrees. In addition, an intersection portion at which the first strain gauge 369$a$8 and the second strain gauge 369$b$8 is arranged on the center axis C1 of the inner face 119. In other words, the first strain gauge 369$a$8 and the second strain gauge 369$b$8 are arranged to be symmetrical with respect to the center axis C1 as the center.

Here, the arrangement of the first strain gauge 369$a$8 and the second strain gauge 369$b$8 is not limited to that illustrated in FIG. 30. In other words, any other arrangement may be employed as long as the first strain gauge 369$a$8 and the second strain gauge 369$b$8 are orthogonal to each other and are maintained to have a relation of 45 degrees with the center axis C1. However, the strain gauges are preferably arranged on the center axis C1 for detecting each deformation to be described later with high accuracy.

In the case illustrated in FIG. 30, while the crank 105 is described as a simple rectangular parallelepiped, according to a design or the like, the corner may be rounded, and some faces thereof may be configured as curved faces. Even in such a case, by arranging the strain gauge 369 such that the arrangement described above is maintained as much as possible, each deformation to be described later can be detected. However, as the relation (of 45 degrees) with the center axis C1 and the orthogonal relation described above (parallel, perpendicular, or 45 degrees) are out of alignment, the detection accuracy decreases.

The first strain gauge 369$a$8 and the second strain gauge 369$b$8 are connected to the measurement module strain detecting circuit 365, and the strain amount of the strain gauge 369 is output as a voltage. The output of the measurement module strain detecting circuit 365 is converted from analog information into strain information that is digital information by a measurement module A/D 363. Then, a strain information signal is output to the measurement module storage unit 353. The strain information signal input to the measurement module storage unit 353 is stored in the measurement module RAM 355 as the strain information.

Figure 31:
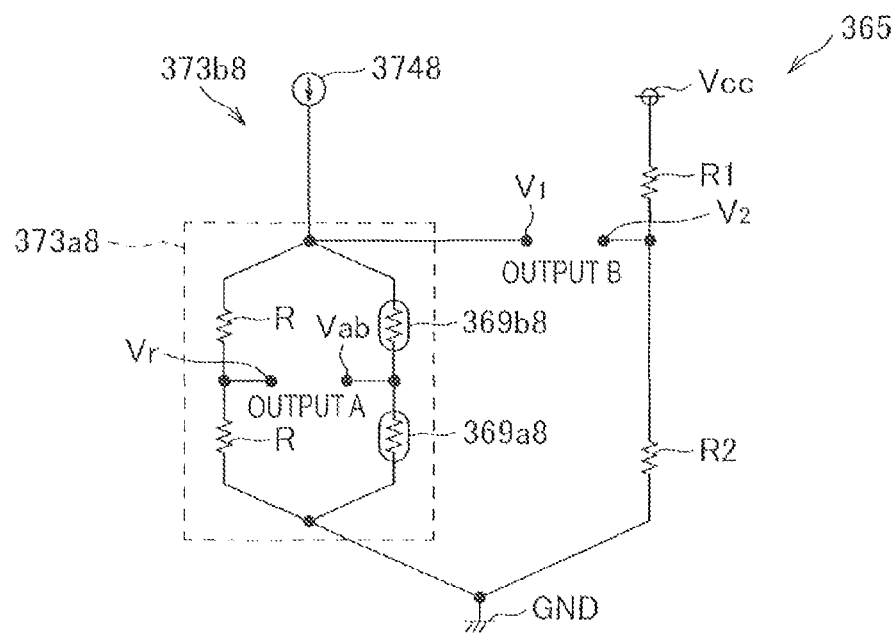
FIG. 31 is a circuit diagram of a measurement module strain detecting circuit illustrated in FIG. 29.

The measurement module strain detecting circuit 365 is illustrated in FIG. 31. The measurement module strain detecting circuit 365 is configured by a first detection circuit 373$a$8 and a second detection circuit 373$b$8 that are two bridge circuits. On a first system side of the first detection circuit 373a8, the second strain gauge 369b8 and the first strain gauge 369a8 are sequentially connected in order from a constant-current power supply 3748 side. In other words, the first strain gauge 369a8 and the second strain gauge 369b8 are connected in series with the constant-current power supply 3748. On a second system side, a fixed resistance R and a fixed resistance R are sequentially connected in order from the constant-current power supply 3748 side. On a first system side of the second detection circuit 373b8, the first detection circuit 373a8 is connected to the constant-current power supply 3748. In other words, the first strain gauge 369a8 and the second strain gauge 369b8 are connected in series with the constant-current power supply 3748 in the bridge circuit configuring the first detection circuit 373a8. On a second system side, in order from a constant-voltage power supply Vcc, a fixed resistance R1 and a fixed resistance R2 are sequentially connected. In addition, the first detection circuit 373a8 serves as a resistor in the bridge circuit configuring the second detection circuit 373b8. In other words, the first detection circuit 373a8 is caused to serve as one resistor in the bridge circuit configuring the second detection circuit 373b8.

The constant-current power supply 3748 side is directly connected to the first detection circuit 373a8. By configuring as such, changes in the resistance values of the first strain gauge 369a8 and the second strain gauge 369b8 can be directly taken out from the output B to be described later. In other words, by using the constant-current power supply 374, electric potential V1 (see FIG. 31) to be described later can be changed in accordance with the operation of the first detection circuit 373a8, and accordingly, a strain gauge component does not need to be arranged between the power supply and the first detection circuit 373a8. Here, the two fixed resistances R have the same resistance value. In addition, the first strain gauge 369a8 and the second strain gauge 369b8 have the same resistance value. The fixed resistances R1 and R2 are preferably configured to have a resistance value for which electric potential V2 (see FIG. 31) to be described later is the same as the electric potential V1 (see FIG. 31) in a no-load state.

As is known, the resistance value of the strain gauge 369 has a decreased resistance value in the case of compression and has an increased resistance value in the case of expansion. Such a change in the resistance value has a proportional relation in a case where the amount of the change is small. In addition, the detection direction of the strain gauge 369 is a direction in which the wiring grows, and, as described above, the detection direction of each of the first strain gauge 369a8 and the second strain gauge 369b8 is the direction parallel to the center axis C1. In a case where compression or expansion occurs in a direction other than the detection directions, a change in the resistance value of the strain gauge 369 does not occur.

In the first detection circuit 373a8 using the strain gauge 369 having such characteristics, in a case where the first strain gauge 369a8 and the second strain gauge 369b8 are not compressed or expanded in the detection direction, an electric potential difference between electric potential Vab between the first strain gauge 369a8 and the second strain gauge 369b8 and electric potential Vr between the two fixed resistances R is almost zero.

In a case where the first strain gauge 369a8 is compressed, and the second strain gauge 369b8 is expanded, since the resistance value of the first strain gauge 369a8 is decreased, and the resistance value of the second strain gauge 369b8 is increased, the electric potential Vab decreases, but the electric potential Vr does not change. In other words, an electric potential difference between the electric potential Vab and the electric potential Vr occurs. In a case where the first strain gauge 369a8 is expanded, and the second strain gauge 369b8 is compressed, since the resistance value of the first strain gauge 369a8 is increased, and the resistance value of the second strain gauge 369b8 is decreased, the electric potential Vab increases, but the electric potential Vr does not change. In other words, an electric potential difference between the electric potential Vab and the electric potential Vr occurs.

In a case where both the first strain gauge 369a8 and the second strain gauge 369b8 are compressed, since the resistance values of both the first strain gauge 369a8 and the second strain gauge 369b8 are decreased, the electric potential difference between the electric potential Vab and the electric potential Vr is almost zero. In a case where both the first strain gauge 369a8 and the second strain gauge 369b8 are expanded, since the resistance values of both the first strain gauge 369a8 and the second strain gauge 369b8 are increased, the electric potential difference between the electric potential Vab and the electric potential Vr is almost zero.

In the second detection circuit 373b8, in a case where the resistance values of the first strain gauge 369a8 and the second strain gauge 369b8 of the first detection circuit 373a8 are increased, the electric potential V1 between the constant-current power supply 3748 and the first detection circuit 373a8 increases, and the electric potential V2 between the fixed resistance R1 and the fixed resistance R2 does not change. In other words, an electric potential difference between the electric potential V1 and the electric potential V2 occurs. In a case where the resistance values of the first strain gauge 369a8 and the second strain gauge 369b8 of the first detection circuit 373a8 are decreased, the electric potential V1 decreases, but the electric potential V2 does not change. In other words, an electric potential difference between the electric potential V1 and the electric potential V2 occurs. In a case where the resistance values of both the first strain gauge 369a8 and the second strain gauge 369b8 of the first detection circuit 373a8 are not changed or in a case one thereof is increased, and the other is decreased, the electric potential V1 and the electric potential V2 do not change. In other words, an electric potential difference between the electric potential V1 and the electric potential V2 is almost zero.

Thus, a connection point between the first strain gauge 369a8 and the second strain gauge 369b8 at which the electric potential Vab of the first detection circuit 373a8 can be measured and a connection point between the two fixed resistances R at which the electric potential Vr can be measured are configured as an output (hereinafter referred to as an output A) of the first detection circuit 373a8. In addition, a connection point between the constant-current power supply 3748 and the first detection circuit 373a8 at which the electric potential V1 of the second detection circuit 373b8 can be measured and a connection point between the fixed resistance R1 and the fixed resistance R2 at which the electric potential V2 can be measured are configured as an output (hereinafter referred to as an output B) of the second detection circuit 373b8. The outputs A and B configure the strain information.

Here, in the case of the arrangement as illustrated in FIG. 30, a method for detecting (measuring) the bending deformation x, the bending deformation y, the tensile deformation z, and the torsional deformation rz by using the measurement module strain detecting circuit 365 to which the first strain gauge 369a8 and the second strain gauge 369b8 are connected as illustrated in FIG. 31 will be described.

First, how each deformation is detected (measured) in the output A of the first detection circuit 373a8 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, as illustrated in FIG. 21, while one end of the first strain gauge 369a8 is expanded, the other end thereof is compressed (although FIG. 21 is an explanatory diagram of the fifth embodiment, this is similar also in this embodiment). As a result, inside the first strain gauge 369a8, both expansion and compression occur, and the resistance value of the first strain gauge 369a8 does not change. This similarly applies to the second strain gauge 369b8. Accordingly, the output A of the first detection circuit 373a8 is zero. On the other hand, in a case where the right-side crank 105R is deformed from the lower face 118 toward the upper face 117, similarly, both expansion and compression occur in both the first strain gauge 369a8 and the second strain gauge 369b8, and the resistance values thereof do not change. Accordingly, the output A of the first detection circuit 373a8 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369a8 and the second strain gauge 369b8 are expanded, and thus any one thereof has an increased resistance value. For this reason, the output A of the first detection circuit 373a8 is zero. On the other hand, in a case where the right-side crank 105R is deformed from the inner face 119 toward the outer face 120, both the first strain gauge 369a8 and the second strain gauge 369b8 are compressed, and thus any one thereof has a decreased resistance value. Accordingly, the output A of the first detection circuit 373a8 is zero.

In the tensile deformation z, the right-side crank 105R is deformed to be expanded or compressed in the longitudinal direction. In a case where the right-side crank 105R is expanded, both the first strain gauge 369a8 and the second strain gauge 369b8 are compressed, and thus, any one thereof has a decreased resistance value. For this reason, the output A of the first detection circuit 373a8 is zero. On the other hand, in a case where the right-side crank 105R is compressed, both the first strain gauge 369a8 and the second strain gauge 369b8 are expanded, and thus, any one thereof has an increased resistance value. For this reason, the output A of the first detection circuit 373a8 is zero.

In the torsional deformation rz, the right-side crank 105R is deformed to be twisted. In a case where the right-side crank 105R is twisted in the direction denoted by the arrow illustrated in FIG. 6B, the first strain gauge 369a8 is expanded and thus has an increased resistance value, and the second strain gauge 369b8 is compressed and thus has a decreased resistance value. For this reason, the output A of the first detection circuit 373a8 is a positive output (the electric potential Vab is high, and the electric potential Vr is low). On the other hand, in a case where the right-side crank 105R is twisted in a direction opposite to the direction of the arrow illustrated in FIG. 6B, the first strain gauge 369a8 is compressed and thus has a decreased resistance value, and the second strain gauge 369b8 is expanded and thus has an increased resistance value. For this reason, the output A of the first detection circuit 373a8 is a negative output (the electric potential Vab is low, and the electric potential Vr is high).

As above, only the torsional deformation rz is detected from the output A. In other words, the first strain gauge 369a8 and the second strain gauge 369b8 are connected to the first detection circuit 373a8, and the first detection circuit 373a8 detects a twist-direction strain generated in the crank 105.

Next, how each deformation is detected (measured) in the output B of the second detection circuit 373b8 will be described. In the bending deformation x, the right-side crank 105R is deformed from the upper face 117 toward the lower face 118 or in the opposite direction thereof. In a case where the right-side crank 105R is deformed from the upper face 117 toward the lower face 118, as described above, inside both the first strain gauge 369a8 and the second strain gauge 369b8, both expansion and compression occur, and the resistance values do not change. For this reason, since the electric potential V1 does not change, the output B of the second detection circuit 373b8 is zero. On the other hand, in a case where the right-side crank 105R is deformed from the lower face 118 toward the upper face 117, similarly, both expansion and compression occur inside both the first strain gauge 369a8 and the second strain gauge 369b8, and the resistance values thereof do not change. For this reason, the electric potential V1 does not change, and accordingly, the output B of the second detection circuit 373b8 is zero.

In the bending deformation y, the right-side crank 105R is deformed from the outer face 120 toward the inner face 119 or in the opposite direction thereof. In a case where the right-side crank 105R is deformed from the outer face 120 toward the inner face 119, both the first strain gauge 369a8 and the second strain gauge 369b8 are expanded, and thus, any one thereof has an increased resistance value. For this reason, the output B of the second detection circuit 373b8 is a positive output (the electric potential V1 is high, and the electric potential V2 is low). On the other hand, in a case where the right-side crank 105R is deformed from the inner face 119 toward the outer face 120, both the first strain gauge 369a8 and the second strain gauge 369b8 are compressed, and thus, any one thereof has a decreased resistance value. For this reason, the output B of the second detection circuit 373b8 is a negative output (the electric potential V1 is low, and the electric potential V2 is high).

In the tensile deformation z, the right-side crank 105R is deformed to be expanded or compressed in the longitudinal direction. In a case where the right-side crank 105R is expanded, both the first strain gauge 369a8 and the second strain gauge 369b8 are compressed, and thus any one thereof has a decreased resistance value. For this reason, the output B of the second detection circuit 373b8 is a negative output. On the other hand, in a case where the right-side crank 105R is compressed, both the first strain gauge 369a8 and the second strain gauge 369b8 are expanded, and any one thereof has an increased resistance value. For this reason, the output B of the second detection circuit 373b8 is a positive output.

In the torsional deformation rz, the right-side crank 105R is deformed to be twisted. In a case where the right-side crank 105R is twisted in a direction denoted by the arrow illustrated in FIG. 6B, the first strain gauge 369a8 is expanded and thus has an increased resistance value, and the second strain gauge 369b8 is compressed and thus has a decreased resistance value. For this reason, the output B of the second detection circuit 373b8 is zero. On the other hand, in a case where the right-side crank 105R is twisted in a direction opposite to the direction of the arrow illustrated in FIG. 6B, the first strain gauge 369a8 is compressed and thus has a decreased resistance value, and the second strain gauge 369b8 is expanded and thus has an increased resistance value. For this reason, the output B of the second detection circuit 373b8 is zero.

As above, the bending deformation y and the tensile deformation z are detected from the output B. In other words, the first detection circuit 373a8 and the constant-current power supply 3748 are connected to the second detection circuit 373b8, and the second detection circuit 373b8 detects an inward/outward strain or a pulling-direction strain generated in the crank 105.

Then, based on the output A of the first detection circuit 373a8 and the output B of the second detection circuit 373b8, the propulsion force Ft and the loss force Fr are calculated by respectively using Equation (1) represented in the first embodiment and Equation (8) represented in the fourth embodiment. Here, compared to the bending deformation y, the tensile deformation z is relatively small and is negligible. Equations (1) and (8) are presented again as below.

$$Ft = p(A-A0) + q(B-B0) [kgf] \quad (1)$$

$$Fr = s(A-A0) + u(B-B0) [kgf] \quad (8)$$

Here, p, q, s, u are coefficients and are values calculated by the simultaneous equations of Equations (3) to (6) represented in the first embodiment. Equations (3) to (6) are presented again as below.

$$m = p(Am-A0) + q(Be-B0) \quad (3)$$

$$0 = s(Am-A0) + u(Be-B0) \quad (4)$$

$$0 = p(Ae-A0) + q(Bm-B0) \quad (5)$$

$$m = s(Ae-A0) + u(Bm-B0) \quad (6)$$

Since the coefficients p, q, s, and u and A0 and B0 are values that can be calculated in advance or can be measured, by substituting A and B in Equations (1) and (8), the propulsion force Ft and the loss force Fr can be calculated.

In addition, in Equation (1), the output A is corrected by using the output B. In Equation (8), the output B is corrected by using the output A. In other words, the measurement module control unit 351 executing calculation of each equation to be described later serves as a correction means. Accordingly, the influence of the strain other than the detection target included in the first detection circuit 373a8 or the second detection circuit 373b8 can be excluded. In addition, in a case where there is no deviation of the first strain gauge 369a8 and the second strain gauge 369b8 from the crank direction (a direction parallel to the center axis C1), Ae=A0, and the correction according to the output B is not necessary. Furthermore, in this embodiment, constantly, Be=B0, and accordingly, the correction according to the output A is not necessary.

The propulsion force Ft and the loss force Fr calculated in this way, similarly to the first embodiment, are transmitted to the cycle computer 201. The operation of the measurement module control unit 351 and the operations of the cycle computer 201 and the cadence sensor 501 are similar to those represented in the flowcharts illustrated in FIGS. 7A to 8C.

According to this embodiment, the measurement module 301 includes: the first strain gauge 369a8 and the second strain gauge 369b8 disposed on the inner face 119 of the crank 105 of the bicycle 1; the first detection circuit 373a8, to which the first strain gauge 369a8, the second strain gauge 369b8, and the constant-current power supply 3748 are connected, detecting the torsional deformation rz occurring in the crank 105; and the second detection circuit 373b8, to which the first detection circuit 373a8 and the constant-current power supply 3748 are connected, detecting the bending deformation y and the tensile deformation z occurring in the crank 105. In addition, the detection directions of the first strain gauge 369a8 and the second strain gauge 369b8 are orthogonal to each other, and a middle direction between the detection directions of the first strain gauge 369a8 and the second strain gauge 369b8 is arranged to be the longitudinal direction of the crank 105. By configuring as such, the propulsion force Ft and the loss force Fr participating to the crank 105 can be measured based on the torsional deformation rz detected by the first detection circuit 373a8 and the bending deformation y and the tensile deformation z detected by the second detection circuit 373b8. Thus, the propulsion force Ft and the loss force Fr can be measured by using a simple method. In addition, since the constant-current power supply 3748 is used, the number of components of the strain gauge can be decreased. Furthermore, since the first strain gauge 369a8 and the second strain gauge 369b8 are disposed only on the inner face 119 of the crank 105, the propulsion force Ft and the loss force Fr can be measured only on one face, and, by arranging the strain gauges on the inner face 119, there is no intervention with the user's foot.

In addition, since the first detection circuit 373a8 and the second detection circuit 373b8 are configured as bridge circuits, the first strain gauge and the second strain gauge are connected in series with the constant-current power supply 3748 in the bridge circuit configuring the first detection circuit 373a8, and resistors other than the first strain gauge 369a8 and the second strain gauge 369b8 of the bridge circuit configuring the first detection circuit 373a8 and the bridge circuit configuring the second detection circuit 373b8 are configured by fixed resistance R, the fixed resistance R1, and the fixed resistance R2, the bending deformation x, the bending deformation y, and the tensile deformation z can be detected using the bridge circuits, whereby the propulsion force Ft and the loss force Fr can be measured by employing a simple circuit configuration.

In addition, since the first strain gauge 369a8 and the second strain gauge 369b8 overlap each other, the size of the strain gauge 369 can be decreased.

Furthermore, instead of configuring the first strain gauge 369a8 and the second strain gauge 369b8 to overlap each other, the strain gauges may be individually arranged.

In addition, in the first detection circuit 373a8, the connection order of the first strain gauge 369a8 and the second strain gauge 369b8 may be reversed.

In the eight embodiments described above, while the cycle computer 201 is configured to display the average propulsion force and the average loss force of every second, for example, it may be configured such that the average propulsion force and the average loss force are calculated for every specific rotation angle (30° or the like) of the crank 105, and the magnitudes thereof are represented using arrows or the like. Regarding the rotation angle of the crank 105, for example, a method in which an optical-type rotation detection sensor including a light emitting unit and a light reception unit installed near the outer circumferential portion of the crank gear is arranged, the number of gear teeth passing between the light emitting unit and the light reception unit is counted, and a ratio of the count value to the number of gear teeth is acquired for detecting the rotation angle, a method of detecting the rotation angle by using a conventional sensor such as a potention meter, or the like may be used.

In addition, the transmission efficiency for each rotation angle of the crank 105 may be calculated based on the propulsion force Ft and the loss force Fr that have been calculated and be displayed. Here, the transmission efficiency is a contribution ratio of the propulsion force Ft to a force acting on the pedal 103 and is an index that represents a pedaling state. In addition, it may be configured such that a predetermined threshold is set for the transmission efficiency, and, in a case where the transmission efficiency is the threshold or less, the pedaling state is determined to be bad and inefficient, and a result thereof is displayed using a diagram or the like.

Furthermore, in the eight embodiments described above, while the strain gauge 369 is arranged in the right-side crank 105R, a strain gauge may be arranged also in the left-side crank 105L. In such a case, the user can be aware of the pedaling balance between the left and right sides.

In addition, in the manufacturing process of the crank 105, the strain gauge 369 may be embedded inside the crank 105. In addition, in a case where the crank 105 has a hollow structure, the strain gauge 369 may be bonded to the inside of the hollow. According to such a method, the strain gauge 369 can be arranged without degrading the external appearance of the crank 105. In addition, since the strain gauge 369 is not exposed to the outside, the durability of the strain gauge 369 can be improved.

In addition, in FIG. 4 and the like, while the strain gauge 369 is illustrated to be disposed near the center of the crank 105, the strain gauge may be disposed on the pedal 103 side or the crankshaft 107 side. In a case where the strain gauge is arranged on the pedal 103 side, the strain amount of the crank 105 is decreased, and accordingly, the life of the strain gauge 369 can be lengthened. On the other hand, in a case where the strain gauge is arranged on the crankshaft 107 side, the output of the strain gauge 369 increases based on the principle of leverage, and accordingly, the influence of noises can be reduced.

Furthermore, while the strain gauge 369 has been described to be arranged on the inner face 119 of the crank 105, the strain gauge may be arranged on the outer face 120. However, in a case where the strain gauge 369 is arranged on the outer face 120, there is a possibility of being in touch with the user' foot, and thus, it is preferable that the strain gauge is arranged on the inner face 119.

In addition, the strain gauge 369 is not limited to being configured by one component but may be configured by a plurality of components. Furthermore, while the resistance values of all the strain gauges 369 are not limited to be configured to have the same resistance value, each strain gauge 369 and the fixed register R need to have resistance values for which the relation for outputting a positive output or a negative output at the time of detection of each deformation is maintained.

In the present invention, a manpower machine represents a machine such as the bicycle 1 or an exercise bike that includes the crank 105 and is driven by manpower. In other words, any manpower machine may be used as long as it includes the crank 105 and is driven by manpower (positional movement is not necessary).

In the present invention, a measuring device may be either a part of the cycle computer 201 or another independent device. In addition, the measuring device may be an aggregate of a plurality of devices that are physically separated from each other. Depending on the situations, members other than the strain gauge 369 (the measurement module strain detecting circuit 365) may be devices, which are located at completely difference positions, operating through communication. In other words, the measurement module 301 is an example of a measuring device according to the present invention.

The present invention is not limited to the embodiments described above. In other words, the embodiments may be variously changed within a range not departing from the essence of the present invention based on conventional knowledge that is publicly available. Even according to such a change, the embodiment belongs to the scope of the present invention, as long as the configurations of the measuring device according to the present invention are included therein.

REFERENCE SIGNS LIST

1 Bicycle (manpower machine)
105 Crank
119 Inner face (side face)
120 Outer face (side face)
369a First strain gauge
369b Second strain gauge
369c Third strain gauge
369d Fourth strain gauge
369e Fifth strain gauge
369f Sixth strain gauge
369g Seventh strain gauge
369h Eighth strain gauge
373a First detection circuit
373b Second detection circuit
373c First detection circuit
373d Second detection circuit
C1 Center axis
R Fixed resistance
ST11 Execute A/D conversion using measurement module A/D (rotating-direction strain detecting process and inward/outward strain or pulling-direction strain detecting process)
ST33 Calculate average propulsion force and average loss force (propulsion force measuring process and loss force measuring process)

The invention claimed is:

1. A measuring device comprising:
a first strain gauge, a second strain gauge, a third strain gauge, and a fourth strain gauge that are disposed on a side face that is a face of a crank parallel to a plane including a circle defined by rotational movement of the crank of a manpower machine;
a first detection circuit, to which the first strain gauge and the second strain gauge are connected, detecting a rotating-direction strain generated in a rotating direction of the crank;
a second detection circuit, to which the third strain gauge and the fourth strain gauge are connected, detecting at least one of an inward/outward strain generated in a direction perpendicular to the plane of the crank and a pulling-direction strain generated in a direction parallel to a longitudinal direction of the crank; and
a control unit measuring a propulsion force of the manpower machine based on the rotating-direction strain detected in the first detection circuit, and measuring a loss force of the manpower machine based on at least one of the inward/outward strain and the pulling-direction strain detected in the second detection circuit, wherein:

the first strain gauge, the second strain gage and the third strain gauge are arranged such that detection directions are parallel to the longitudinal direction of the crank, and the fourth strain gauge is arranged such that a detection direction is perpendicular to the longitudinal direction of the crank.

2. The measuring device according to claim 1, further comprising a correction section that corrects a mixed-in strain component other than the strains detected by each of the detection circuits based on an output of the first detection circuit and an output of the second detection circuit.

3. The measuring device according to claim 1, wherein the first strain gauge and the second strain gauge are disposed to be symmetrical with respect to a center axis in the longitudinal direction of the side face of the crank.

4. The measuring device according to claim 2, wherein the first strain gauge and the second strain gauge are disposed to be symmetrical with respect to a center axis in the longitudinal direction of the side face of the crank.

5. The measuring device according to claim 1, wherein the third strain gauge and the fourth strain gauge overlap each other.

6. The measuring device according to claim 2, wherein the third strain gauge and the fourth strain gauge overlap each other.

7. The measuring device according to claim 3, wherein the third strain gauge and the fourth strain gauge overlap each other.

8. The measuring device according to claim 4, wherein the third strain gauge and the fourth strain gauge overlap each other.

9. The measuring device according to claim 1,
wherein the first detection circuit and the second detection circuit are configured as bridge circuits,
wherein the first strain gauge and the second strain gauge are connected in series with a power supply in the bridge circuit configuring the first detection circuit,
wherein the third strain gauge and the fourth strain gauge are connected in series with a power supply in the bridge circuit configuring the second detection circuit, and
wherein resistors other than the first to fourth strain gauges of the bridge circuit configuring the first detection circuit and the bridge circuit configuring the second detection circuit are configured to have fixed resistance.

10. The measuring device according to claim 9, wherein the fixed resistance is shared by the first detection circuit and the second detection circuit.

11. A measuring device comprising:
a first strain gauge, a second strain gauge, a third strain gauge, a fourth strain gauge, a fifth strain gauge, a sixth strain gauge, a seventh strain gauge, and an eighth strain gauge that are disposed on a side face that is a face of a crank parallel to a plane including a circle defined by rotational movement of the crank of a manpower machine;
a first detection circuit, to which the first strain gauge, the second strain gauge, the fifth strain gauge, and the sixth strain gauge are connected, detecting a rotating-direction strain generated in a rotating direction of the crank;
a second detection circuit, to which the third strain gauge, the fourth strain gauge, the seventh strain gauge, and the eighth strain gauge are connected, detecting at least one of an inward/outward strain generated in a direction perpendicular to the plane of the crank and a pulling-direction strain generated in a direction parallel to a longitudinal direction of the crank; and
a control unit measuring a propulsion force of the manpower machine based on the rotating-direction strain detected in the first detection circuit, and measuring a loss force of the manpower machine based on at least one of the inward/outward strain and the pulling-direction strain detected in the second detection circuit, wherein:
the first strain gauge, the second strain gauge, the third strain gauge, and the eighth strain gauge are arranged such that detection directions are parallel to the longitudinal direction of the crank,
the fourth strain gauge, the fifth strain gauge, the sixth strain gauge, and the seventh strain gauge are arranged such that detection directions are perpendicular to the longitudinal direction of the crank.

12. The measuring device according to claim 11,
wherein the first detection circuit and the second detection circuit are configured as bridge circuits,
wherein the first strain gauge and the sixth strain gauge, and the second strain gauge and the fifth strain gauge are connected diagonally in the bridge circuit configuring the first detection circuit, and
wherein the third strain gauge and the eighth strain gauge, and the fourth strain gauge and the seventh strain gauge are connected to positions of opposite angles in the bridge circuit configuring the second detection circuit.

13. A measuring method measuring a propulsion force and a loss force of a manpower machine by using a measuring device that includes:
a first strain gauge, a second strain gauge, and a third strain gauge that are disposed on a side face that is a face of a crank parallel to a plane including a circle defined by rotational movement of the crank of a manpower machine such that detection directions are disposed to be parallel to a longitudinal direction of the crank;
a fourth strain gauge disposed such that a detection direction is perpendicular to the longitudinal direction of the crank;
a first detection circuit, to which the first strain gauge and the second strain gauge are connected, detecting a rotating-direction strain generated in a rotating direction of the crank; and
a second detection circuit, to which the third strain gauge and the fourth strain gauge are connected, detecting at least one of an inward/outward strain generated in a direction perpendicular to the plane of the crank and a pulling-direction strain generated in a direction parallel to a longitudinal direction of the crank,
the measuring method comprising:
detecting the rotating-direction strain by using the first detection circuit;
measuring the propulsion force based on the rotating-direction strain detected in the detecting of the rotating-direction strain;
detecting at least one of the inward/outward strain and the pulling-direction strain by using the second detection circuit; and
measuring the loss force based on at least one of the inward/outward strain and the pulling-direction strain detected in the detecting of one of the inward/outward strain and the pulling-direction strain.

14. A measuring method measuring a propulsion force and a loss force of a manpower machine by using a measuring device that includes:

a first strain gauge, a second strain gauge, a third strain gauge, and an eighth strain gauge that are disposed on a side face that is a face of a crank parallel to a plane including a circle defined by rotational movement of the crank of the manpower machine such that detection directions are parallel to a longitudinal direction of the crank;

a fourth strain gauge, a fifth strain gauge, a sixth strain gauge, and a seventh strain gauge disposed such that detection directions are perpendicular to the longitudinal direction of the crank;

a first detection circuit, to which the first strain gauge, the second strain gauge, the fifth strain gauge, and the sixth strain gauge are connected, detecting a rotating-direction strain generated in a rotating direction of the crank; and a second detection circuit, to which the third strain gauge, the fourth strain gauge, the seventh strain gauge, and the eighth strain gauge are connected, detecting at least one of an inward/outward strain generated in a direction perpendicular to the plane of the crank and a pulling-direction strain generated in a direction parallel to a longitudinal direction of the crank, the measuring method comprising:

detecting the rotating-direction strain by using the first detection circuit;

measuring the propulsion force based on the rotating-direction strain detected in the detecting of the rotating-direction strain;

detecting at least one of the inward/outward strain and the pulling-direction strain by using the second detection circuit; and measuring the loss force based on at least one of the inward/outward strain and the pulling-direction strain detected in the detecting of at least one of the inward/outward strain and the pulling-direction strain.

* * * * *